United States Patent
Frisch et al.

(10) Patent No.: US 12,435,659 B2
(45) Date of Patent: Oct. 7, 2025

(54) AFTERTREATMENT COMPONENT CARTRIDGE FOR AN AFTERTREATMENT SYSTEM

(71) Applicant: CUMMINS EMISSION SOLUTIONS INC., Columbus, IN (US)

(72) Inventors: Paul T. Frisch, Madison, WI (US); Peter Christianson, Waunakee, WI (US); Joshua Niedfeldt, Stoughton, WI (US)

(73) Assignee: CUMMINS EMISSION SOLUTIONS INC., Columbus, IN (US)

( * ) Notice: Subject to any disclaimer, the term of this patent is extended or adjusted under 35 U.S.C. 154(b) by 95 days.

(21) Appl. No.: 18/104,420

(22) Filed: Feb. 1, 2023

(65) Prior Publication Data

US 2024/0254910 A1 Aug. 1, 2024

(51) Int. Cl.
*F01N 13/18* (2010.01)
*F01N 3/021* (2006.01)

(52) U.S. Cl.
CPC ........ *F01N 13/1827* (2013.01); *F01N 3/0211* (2013.01)

(58) Field of Classification Search
None
See application file for complete search history.

(56) References Cited

U.S. PATENT DOCUMENTS

| | | | |
|---|---|---|---|
| 1,959,630 A | 5/1934 | Julius | |
| 1,977,241 A | 10/1934 | Parker | |
| 2,269,664 A | 1/1942 | Hallerberg | |
| 3,265,413 A | 8/1966 | William | |
| 3,432,189 A | 3/1969 | Buller | |
| 3,498,649 A | 3/1970 | Pfeuffer | |
| 3,820,831 A | 6/1974 | Swedelius | |
| 3,865,413 A | 2/1975 | Mizusawa et al. | |

(Continued)

FOREIGN PATENT DOCUMENTS

| | | |
|---|---|---|
| BR | 102016021809 A2 | 4/2017 |
| CN | 1599851 A | 3/2005 |

(Continued)

OTHER PUBLICATIONS

Extended European Search Report in European Patent Application No. 10821191.3 issued Sep. 20, 2013.

(Continued)

*Primary Examiner* — Jelitza M Perez
(74) *Attorney, Agent, or Firm* — Foley & Lardner LLP

(57) ABSTRACT

An aftertreatment system includes an inlet body, a cartridge, and an outlet body. The inlet body includes an inlet body wall and an inlet engagement member. The inlet engagement member includes an inlet engagement member wall and an inlet coupling flange. The inlet coupling flange extends in a downstream direction from the inlet engagement member wall. The cartridge includes a cartridge wall and an adaptor that extends away from the cartridge wall. The outlet body includes an outlet body wall and an outlet engagement member. The outlet engagement member includes an outlet engagement member wall and an outlet coupling flange. The outlet coupling flange extends in an upstream direction from the outlet engagement member wall and towards the adaptor such that the adaptor is disposed between the inlet coupling flange and the outlet coupling flange.

16 Claims, 28 Drawing Sheets

(56) References Cited

U.S. PATENT DOCUMENTS

| | | | |
|---|---|---|---|
| 3,964,773 | A | 6/1976 | Stade et al. |
| 3,985,377 | A | 10/1976 | Ahola et al. |
| 4,071,269 | A | 1/1978 | Halling et al. |
| 4,209,177 | A | 6/1980 | Hall |
| 4,248,833 | A | 2/1981 | Aoyama |
| 4,693,502 | A | 9/1987 | Oetiker |
| 4,832,380 | A | 5/1989 | Oetiker |
| 5,505,498 | A | 4/1996 | Halling et al. |
| 5,661,976 | A | 9/1997 | Clanton |
| 6,152,453 | A | 11/2000 | Kashima et al. |
| 6,164,067 | A | 12/2000 | Cronje |
| 6,632,406 | B1 | 10/2003 | Michelin et al. |
| 7,172,202 | B2 | 2/2007 | Kubota et al. |
| 7,393,020 | B2 | 7/2008 | Hartig et al. |
| 7,399,005 | B2 | 7/2008 | Rigollet et al. |
| 7,582,267 | B1 | 9/2009 | Klein et al. |
| 8,328,243 | B2 | 12/2012 | Matthis et al. |
| 9,163,589 | B2 | 10/2015 | Jeanson et al. |
| 9,593,618 | B2 | 3/2017 | Runde et al. |
| 9,909,698 | B2 | 3/2018 | Drost et al. |
| 10,883,405 | B1 | 1/2021 | Hornback et al. |
| 10,900,596 | B2 | 1/2021 | Drost et al. |
| 10,927,743 | B2 | 2/2021 | Jang |
| 10,940,435 | B2 | 3/2021 | Valencia Arcila et al. |
| 2004/0075276 | A1 | 4/2004 | Lemke et al. |
| 2004/0109795 | A1 | 6/2004 | Marc |
| 2006/0053779 | A1 | 3/2006 | Belisle et al. |
| 2006/0082154 | A1 | 4/2006 | Hartig et al. |
| 2008/0093421 | A1 | 4/2008 | Forster et al. |
| 2008/0277016 | A1 | 11/2008 | Covers et al. |
| 2010/0187771 | A1 | 7/2010 | Waltenberg et al. |
| 2011/0142723 | A1 | 6/2011 | Yamamoto |
| 2013/0047605 | A1 | 2/2013 | Drangel et al. |
| 2013/0156652 | A1 | 6/2013 | Kamei et al. |
| 2014/0007562 | A1 | 1/2014 | Justin |
| 2014/0137382 | A1 | 5/2014 | Stonecipher |
| 2014/0271386 | A1 | 9/2014 | Stanavich |
| 2015/0226368 | A1 | 8/2015 | Schellin et al. |
| 2016/0341083 | A1 | 11/2016 | Matsunaga et al. |
| 2017/0089249 | A1 | 3/2017 | Neumann et al. |
| 2021/0148275 | A1 | 5/2021 | Hiraoka |

FOREIGN PATENT DOCUMENTS

| | | |
|---|---|---|
| CN | 107035497 A | 8/2017 |
| CN | 107956568 A | 4/2018 |
| CN | 207813720 U | 9/2018 |
| DE | 10 2015 218 503 A1 | 3/2017 |
| EP | 3 147 472 A1 | 3/2017 |
| FR | 2867511 A1 | 9/2005 |
| FR | 2906864 A1 | 4/2008 |
| JP | H09-133276 A | 5/1997 |
| JP | 2006-009914 A | 1/2006 |
| JP | 2017-075596 A | 4/2017 |
| KR | 10-0776367 B1 | 11/2007 |
| KR | 10-0904419 A | 6/2009 |
| WO | WO-2011/041448 A2 | 4/2011 |
| WO | WO-2016/154316 A1 | 9/2016 |
| WO | WO-2017/053194 A1 | 3/2017 |
| WO | WO-2022/087279 A1 | 4/2022 |
| WO | WO-2023/009127 A | 2/2023 |

OTHER PUBLICATIONS

Final Office Action in U.S. Appl. No. 12/893,959 issued Feb. 19, 2014.

First Examination Report in Indian Patent Application No. 3808/CHENP/2012 issued May 2, 2018.

First Office Action in Chinese Patent Application No. 201080053740.1 issued Nov. 20, 2013 (with translation).

First Office Action in Chinese Patent Application No. 201510152512.4 issued Jul. 25, 2016 (with translation).

International Search Report and Written Opinion for PCT Application No. PCT/US2024/013225 issued Jul. 11, 24.

International Search Report & Written Opinion in PCT Application No. PCT/US2010/050771 issued Jun. 1, 2011.

Office Action in U.S. Appl. No. 12/893,959 issued Aug. 10, 2012.

Office Action in U.S. Appl. No. 12/893,959 issued May 14, 2013.

Pre-Examination Opinion in Brazilian Patent Application No. 112012007072.0 issued Mar. 19, 2019 (with translation).

International Search Report and Written Opinion in PCT Application No. PCT/US2021/043753, dated Nov. 15, 2021.

Mack ClearTech™ YouTube Video Transcript and Screenshots; video available at https:/www.youtube.com/watch?v=BG9cYQ9u2 4; last accessed Feb. 1, 2023; published by Mack Trucks; dated Jun. 9, 2016.

International Searach Report and Written Opinion for PCT Application No. PCT/US2024/013225 issued Jul. 11, 2024.

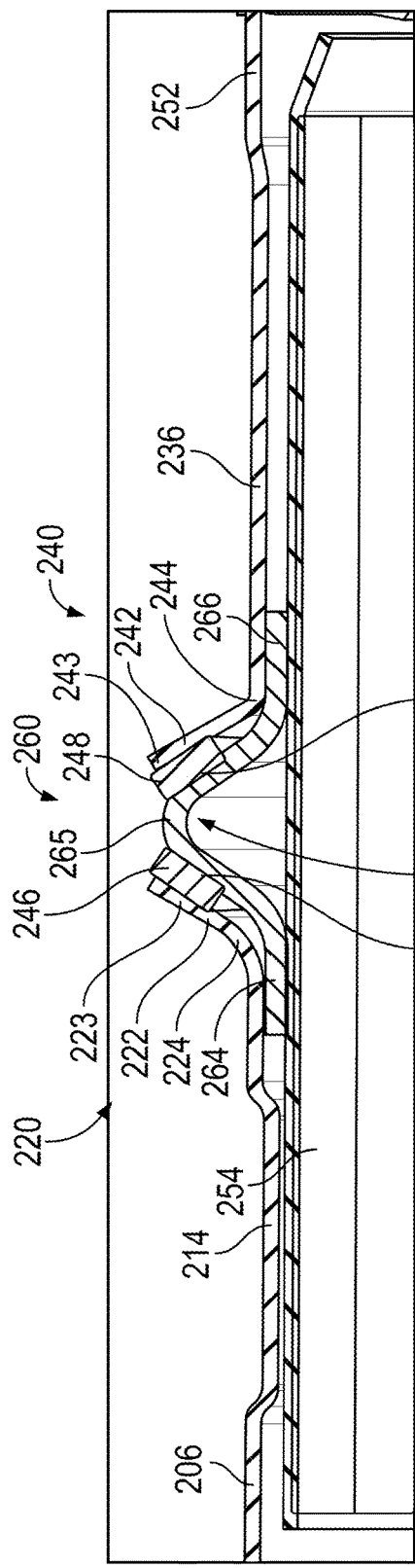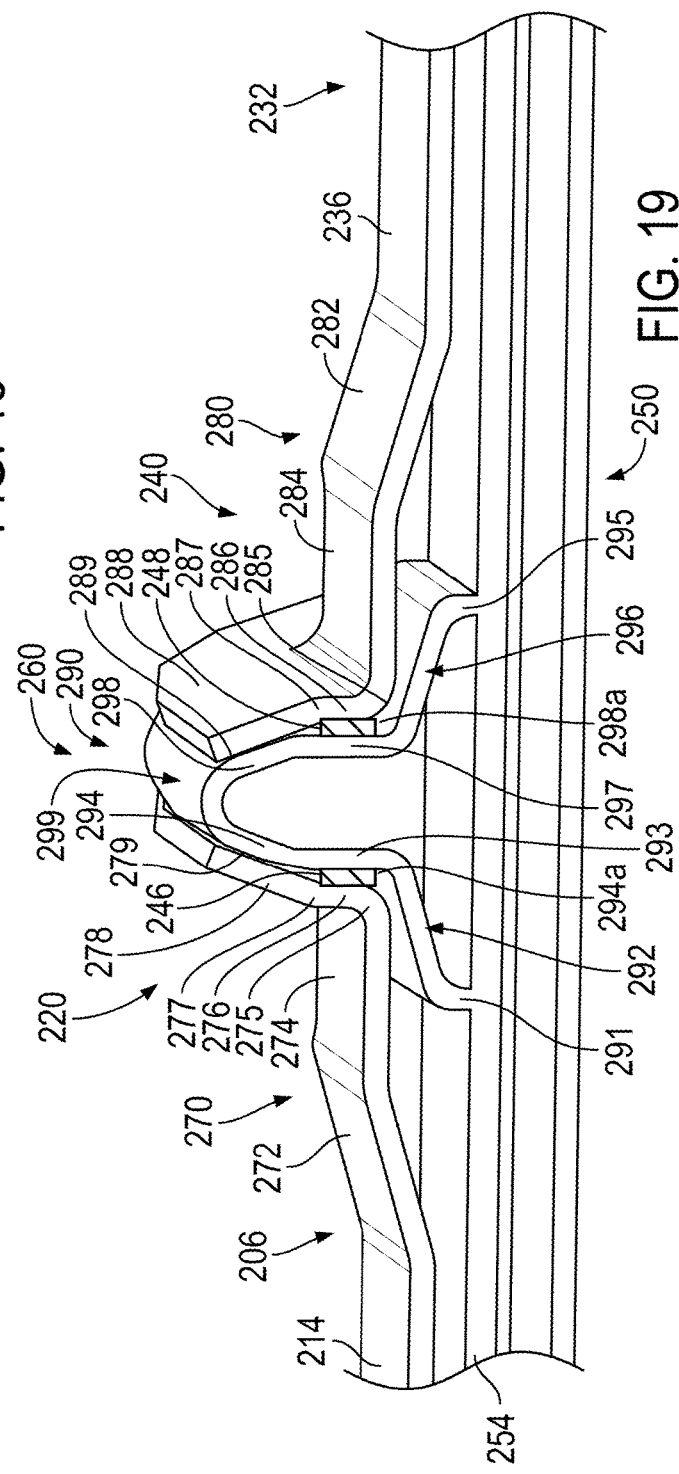

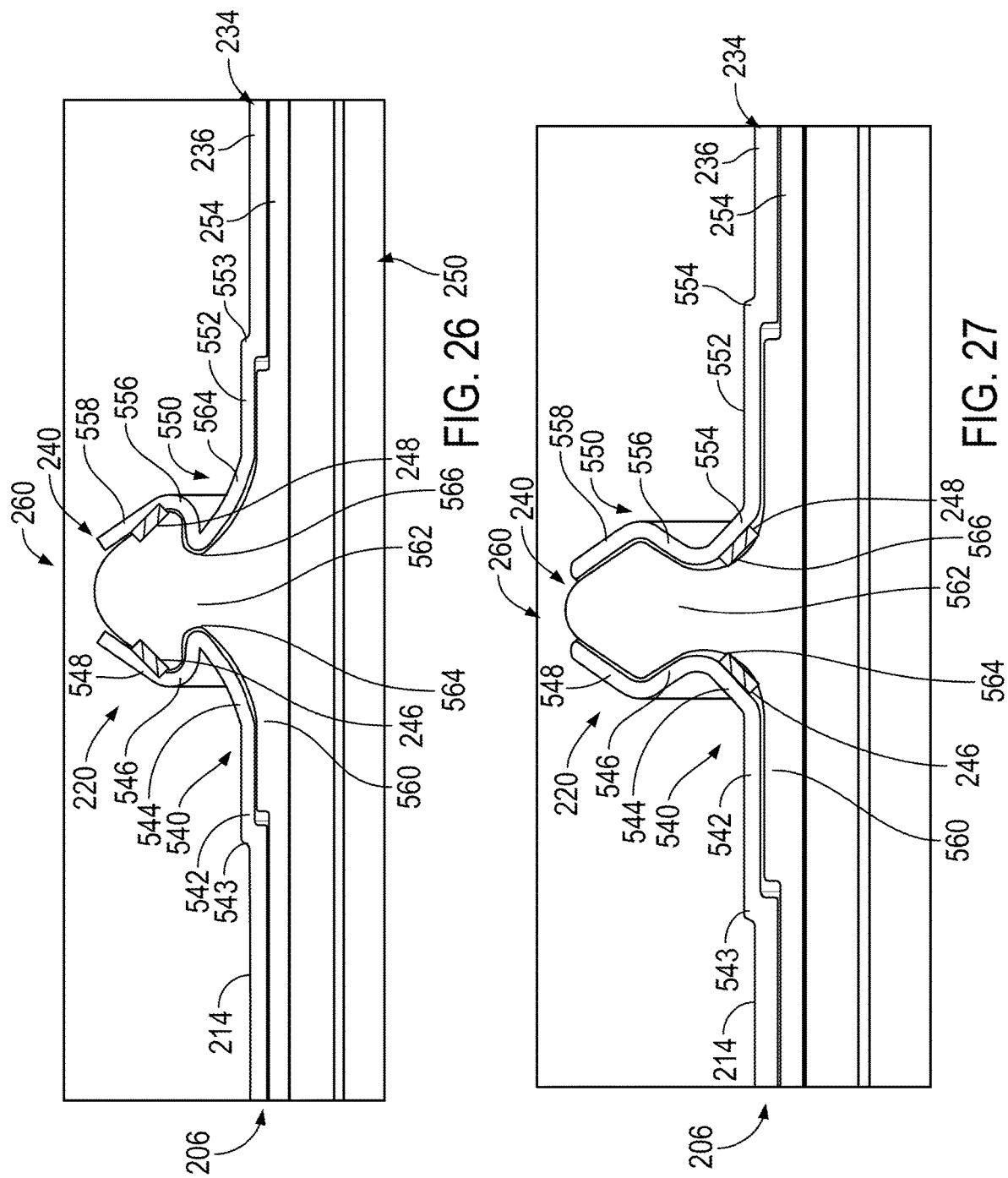

AFTERTREATMENT COMPONENT CARTRIDGE FOR AN AFTERTREATMENT SYSTEM

TECHNICAL FIELD

The present disclosure relates generally to an exhaust aftertreatment system for an internal combustion engine. More specifically, the present disclosure relates to coupling arrangements for an aftertreatment component cartridge of the exhaust aftertreatment system.

BACKGROUND

In an internal combustion engine system, an aftertreatment system is used to capture undesirable material and particulate from exhaust gas produced by a combustion of fuel. In assembling an engine system, an aftertreatment system may be provided in exhaust receiving communication with a cylinder block of the engine. However, the aftertreatment system may be complex, having numerous components and joints for coupling the components together.

SUMMARY

In one embodiment, an aftertreatment system includes an inlet body, a cartridge, and an outlet body. The inlet body includes an inlet body wall and an inlet engagement member. The inlet engagement member includes an inlet engagement member wall and an inlet coupling flange. The inlet engagement member wall extends outward from the inlet body wall. The inlet coupling flange extends in a downstream direction from the inlet engagement member wall. Part of the cartridge is positioned downstream of the inlet body. The cartridge includes a cartridge wall and an adaptor that extends away from the cartridge wall. Part of the outlet body is positioned downstream of the cartridge. The outlet body includes an outlet body wall and an outlet engagement member. The outlet engagement member includes an outlet engagement member wall and an outlet coupling flange. The outlet engagement member wall extends outward from the outlet body wall. The outlet coupling flange extends in an upstream direction from the outlet engagement member wall and towards the adaptor such that the adaptor is disposed between the inlet coupling flange and the outlet coupling flange.

In another embodiment, an aftertreatment system includes an inlet body, a cartridge, and an outlet body. The inlet body includes an inlet body wall and an inlet engagement member having an inlet coupling flange extending away outward from the inlet body. Part of the cartridge is positioned downstream of the inlet body. The cartridge includes a cartridge wall and an adaptor. The adaptor includes an adaptor wall first portion, an adaptor wall second portion, and an adaptor wall third portion. The adaptor wall first portion extends outward from the cartridge wall at a first angle with respect to an extending direction of the cartridge wall and continuous with the cartridge wall. The adaptor wall second portion extends outward from the adaptor wall first portion at a second angle with respect to the extending direction of the cartridge wall, the second angle being less than the first angle, and continuous with the adaptor wall first portion. The adaptor wall third portion extends outward from the adaptor wall second portion at a third angle with respect to the extending direction of the cartridge wall, the third angle being greater than the first angle, and continuous with the adaptor wall second portion. The adaptor wall third portion defines an adaptor coupling flange. A shape of the adaptor coupling flange conforms to a shape of the inlet coupling flange. Part of the outlet body is positioned downstream of the cartridge. The outlet body includes an outlet body wall and an outlet engagement member. The outlet engagement member includes an outlet engagement member wall first portion, an outlet engagement member wall second portion, and an outlet engagement member wall third portion. The outlet engagement member wall first portion extends outward from the outlet body wall at the first angle with respect to an extending direction of the outlet body wall and continuous with the outlet body wall. The outlet engagement member wall second portion extends outward from the outlet engagement member wall first portion at the second angle with respect to the extending direction of the outlet body wall and continuous with the outlet engagement member wall first portion. The outlet engagement member wall third portion extends outward from the outlet engagement member wall second portion at the third angle with respect to the extending direction of the outlet body wall and continuous with the second outlet engagement member wall portion. The outlet engagement member wall third portion defines an outlet coupling flange. A shape of the outlet engagement member conforms to a shape of the adaptor such that the adaptor coupling flange is disposed between the inlet coupling flange and the outlet coupling flange.

In yet another embodiment, an aftertreatment system includes an inlet body, a cartridge, and an outlet body. The inlet body includes an inlet body wall and an inlet engagement member. The inlet engagement member includes an inlet coupling flange that extends outward from the inlet body wall in a downstream direction. Part of the cartridge is positioned downstream of the inlet body. The cartridge includes a cartridge wall and an adaptor extending outward from the cartridge wall. The adaptor includes a base and a projection extending outward from the base. The projection defines an upstream recess and a downstream recess. Part of the outlet body is positioned downstream of the cartridge. The outlet body includes an outlet body wall and an outlet engagement member. The outlet engagement member includes an outlet coupling flange that extends outward from the outlet body wall in an upstream direction towards the adaptor. The upstream recess receives the inlet coupling flange. The downstream recess receives the outlet coupling flange.

BRIEF DESCRIPTION OF THE DRAWINGS

The disclosure will become more fully understood from the following detailed description, taken in conjunction with the accompanying Figures, wherein like reference numerals refer to like elements unless otherwise indicated, in which:

FIG. 18 is a detailed view of Detail E in FIG. 17, according to an example embodiment;

FIG. 19 is a cross-sectional view of the aftertreatment system shown in FIG. 17, according to another example embodiment;

FIG. 26 is a cross-sectional view of the aftertreatment system shown in FIG. 17, according to another example embodiment;

FIG. 27 is a cross-sectional view of the aftertreatment system shown in FIG. 17, according to another example embodiment;

Figure 1:
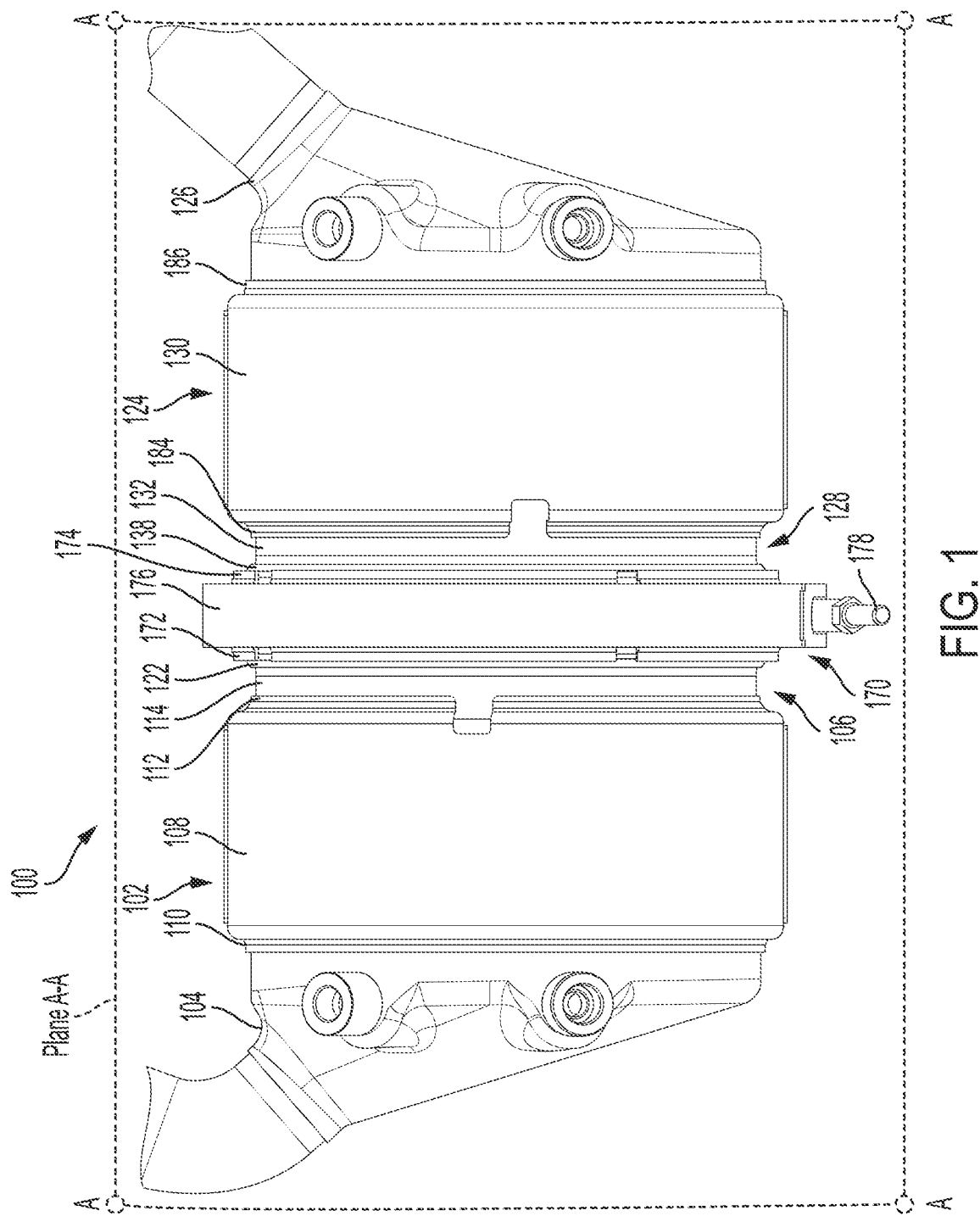
FIG. 1 is a side view of an example aftertreatment system.

It will be recognized that the Figures are the schematic representations for purposes of illustration. The Figures are provided for the purpose of illustrating one or more implementations with the explicit understanding that the Figures will not be used to limit the scope of the meaning of the claims.

DETAILED DESCRIPTION

Following below are more detailed descriptions of various concepts related to, and implementations of, methods, apparatuses, and for providing an aftertreatment component cartridge for an aftertreatment system. The various concepts introduced above and discussed in greater detail below may be implemented in any of a number of ways, as the described concepts are not limited to any particular manner of implementation. Examples of specific implementations and applications are provided primarily for illustrative purposes.

I. Overview

In order to reduce emissions, it may be desirable to treat exhaust gas using an aftertreatment system component. After the aftertreatment system component has treated a certain amount of exhaust gas, the aftertreatment system component may need to be serviced or replaced. Additionally, it may occasionally be desired to remove the aftertreatment component cartridge and replace the aftertreatment system component with a different aftertreatment system component, thereby repurposing the aftertreatment system from one application to another. Removing, servicing, and replacing the aftertreatment system component may be difficult or impossible in many aftertreatment systems because the aftertreatment system component is not removable and/or not easily accessible by a user. One approach for servicing and replacing of aftertreatment system components is to secure the aftertreatment system components to the aftertreatment system with multiple clamps. However, the use of multiple clamps increases the overall cost and space of the aftertreatment system, limiting the space available for other systems. The use of multiple clamps also reduces the area available on the exterior of the aftertreatment system for insulation. Furthermore, using multiple clamps increases the number of joints and openings for exhaust gas to escape, which may increase the temperature of the aftertreatment system exterior and surrounding components.

Aftertreatment systems are defined by a space claim, which is the amount of physical space that an aftertreatment system consumes when installed (e.g., on a vehicle, etc.) and the location (e.g., coordinates relative to a vehicle coordinate system, etc.) of the physical space that is consumed by the aftertreatment system when installed. In some applications, the physical space available for use by an aftertreatment system is limited due to the locations of surrounding components, wiring or piping requirements, or other similar constraints. As such, it is often difficult to modify an aftertreatment system because such modifications typically increase the space claim of the aftertreatment system. Such modifications may be desired to utilize various components, such as different types of filters or catalysts, in the aftertreatment system.

Implementations described herein are related to an aftertreatment system with an inlet conduit assembly, an outlet conduit assembly, and at least one aftertreatment component cartridge containing an aftertreatment system component. The inlet conduit assembly includes an inlet coupling flange portion, and the outlet conduit assembly includes an outlet coupling flange portion. The aftertreatment component cartridge includes an adaptor that cooperates with the inlet coupling flange and the outlet coupling flange and facilitates suspension of the aftertreatment system component within a housing by using a fastener (e.g., clamp, bolted joint, V-band body joint, etc.) to fix the aftertreatment component cartridge to the inlet body and outlet body. In this way, internal combustion engines utilizing the aftertreatment system described herein are more desirable than other aftertreatment systems with multiple clamps and that cannot be rapidly installed, serviced, replaced, and repurposed (e.g., by changing a type of one or more of the aftertreatment components, etc.). Furthermore, by configuring the inlet coupling flange and the outlet coupling flange and the adaptor to be held by a fastener in this arrangement, a space claim of the aftertreatment system described herein may be significantly smaller than other systems that do not utilize such an arrangement. Additionally, by using a fastener in this arrangement, there is increased area on an exterior of the aftertreatment system for insulation and a reduced number of joints and openings from which exhaust gas may escape.

II. Overview of Example Aftertreatment Systems

FIGS. 1-14 depict an aftertreatment system 100 (e.g., treatment system, etc.) for treating exhaust gas produced by an internal combustion engine (e.g., diesel internal combustion engine, gasoline internal combustion engine, hybrid internal combustion engine, propane internal combustion engine, dual-fuel internal combustion engine, etc.). As explained in more detail herein, the aftertreatment system 100 facilitates simplified and faster servicing than other systems (e.g., by changing a type of one or more of the aftertreatment components, etc.), thereby making the aftertreatment system 100 more desirable than other systems.

The aftertreatment system 100 includes an inlet conduit assembly 102 (e.g., line system, pipe system, etc.). The inlet conduit assembly 102 includes an inlet exhaust pipe 104 (e.g., pipe system, etc.) that receives an exhaust gas from an upstream component (e.g., header on the internal combustion engine, exhaust manifold on the internal combustion engine, the internal combustion engine, etc.). In some embodiments, the inlet exhaust pipe 104 is coupled (e.g., attached, fixed, welded, fastened, riveted, adhesively attached, bonded, pinned, etc.) to the upstream component. In other embodiments, the inlet exhaust pipe 104 is integrally formed with the upstream component.

The inlet conduit assembly 102 also includes an inlet body 106 (e.g., body, panel, etc.). The inlet conduit assembly 102 also includes an inlet shell 108 (e.g., shell, body, etc.). The inlet shell 108 surrounds the inlet body 106 to contain the inlet body 106. The inlet shell 108 includes a first inlet shell flange 110 (e.g. ring-shaped projection, circular protuberance, annular rib, etc.) to couple the inlet shell 108 to the inlet body 106. The inlet shell 108 also includes a second inlet shell flange 112 (e.g. ring-shaped projection, circular protuberance, annular rib, etc.) to couple the inlet shell 108 to the inlet body 106. The inlet body 106 includes an inlet body wall portion 114 (e.g., body, panel, etc.). The inlet body wall portion 114 receives the flow of exhaust gas from the inlet exhaust pipe 104.

In some embodiments, the inlet exhaust pipe 104 includes an inlet exhaust pipe flange 116 (e.g. ring-shaped projection, circular protuberance, annular rib, etc.) disposed between and coupled to the inlet body wall portion 114 and the first inlet shell flange 110. The inlet exhaust pipe flange 116 may facilitate coupling of the inlet exhaust pipe 104 to the inlet conduit assembly 102.

In some embodiments, the inlet conduit assembly 102 also includes an inlet insulator 118 (e.g., insulator, mat, etc.). The inlet insulator 118 is disposed between the inlet body wall portion 114 and the inlet shell 108. The inlet insulator 118 functions to mitigate increases in temperature of the inlet shell 108 as exhaust gas enters the inlet conduit assembly 102. The inlet insulator 118 may be, for example, an insulating mat, a mat of ceramic fibers, or other similar components.

The inlet body 106 also includes an inlet coupling flange portion 120 (e.g. ring-shaped projection, circular protuberance, annular rib, etc.). The inlet coupling flange portion 120 is downstream of the inlet body wall portion 114 and flares outwardly (e.g., radially outwardly and axially outwardly, etc.) from the inlet body wall portion 114. More specifically, the inlet coupling flange portion 120 extends along a slope from the inlet body wall portion 114. The slope has an angle along a reference plane bisecting the inlet body 106.

Figure 3:
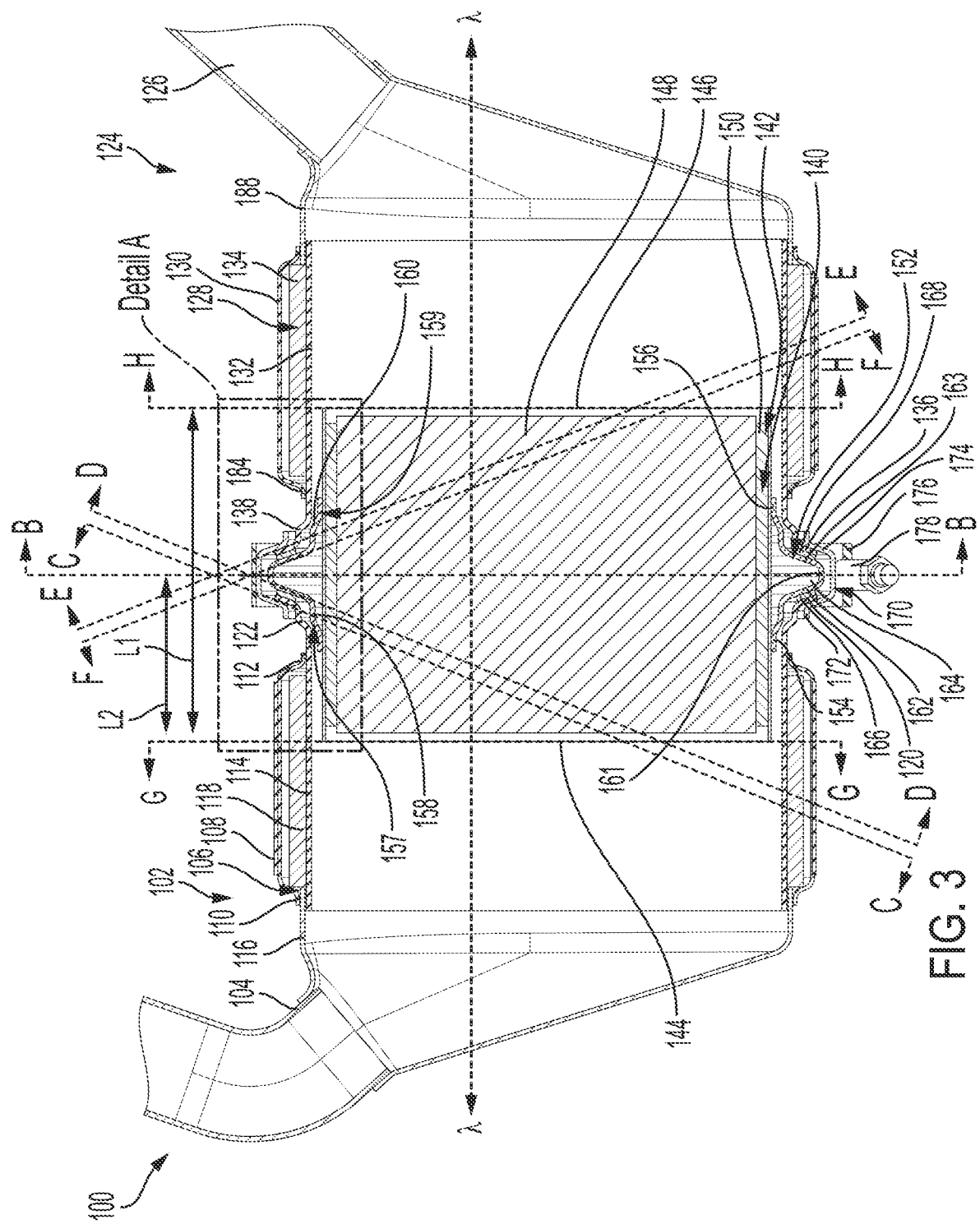
FIG. 3 is a cross-sectional view of the aftertreatment system shown in FIG. 1 taken along plane A-A, in an example embodiment.
Figure 4:
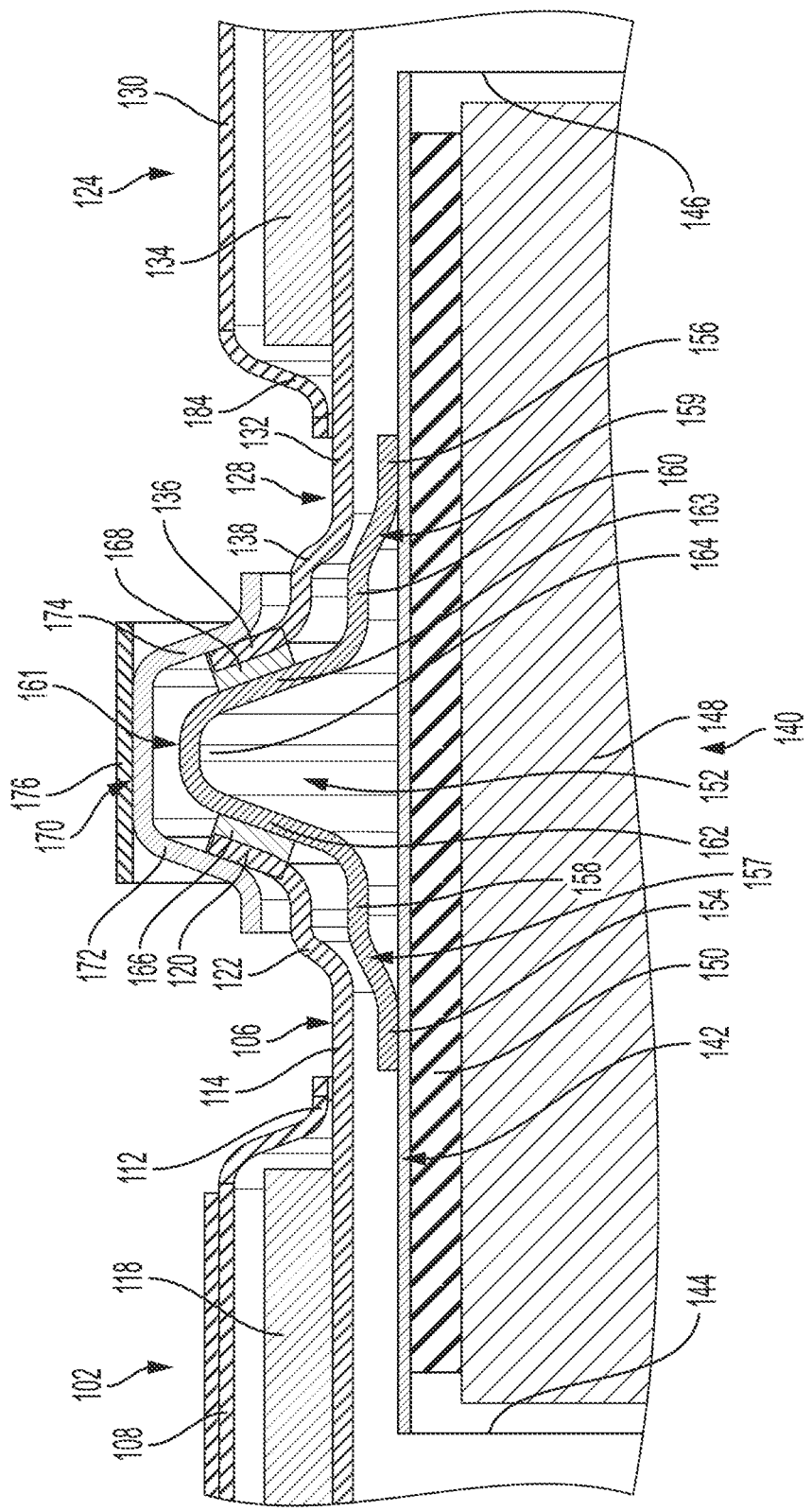
FIG. 4 is a detailed view of Detail A in FIG. 3.
Figure 5:
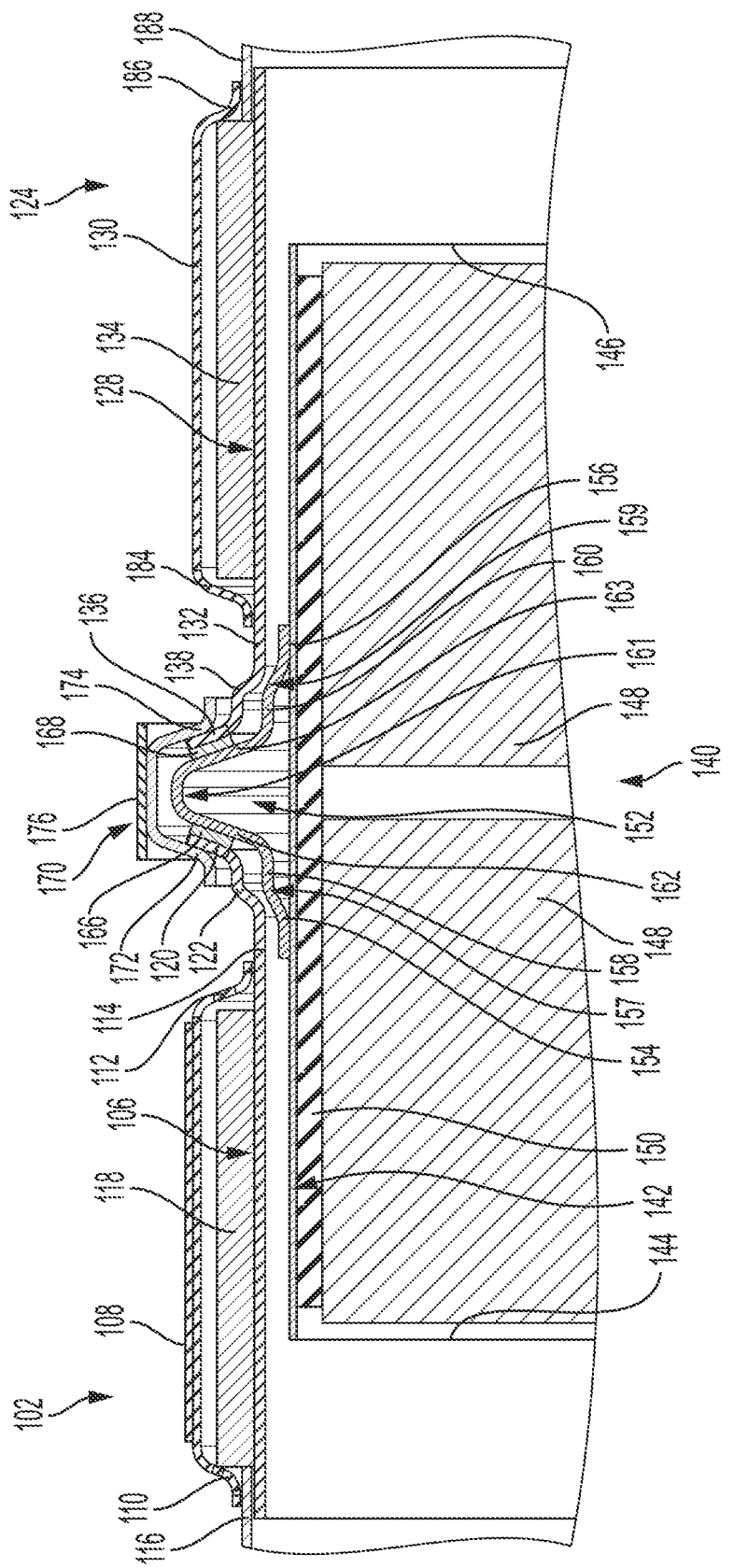
FIG. 5 is a cross-sectional view of an example aftertreatment system shown in FIG. 1 taken along plane A-A, in an example embodiment.
Figure 6:
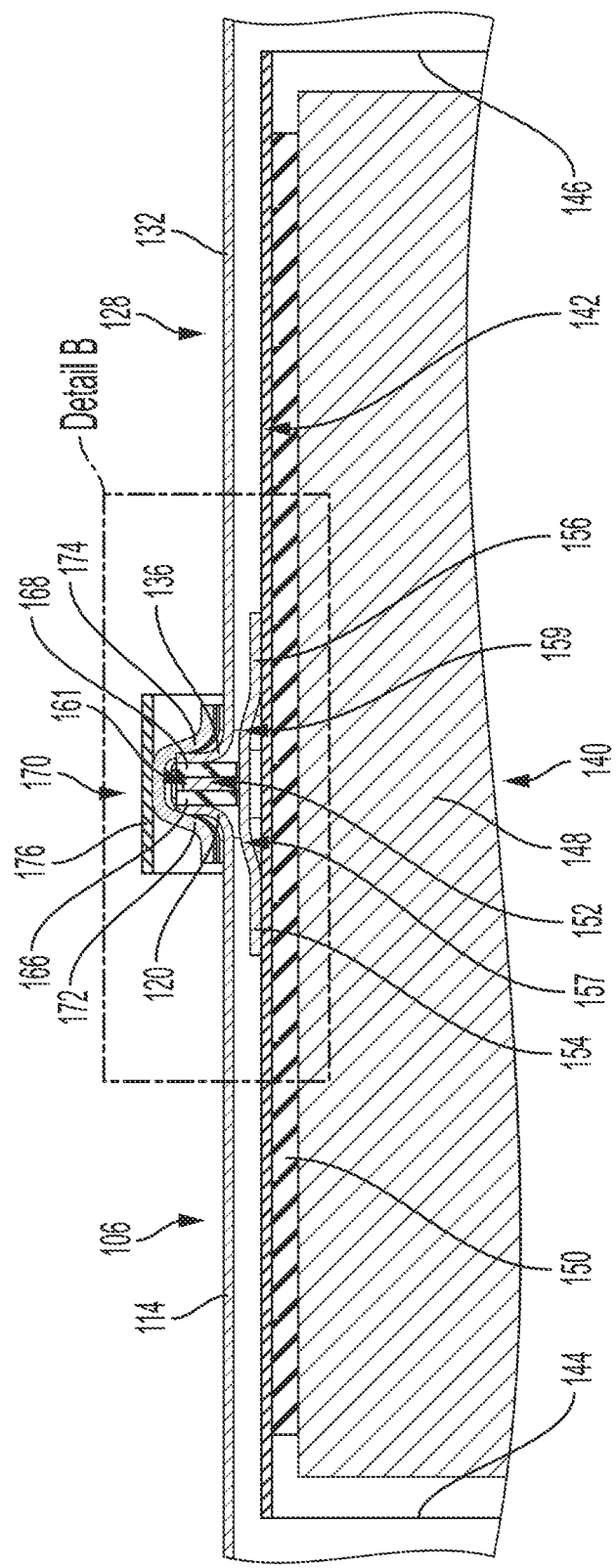
FIG. 6 is a cross-sectional view of the aftertreatment system shown in FIG. 1 taken along plane A-A, in an example embodiment.
Figure 7:
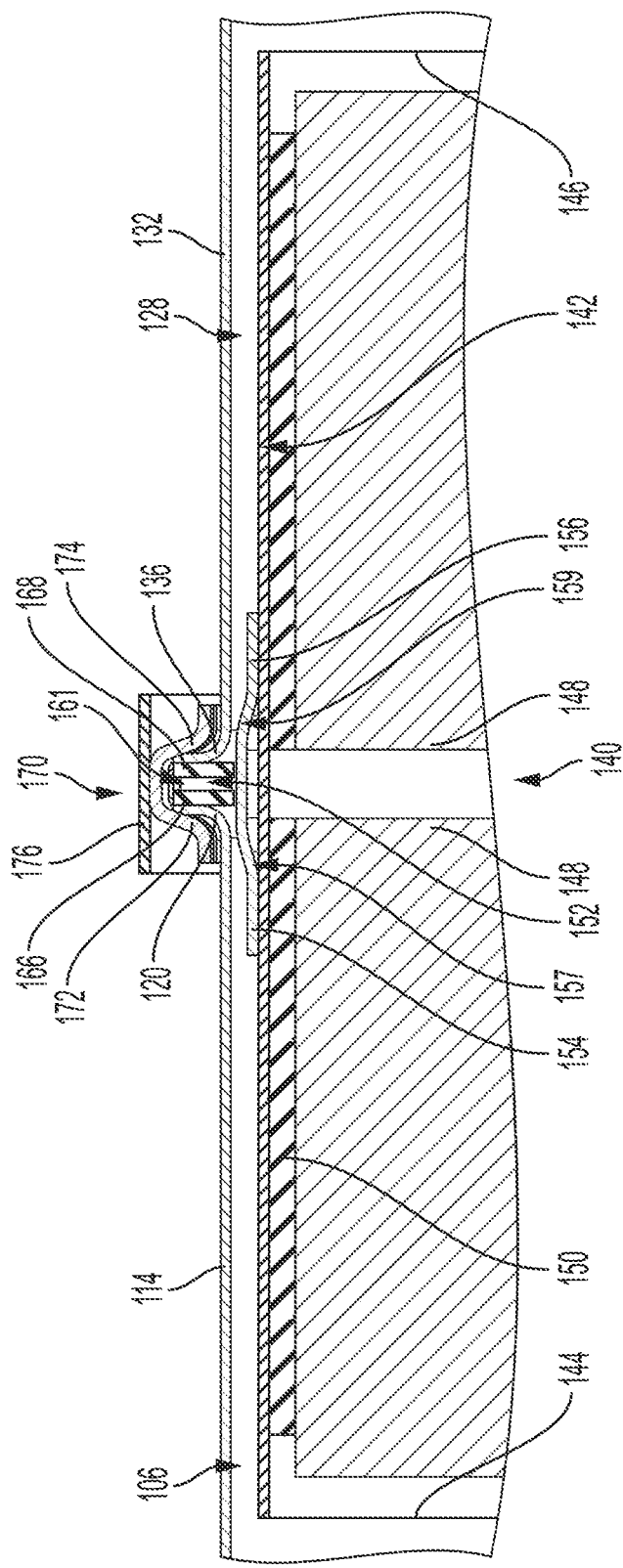
FIG. 7 is a cross-sectional view of the aftertreatment system shown in FIG. 1 taken along plane A-A, in an example embodiment.

In some embodiments, the inlet body 106 also includes an inlet curved portion 122, as seen in FIGS. 3-5. The inlet curved portion 122 is contiguous with the inlet body wall portion 114 and the inlet coupling flange portion 120. Similar to the inlet coupling flange portion 120, the inlet curved portion 122 is flared outwardly. More specifically, the inlet curved portion 122 extends along a slope from the inlet body wall portion 114, and the inlet coupling flange portion 120 extends along a slope from the inlet curved portion 122. As a result, the inlet curved portion 122 creates a gap in the interior of the aftertreatment system 100 to accommodate another component, such as described in more detail herein. The slopes have angles along a reference plane bisecting the inlet body 106. The angle of the slope of the inlet coupling flange portion 120 is greater than the angle of the slope of the inlet curved portion 122 (e.g., where the angle is measured in the counterclockwise direction in FIG. 4, etc.). For example, the difference in angle may be approximately equal to between 10 degrees and 30 degrees. This difference in angle enables the inlet body 106 to have a shape that facilitates coupling to other components of the aftertreatment system 100, as described in more detail herein.

Referring back to FIGS. 1-14, as explained in more detail below, the aftertreatment system 100 also includes an outlet conduit assembly 124 (e.g., line system, pipe system, etc.). As is explained in more detail herein, the outlet conduit assembly 124 is configured to provide the exhaust gas from the aftertreatment system 100 (e.g., to downstream components, to atmosphere, etc.).

The outlet conduit assembly 124 includes an outlet exhaust pipe 126 (e.g., line system, pipe system, etc.). The outlet exhaust pipe 126 provides the exhaust gas from the aftertreatment system 100. The outlet conduit assembly 124 also includes an outlet body 128 (e.g., body, panel, etc.). The outlet conduit assembly 124 also includes an outlet shell 130 (e.g., shell, body, etc.). The outlet shell 130 surrounds the outlet body 128 to contain the outlet body 128. The outlet body 128 includes an outlet body wall portion 132 (e.g., body, panel, etc.).

In some embodiments, the outlet conduit assembly 124 also includes an outlet insulator 134 (e.g., insulator, mat, etc.). The outlet insulator 134 is disposed between the outlet body wall portion 132 and the outlet shell 130. The outlet insulator 134 functions to mitigate an increase in temperature of the outlet shell 130. The inlet insulator 118 may be, for example, an insulating mat, a mat of ceramic fibers, or other similar components.

The outlet body 128 also includes an outlet coupling flange portion 136 (e.g., ring-shaped projection, circular protuberance, annular rib, etc.). The outlet coupling flange portion 136 is upstream of the outlet body wall portion 132 and flares outwardly from the outlet body wall portion 132. More specifically, the outlet coupling flange portion 136 extends along a slope from the outlet body wall portion 132. The outlet coupling flange portion 136 extends along a slope from the outlet body wall portion 132 in a first direction and the inlet coupling flange portion 120 extends along a slope from the inlet body wall portion 114 in a second direction that is opposite to the first direction. The outlet coupling flange portion 136 extends along a slope from the outlet body wall portion 132 is a first direction and the inlet coupling flange portion 120 extends along a slope from the inlet body wall portion 114 in the first direction.

In some embodiments, the outlet body 128 also includes an outlet curved portion 138, as seen in FIGS. 3-5. The outlet curved portion 138 is contiguous with the outlet body wall portion 132 and the outlet coupling flange portion 136. Similar to the outlet coupling flange portion 136, the outlet curved portion 138 is flared outwardly. More specifically, the outlet curved portion 138 extends along a slope from the outlet body wall portion 132, and the outlet coupling flange portion 136 extends along a slope from the outlet curved portion 138. The outlet curved portion 138 extends along a slope from the outlet body wall portion 132 in a first direction and the inlet coupling flange portion 120 extends along a slope from the inlet body wall portion 114 in a second direction that is opposite to the first direction. The outlet curved portion 138 extends along a slope from the outlet body wall portion 132 is a first direction and the inlet coupling flange portion 120 extends along a slope from the inlet body wall portion 114 in the first direction. As a result, the outlet curved portion 138 creates a gap in an interior of the aftertreatment system 100 that can receive another component, such as described in more detail herein. The slopes have angles along a reference plane bisecting the outlet body 128. The angle of the slope of the outlet curved portion 138 is greater than the angle of the slope of the outlet coupling flange portion 136 (e.g., where the angle is measured in the counterclockwise direction in FIG. 4, etc.). For example, the difference in angle may be approximately equal to between 10 degrees and 30 degrees. This difference in angle enables the outlet body 128 to have a shape that facilitates coupling to other components of the aftertreatment system 100, as described in more detail herein.

Figure 2:
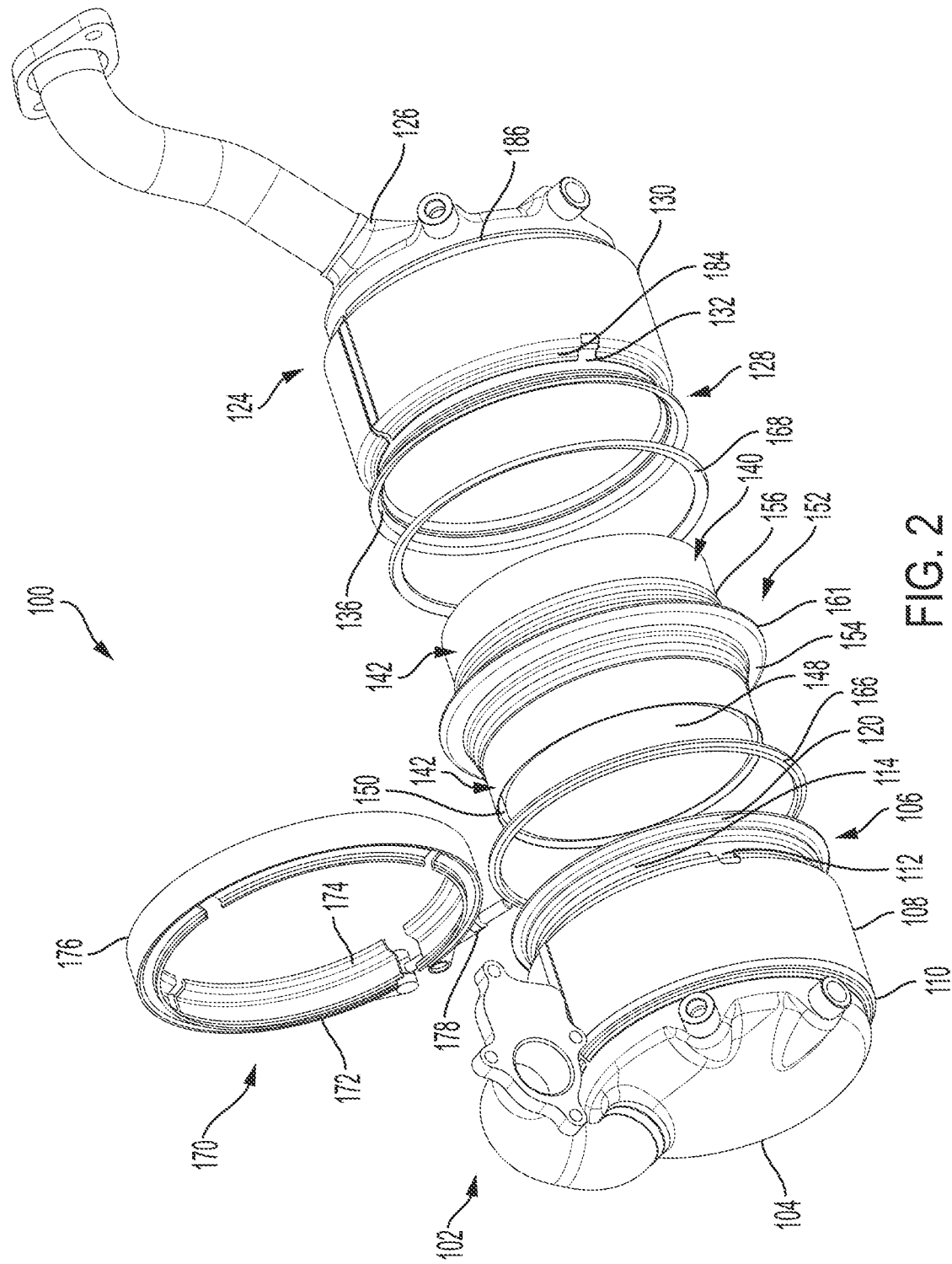
FIG. 2 is a perspective exploded view of the aftertreatment system shown in FIG. 1.

In FIGS. 2-4, the aftertreatment system 100 includes an aftertreatment component cartridge 140 (e.g., cartridge, insert, etc.). As explained in more detail herein, the inlet coupling flange portion 120 and the outlet coupling flange portion 136 cooperate to facilitate suspension of the aftertreatment component cartridge 140 within the inlet body 106 and the outlet body 128.

As shown in FIG. 4, the aftertreatment component cartridge 140 includes an aftertreatment component housing 142 (e.g., filtering housing, etc.). The aftertreatment component housing 142 facilitates flow of the exhaust gas from the inlet conduit assembly 102 into the aftertreatment component cartridge 140.

The aftertreatment component housing 142 includes an inlet portion 144. The inlet portion 144 is inserted into the inlet conduit assembly 102. The inlet portion 144 receives the exhaust gas from the inlet conduit assembly 102, and provides the exhaust gas into the aftertreatment component cartridge 140. The aftertreatment component housing 142 also includes an outlet portion 146. The outlet portion 146 is inserted into the outlet conduit assembly 124. The outlet portion 146 receives the exhaust gas from the aftertreatment component cartridge 140, and provides the exhaust gas from the aftertreatment component cartridge 140.

As shown in FIGS. 2-4, the aftertreatment component cartridge 140 includes an aftertreatment system component 148. The aftertreatment system component 148 is positioned within the aftertreatment component housing 142. The aftertreatment system component 148 treats the exhaust gas produced by an internal combustion engine. In some embodiments, the aftertreatment system component 148 reduces the emission of undesirable components (e.g., nitrogen oxides ($NO_x$), etc.) in the exhaust gas. In some embodiments, the aftertreatment system component 148 facilitates the removal of particulate (e.g., soot, particulate matter, etc.) from the exhaust gas by a filtration member (e.g., a diesel particulate filter (DPF), etc.). In other embodiments, the aftertreatment system component 148 is a conversion catalyst member (e.g., selective catalytic reduction (SCR) conversion catalyst member, catalyst metals, etc.) that facilitates conversion of various oxidation components (e.g., carbon monoxide (CO), hydrocarbons, etc.) of the exhaust gas into other components (e.g., carbon dioxide ($CO_2$), water vapor, etc.).

As seen in FIGS. 5, 7, 10, and 13, the aftertreatment component cartridge 140 is not limited to housing a single aftertreatment system component 148. Rather, the aftertreatment component cartridge 140 may contain more than one aftertreatment system component 148, each aftertreatment system component 148 able to be any of the embodiments described herein. In some embodiments, both of the aftertreatment system components 148 are the same. For example, both of the aftertreatment system components 148 may be conversion catalyst members. In another example, both of the aftertreatment system components 148 may be filtration members. In other embodiments, the aftertreatment system components 148 are different from one another. For example, the upstream aftertreatment system component 148 may be a filtration member and the downstream aftertreatment system component 148 may be a conversion catalyst member.

In some embodiments, the aftertreatment component cartridge 140 also includes a mounting mat 150 (e.g., compressible mat, etc.). The mounting mat 150 is disposed between the aftertreatment system component 148 and the aftertreatment component housing 142. The mounting mat 150 may facilitate coupling of the aftertreatment system component 148 and the aftertreatment component housing 142.

Referring back to FIG. 4, the aftertreatment component cartridge 140 includes an adaptor 152 (e.g., projection, protuberance, rib, etc.). The adaptor 152 is coupled to the aftertreatment component housing 142. The adaptor 152 cooperates with the aftertreatment component housing 142, the inlet coupling flange portion 120, and the outlet coupling flange portion 136 to facilitate suspension of the aftertreatment component cartridge 140 within the inlet body 106 and the outlet body 128 when a compressive force is applied to the adaptor 152. Different embodiments of the adaptor 152 enable use of different fasteners (e.g., clamps, compression joints, V-band body joints, etc.) to compress the adaptor 152 and suspend the aftertreatment component cartridge 140 within the inlet body 106 and the outlet body 128, as described in more detail herein.

In some embodiments, the adaptor 152 comprises a first flange portion 154 (e.g., ring, etc.) coupled to the inlet portion 144, and a second flange portion 156 (e.g., ring, etc.) coupled to the outlet portion 146. By coupling the first flange portion 154 to the inlet portion 144 and the second flange portion 156 to the outlet portion 146, the first flange portion 154 and the second flange portion 156 facilitate suspension of the aftertreatment component cartridge 140 within the inlet body 106 and the outlet body 128 when a compressive force is applied to the adaptor 152. When the first flange portion 154 is coupled to the inlet portion 144, the first flange portion 154 is disposed between the inlet body wall portion 114 and the inlet portion 144. Similarly, when the second flange portion 156 is coupled to the outlet portion 146, the second flange portion 156 is disposed between the outlet body wall portion 132 and the outlet portion 146. In some embodiments, a user may receive the aftertreatment component cartridge 140 with the first flange portion 154 already coupled to the inlet portion 144 and the second flange portion 156 already coupled to the outlet portion 146.

In other embodiments, the first flange portion 154 and the second flange portion 156 are initially separate from the inlet portion 144 and the outlet portion 146, respectively. In these embodiments, a user may couple the first flange portion 154 to the inlet portion 144 and the second flange portion 156 to the outlet portion 146 during an installation process (e.g., method, etc.) for installing an aftertreatment component cartridge 140 of the aftertreatment system 100. Various examples of such an installation process are described with reference to FIG. 15.

In some embodiments, the adaptor 152 includes a first connecting wall portion 157. The first connecting wall portion 157 is contiguous with the first flange portion 154. A portion of the first connecting wall portion 157 extends along a slope from the first flange portion 154. As shown in FIG. 3, the first connecting wall portion 157 includes a first flat portion 158. The first flat portion 158 is contiguous with the first connecting wall portion 157. The first flat portion 158 is parallel to a center axis 2.

Similarly, in some embodiments, the adaptor 152 includes a second connecting wall portion 159. The second connecting wall portion 159 is contiguous with the second flange portion 156. A portion of the second connecting wall portion 159 extends along a slope from the second flange portion 156. As shown in FIG. 3, the second connecting wall portion 159 includes a second flat portion 160. The second flat portion 160 is contiguous with the second connecting wall portion 159. The second flat portion 160 is parallel to the center axis λ.

Further, the adaptor 152 includes a coupler portion 161 (e.g. ring-shaped projection, circular protuberance, annular rib, etc.), as seen in FIG. 4. The coupler portion 161 is disposed between and connects the first flange portion 154 and the second flange portion 156. In this way, when a compressive force is applied to the adaptor 152, the coupler portion 161 enables the first flange portion 154 to suspend the inlet portion 144 while also enabling the second flange portion 156 to suspend the outlet portion 146. Additionally, the coupler portion 161 extends between the inlet coupling flange portion 120 of the inlet body 106 and the outlet coupling flange portion 136 of the outlet body 128.

In some embodiments, the coupler portion 161 includes a first coupling wall portion 162 (e.g., plate, body, etc.). The first coupling wall portion 162 cooperates with the inlet coupling flange portion 120 to suspend the aftertreatment component cartridge 140. Similarly, the coupler portion 161 includes a second coupling wall portion 163 (e.g., plate, body, etc.). The second coupling wall portion 163 cooperates with outlet coupling flange portion 136 to suspend the aftertreatment component cartridge 140.

The first coupling wall portion 162 is downstream of and contiguous with the first flange portion 154. The first coupling wall portion 162 extends along a slope from the first flange portion 154 such that the first coupling wall portion 162 is parallel with the inlet coupling flange portion 120, resulting in the inlet coupling flange portion 120 and the first coupling wall portion 162 being in confronting relation. The slopes have angles along a reference plane bisecting the adaptor 152. The angle of the slope of the first coupling wall portion 162 is greater than the angle of the slope of the first connecting wall portion 157 (e.g., where the angle is measured in the counterclockwise direction in FIG. 4, etc.). For example, the difference in angle may be approximately equal to between 20 degrees and 80 degrees. This difference in angle enables the adaptor 152 to have a shape that facilitates coupling to other components of the aftertreatment system 100, as described in more detail herein. In some embodiments, the first coupling wall portion 162 is contiguous with the first connecting wall portion 157, and a portion of the first coupling wall portion 162 extends along a slope from the first connecting wall portion 157.

The second coupling wall portion 163 is upstream of and contiguous with the second flange portion 156. The second coupling wall portion 163 extends along a slope from the second flange portion 156 such that the second coupling wall portion 163 is parallel with the outlet coupling flange portion 136, resulting in the outlet coupling flange portion 136 and second coupling wall portion 163 being in confronting relation. The slopes have angles along a reference plane bisecting the adaptor 152. The angle of the slope of the second connecting wall portion 159 is greater than the angle of the slope of the second coupling wall portion 163 (e.g., where the angle is measured in the counterclockwise direction in FIG. 4, etc.). For example, the difference in angle may be approximately equal to between 20 degrees and 80 degrees. This difference in angle enables the adaptor 152 to have a shape that facilitates coupling to other components of the aftertreatment system 100, as described in more detail herein. In some embodiments, the second coupling wall portion 163 is contiguous with the second connecting wall portion 159, and a portion of the second coupling wall portion 163 extends along a slope from the second connecting wall portion 159.

Consequently, when a compressive force is applied to the inlet coupling flange portion 120 and the outlet coupling flange portion 136, the compressive force is also applied to the first coupling wall portion 162 and the second coupling wall portion 163, enabling the adaptor 152 to suspend the aftertreatment system component 148 within the inlet body 106 and the outlet body 128.

The adaptor 152 also includes a radial wall portion 164 (e.g., plate, body, etc.). The radial wall portion 164 extends between the first coupling wall portion 162 and the second coupling wall portion 163 is. The radial wall portion 164 is contiguous with the first coupling wall portion 162 and the second coupling wall portion 163 and is radially separated from the aftertreatment component housing 142.

Referring to FIGS. 2-4, in some embodiments, the aftertreatment system 100 includes a first gasket 166 (e.g., spacers, seals, plugs, etc.). The first gasket 166 may be made of a compressible material (e.g., rubber, elastomer, etc.). The first gasket 166 is disposed between the inlet coupling flange portion 120 and the first coupling wall portion 162 such that the first gasket 166 is separated from the aftertreatment component housing 142 by the adaptor 152. The first gasket 166 establishes a seal between the inlet coupling flange portion 120 and the first coupling wall portion 162. In this way, when a compressive force is applied to the inlet coupling flange portion 120, the first gasket 166 is compressed between the inlet coupling flange portion 120 and the first coupling wall portion 162.

Similarly, the aftertreatment system 100 may include a second gasket 168 (e.g., spacers, seals, plugs, etc.). The second gasket 168 may be made of a compressible material (e.g. rubber, elastomer, etc.). The second gasket 168 is disposed between the outlet coupling flange portion 136 and the second coupling wall portion 163 such that the second gasket 168 is separated from the aftertreatment component housing 142 by the adaptor 152. The second gasket 168 establishes a seal between the outlet coupling flange portion 136 and the second coupling wall portion 163. In this way, when a compressive force is applied to the outlet coupling flange portion 136, the second gasket 168 is compressed between the outlet coupling flange portion 136 and the second coupling wall portion 163. Both the first gasket 166 and second gasket 168 may be creep resistant so that joint preload does not substantially decrease over prolonged compression of the inlet coupling flange portion 120 and the outlet coupling flange portion 136 with the first coupling wall portion 162 and the second coupling wall portion 163.

In another embodiment, only the first gasket 166 is utilized. When only the first gasket 166 is utilized, the first gasket 166 is disposed between the first coupling wall portion 162, the inlet coupling flange portion 120, the second coupling wall portion 163, and the outlet coupling flange portion 136 such that the first gasket 166 is separated from the aftertreatment component housing 142 by the adaptor 152. The first gasket 166 establishes a seal between the first coupling wall portion 162, the inlet coupling flange portion 120, the second coupling wall portion 163, and the outlet coupling flange portion 136. In this way, when a compressive force is applied to the inlet coupling flange portion 120, the first gasket 166 is compressed between the inlet coupling flange portion 120 and the first coupling wall portion 162. When a compressive force is applied to the outlet coupling flange portion 136, the first gasket 166 is compressed between the outlet coupling flange portion 136 and the second coupling wall portion 163. The first gasket 166 may be creep resistant so that joint preload does not substantially decrease over prolonged compression of the inlet coupling flange portion 120 and the outlet coupling flange portion 136 with the first coupling wall portion 162 and second coupling wall portion 163.

Referring back to FIG. 3, in some embodiments, the aftertreatment system 100 is centered on the center axis λ. The aftertreatment component cartridge 140 is bisected by the radial plane B-B that intersects the center axis λ and is orthogonal to the center axis λ. Further, at least a portion of the inlet coupling flange portion 120 is disposed along an inlet coupling flange plane C-C. The inlet coupling flange plane C-C is separated from the radial plane B-B by an angle that is approximately equal to between 10 degrees and 30 degrees (e.g., 5 degrees, 10 degrees, 15 degrees, 25 degrees, 30 degrees, 35 degrees, etc.). Similarly, at least a portion of the first coupling wall portion 162 is disposed along a first coupling wall plane D-D. The first coupling wall plane D-D is separated from the radial plane B-B by an angle that is approximately equal to between 10 degrees and 30 degrees (e.g., 5 degrees, 10 degrees, 15 degrees, 25 degrees, 30 degrees, 35 degrees, etc.).

In some of these embodiments, the inlet coupling flange plane C-C and the first coupling wall plane D-D are separated from the radial plane B-B by equal angles. Therefore, the first coupling wall portion 162 is parallel with the inlet coupling flange portion 120.

In some embodiments, at least a portion of the outlet coupling flange portion 136 is disposed along an outlet coupling flange plane E-E. The outlet coupling flange plane E-E is separated from the radial plane B-B by an angle that is approximately equal to between 280 degrees and 300 degrees (e.g., 275 degrees, 280 degrees, 285 degrees, 295 degrees, 300 degrees, 305 degrees, etc.). Similarly, at least a portion of the second coupling wall portion 163 is disposed along a second coupling wall plane F-F. The second coupling wall plane F-F is separated from the radial plane B-B by an angle that is approximately equal to between 280 degrees and 300 degrees (e.g., 275 degrees, 280 degrees, 285 degrees, 295 degrees, 300 degrees, etc.).

In some of these embodiments, the outlet coupling flange plane E-E and the second coupling wall plane F-F are separated from the radial plane B-B by equal angles. Therefore, the second coupling wall portion 163 is parallel with the outlet coupling flange portion 136.

As previously mentioned, different embodiments of the adaptor 152 enable different fasteners to be used to compress the adaptor 152 and facilitate suspension of the aftertreatment component cartridge 140 within the inlet body 106 and the outlet body 128. FIGS. 6-11 are cross-sectional views of the aftertreatment system 100 depicting embodiments with different adaptors 152. For example, in the embodiments in FIGS. 6-8, the coupler portion 161 of the adaptor 152 is coupled to the first flange portion 154 and the second flange portion 156. The coupler portion 161 is positioned radially outward from the aftertreatment component housing 142 such that the coupler portion 161 is orthogonal to the aftertreatment component housing 142. When a compressive force is applied to the inlet coupling flange portion 120 and the outlet coupling flange portion 136, the coupler portion 161 is compressed between the inlet coupling flange portion 120 and the outlet coupling flange portion 136. By compressing the coupler portion 161, the adaptor 152 is able to suspend the aftertreatment system component 148 within the aftertreatment system 100 by fixing the aftertreatment component cartridge 140 to the inlet body 106 and the outlet body 128.

Figure 8:
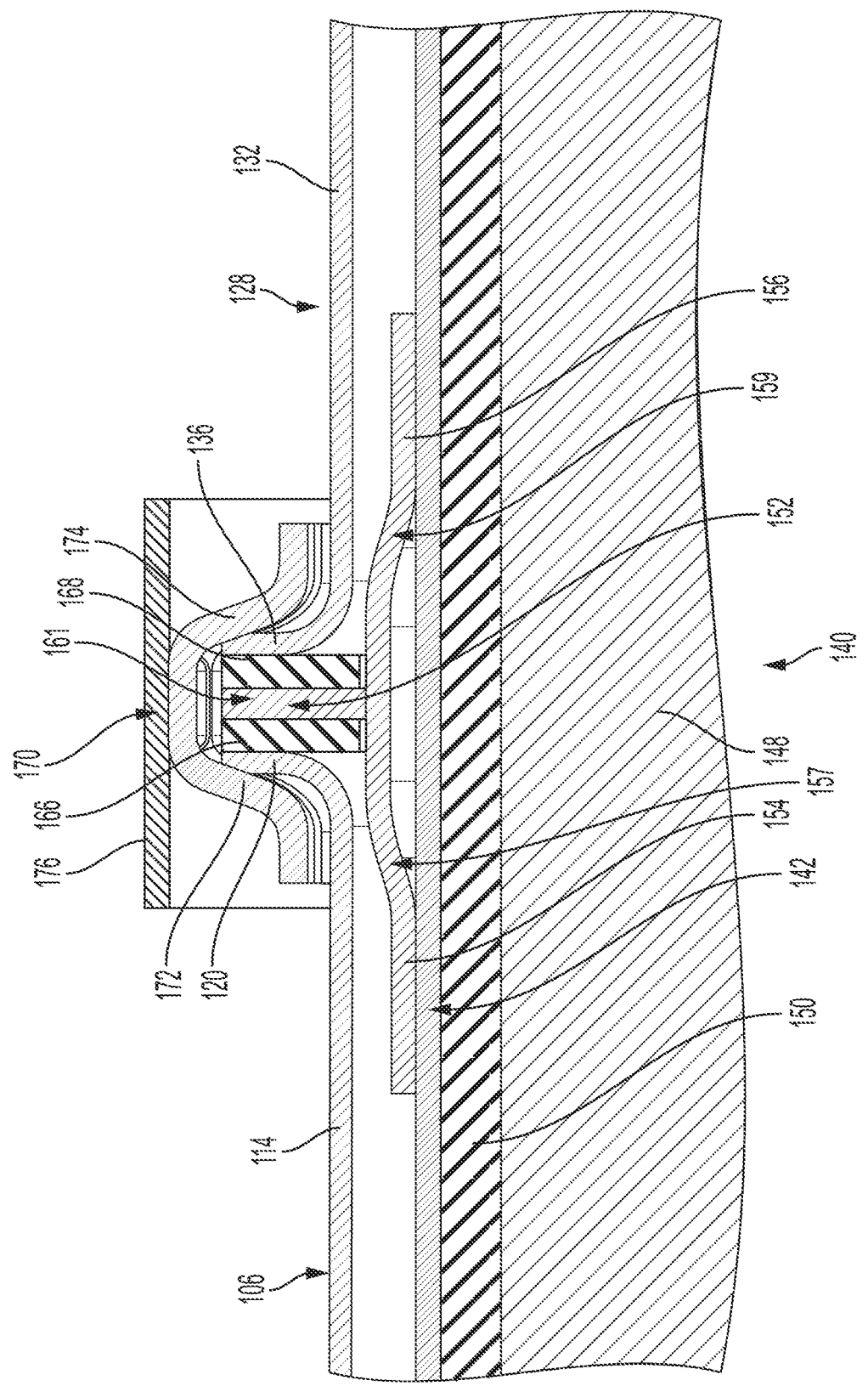
FIG. 8 is a detailed view of Detail B in FIG. 6.
Figure 9:
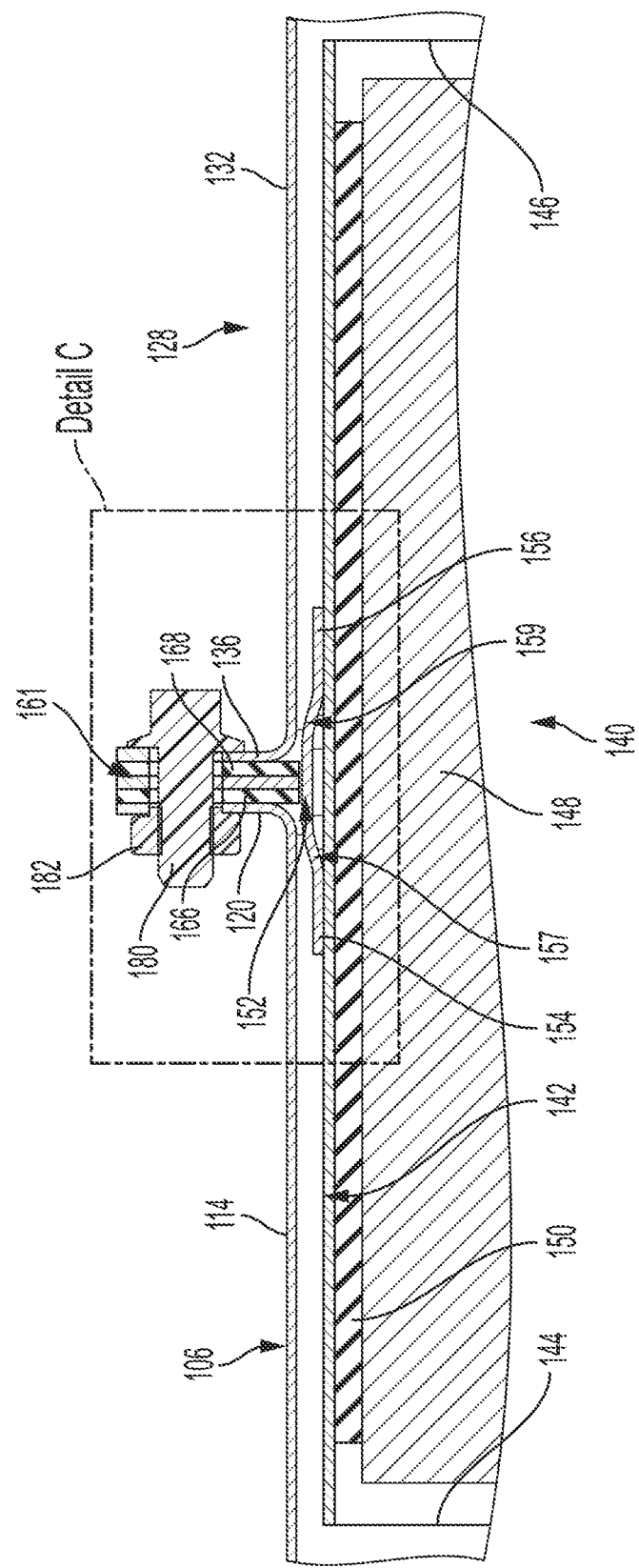
FIG. 9 is a cross-sectional view of the aftertreatment system shown in FIG. 1 taken along plane A-A, in an example embodiment.
Figure 10:
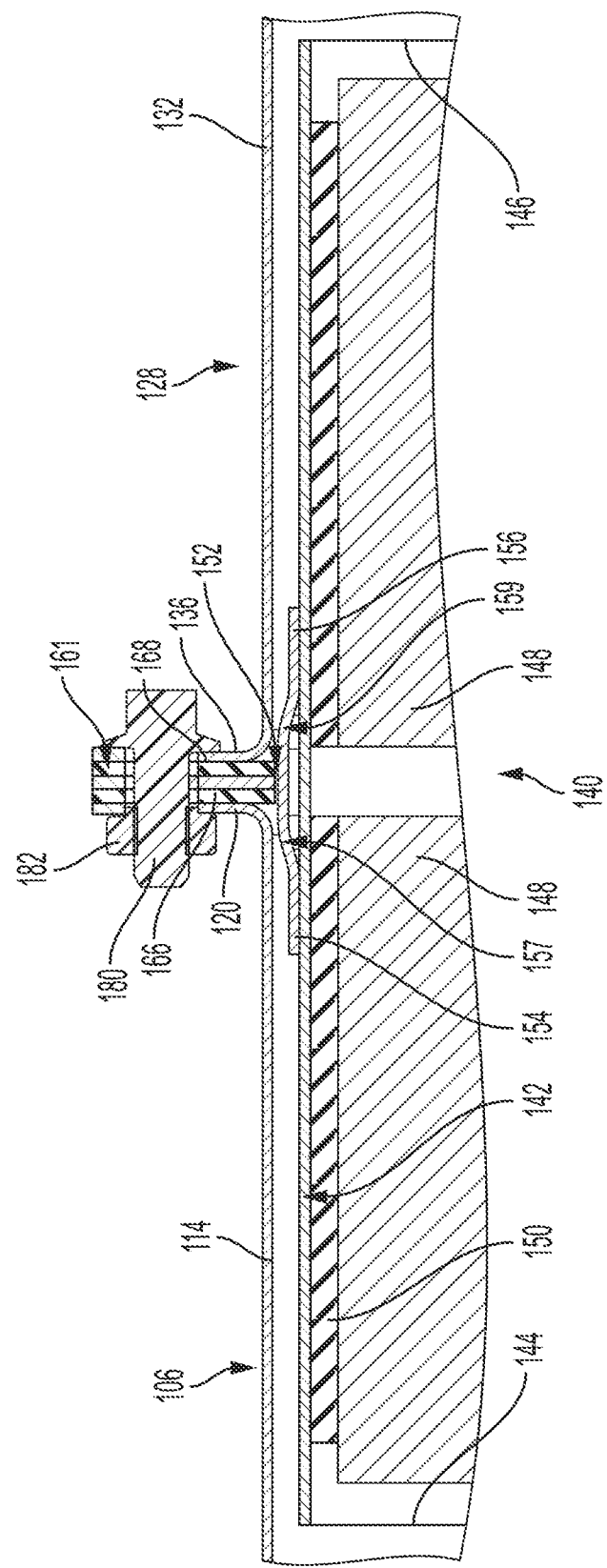
FIG. 10 is a cross-sectional view of the aftertreatment system shown in FIG. 1 taken along plane A-A, in an example embodiment.
Figure 11:
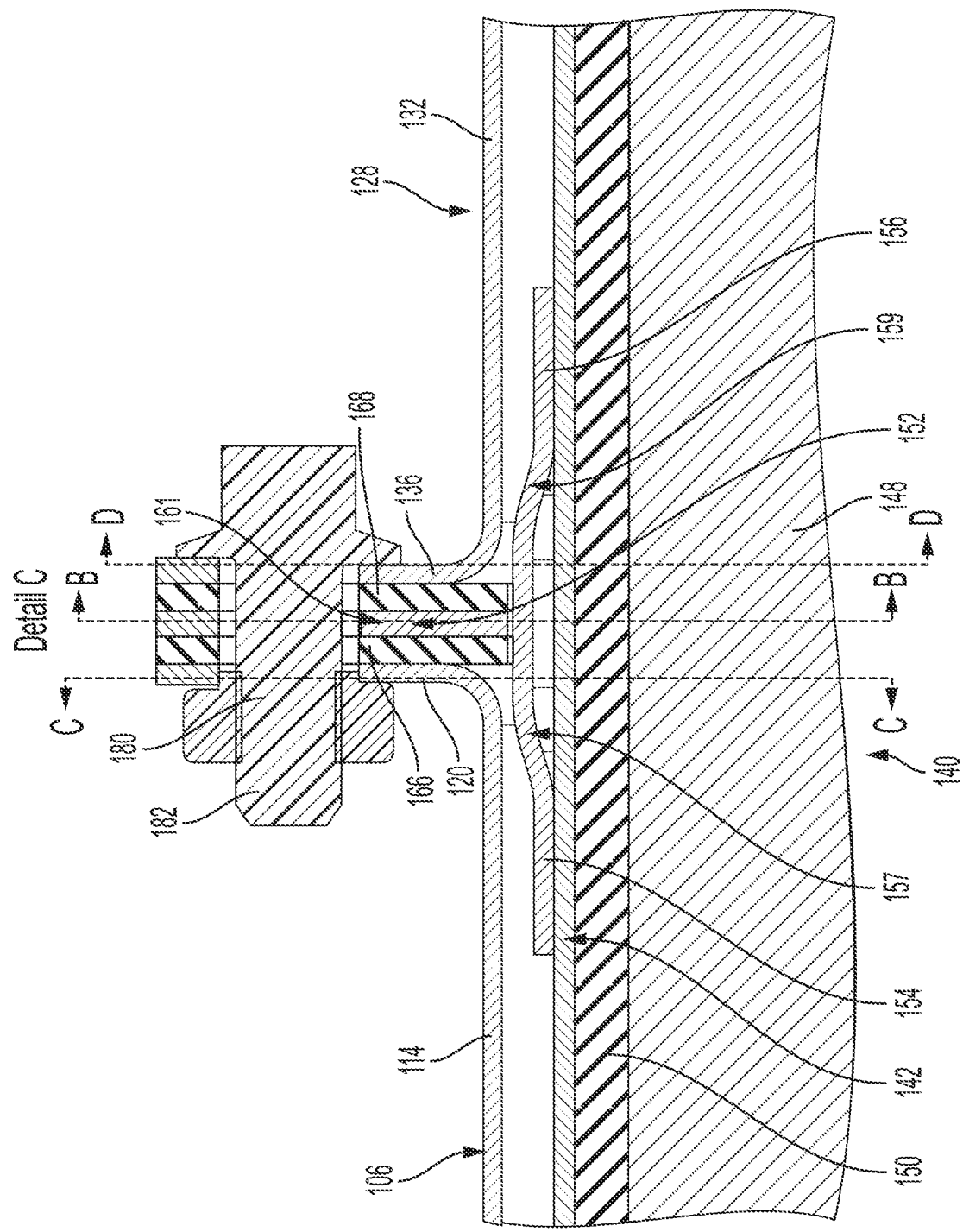
FIG. 11 is a detailed view of Detail C in FIG. 9.

As seen, for example, in FIGS. 8 and 11, in some embodiments, the aftertreatment system 100 includes the first gasket 166. The first gasket 166 is disposed between the inlet coupling flange portion 120 and the coupler portion 161 such that the first gasket 166 is separated from the aftertreatment component housing 142 by the adaptor 152. The first gasket 166 establishes a seal between the inlet coupling flange portion 120 and the coupler portion 161. In this way, when a compressive force is applied to the inlet coupling flange portion 120, the first gasket 166 is compressed between the inlet coupling flange portion 120 and the coupler portion 161.

The second gasket 168 is disposed between the outlet coupling flange portion 136 and the coupler portion 161 such that the second gasket 168 is separated from the aftertreatment component housing 142 by the adaptor 152. The second gasket 168 establishes a seal between the outlet coupling flange portion 136 and the coupler portion 161. In this way, when a compressive force is applied to the outlet coupling flange portion 136, the second gasket 168 is compressed between the outlet coupling flange portion 136 and the coupler portion 161. Both the first gasket 166 and the second gasket 168 may be creep resistant so that joint preload does not substantially decrease over prolonged compression of the inlet coupling flange portion 120 and the outlet coupling flange portion 136 with the coupler portion 161.

Referring to FIG. 11, the aftertreatment component cartridge 140 is bisected by the radial plane B-B that intersects the center axis λ and is orthogonal to the center axis λ. Further, at least a portion of the inlet coupling flange portion 120 is disposed along the inlet coupling flange plane C-C, and at least a portion of the outlet coupling flange portion 136 is disposed along the outlet coupling flange plane E-E. The inlet coupling flange plane C-C and the outlet coupling flange plane E-E are orthogonal to the center axis λ. Therefore, the inlet coupling flange portion 120 is parallel with the outlet coupling flange portion 136.

Figure 12:
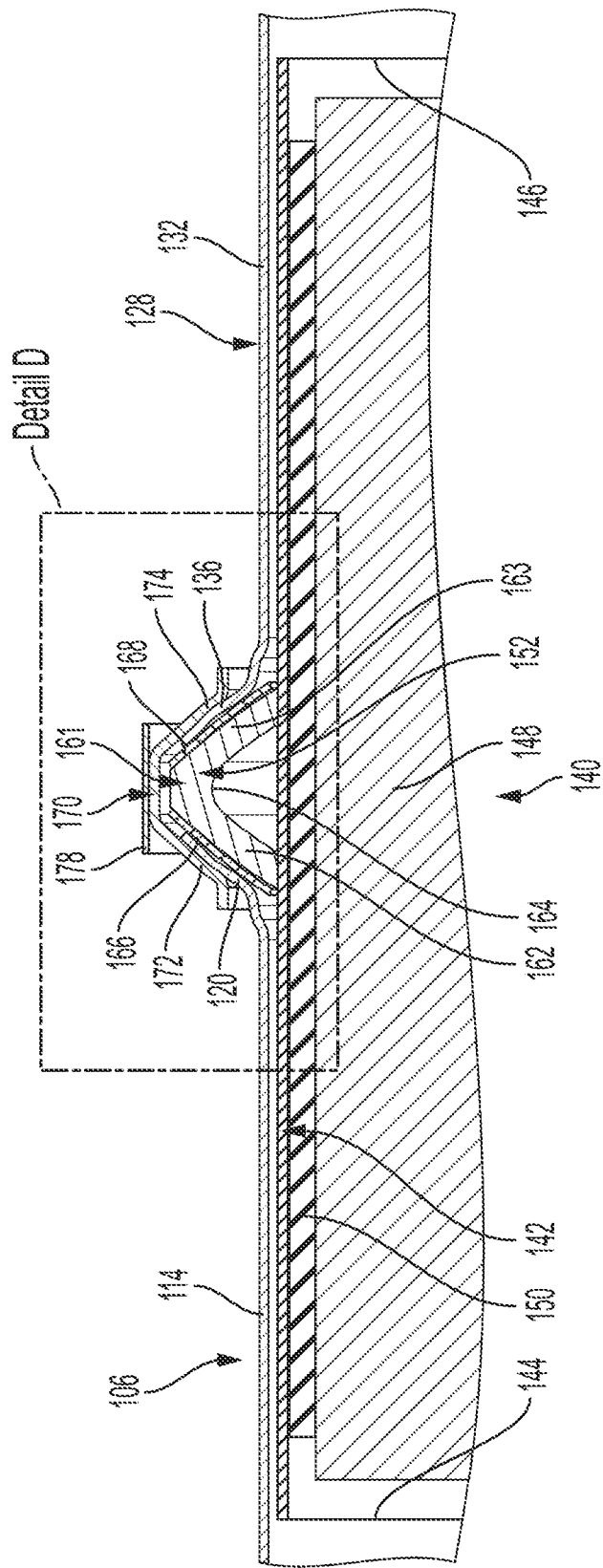
FIG. 12 is a cross-sectional view of the aftertreatment system shown in FIG. 1 taken along plane A-A, in an example embodiment.
Figure 13:
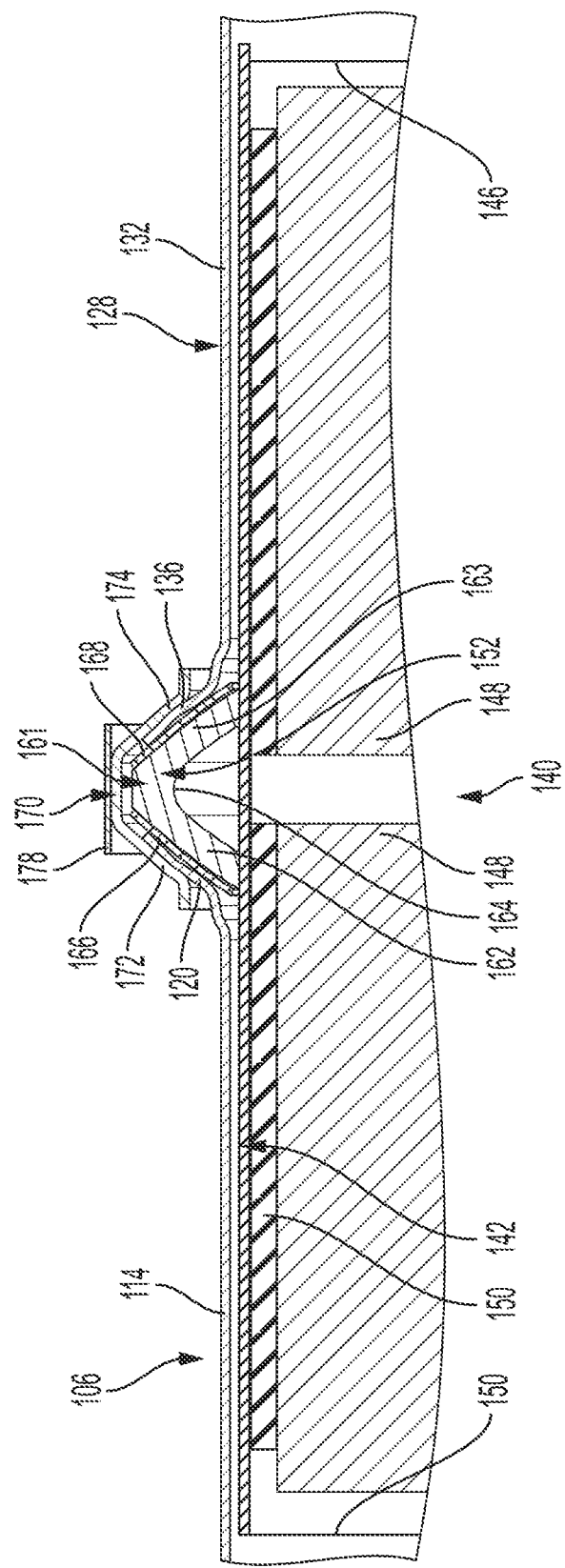
FIG. 13 is a cross-sectional view of the aftertreatment system shown in FIG. 1 taken along plane A-A, in an example embodiment.
Figure 14:
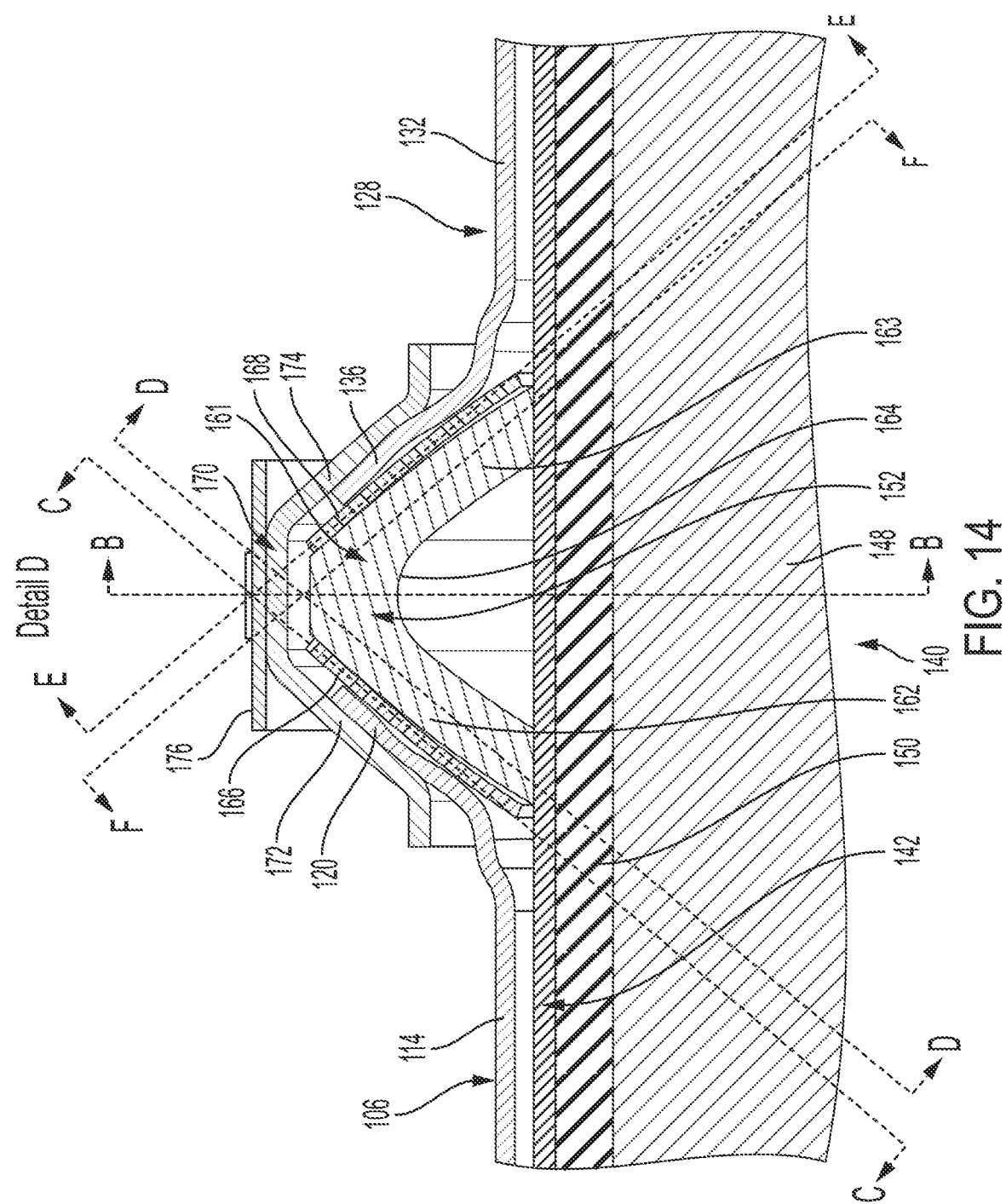
FIG. 14 is a detailed view of Detail D in FIG. 12.

Referring to FIGS. 12-14, in other embodiments, the adaptor 152 comprises the first coupling wall portion 162 coupled to the inlet portion 144 of the aftertreatment component housing 142 and disposed between the inlet coupling flange portion 120 and the aftertreatment component housing 142. The adaptor 152 also comprises the second coupling wall portion 163 coupled to the outlet portion 146 of the aftertreatment component housing 142 and disposed between the outlet coupling flange portion 136 and the aftertreatment component housing 142. The coupler portion 161 is contiguous with the first coupling wall portion 162 and the second coupling wall portion 163 and extends between the inlet coupling flange portion 120 and the outlet coupling flange portion 136. The coupler portion 161 comprises a radial wall portion 164 that is contiguous with the first coupling wall portion 162 and the second coupling wall portion 163 and separated from the aftertreatment component housing 142.

Referring to FIG. 14, in some embodiments, at least a portion of the inlet coupling flange portion 120 is disposed along the inlet coupling flange plane C-C, which is separated from the radial plane B-B by an angle that is approximately equal to between 30 degrees and 60 degrees (e.g., 25 degrees, 30 degrees, 40 degrees, 50 degrees, 60 degrees, 35 degrees, etc.). Similarly, at least a portion of the first coupling wall portion 162 is disposed along the first coupling wall plane D-D which is separated from the radial plane B-B by an angle that is approximately equal to between 30 degrees and 60 degrees (e.g., 25 degrees, 30 degrees, 40 degrees, 50 degrees, 60 degrees, 35 degrees, etc.). In some of these embodiments, the inlet coupling flange plane C-C and the first coupling wall plane D-D are separated from the radial plane B-B by equal angles. Therefore, the first coupling wall portion 162 is parallel with the inlet coupling flange portion 120.

Referring to FIG. 14, in some embodiments, at least a portion of the outlet coupling flange portion 136 is disposed along the outlet coupling flange plane E-E which is separated from the radial plane B-B by an angle that is approximately equal to between 300 degrees and 330 degrees (e.g., 295 degrees, 300 degrees, 315 degrees, 325 degrees, 330 degrees, 335 degrees, etc.). Similarly, at least a portion of the second coupling wall portion 163 is disposed along the second coupling wall plane F-F which is separated from the radial plane B-B by an angle that is approximately equal to between 300 degrees and 330 degrees (e.g., 295 degrees, 300 degrees, 315 degrees, 325 degrees, 330 degrees, 335 degrees, etc.). In these embodiments, the outlet coupling flange plane E-E and the second coupling wall plane F-F are separated from the radial plane B-B by equal angles. Therefore, the second coupling wall portion 163 is parallel with the outlet coupling flange portion 136.

The adaptor 152 is configured to be coupled to the aftertreatment component housing 142 at various positions. For example, in some embodiments, the aftertreatment component cartridge 140 is centered on the center axis λ, as seen in FIG. 3. The adaptor 152 is centered on the radial plane B-B, which is orthogonal to the center axis λ, intersects the center axis λ, and bisects the aftertreatment component cartridge 140. Further, the aftertreatment component cartridge 140 includes an inlet plane G-G that is parallel to the radial plane B-B. Similarly, the aftertreatment component cartridge 140 also includes an outlet plane H-H that is parallel to the radial plane B-B. Both the inlet plane G-G and the outlet plane H-H extend along portions of the aftertreatment component cartridge 140 such that the aftertreatment component cartridge 140 is disposed between the inlet plane G-G and the outlet plane H-H. The inlet plane G-G is separated from the outlet plane H-H by a first distance $L_1$ along the center axis λ. The radial plane B-B is separated from the inlet plane G-G by a second distance $L_2$ along the center axis A. In various embodiments, the second distance $L_2$ is approximately equal to between 40 percent of the first distance $L_1$ and 60 percent of the first distance $L_1$ (e.g., 35 percent, 40 percent, 45 percent, 55 percent, 60 percent, 65 percent, etc.). In other embodiments, the second distance $L_2$ may approximately equal to between 60 percent of the first distance $L_1$ and 80 percent of the first distance $L_1$ (e.g., 55 percent, 60 percent, 65 percent, 75 percent, 80 percent, 85 percent, etc.).

In various embodiments, the adaptor 152 may be configured in other manners than described above. For example, the adaptor 152 may be coupled to the aftertreatment component housing 142 at a location of a center of mass of the aftertreatment component cartridge 140. In another example with more than one aftertreatment system component 148, the adaptor 152 may be coupled to the aftertreatment component housing 142 at a midpoint between an outlet of one aftertreatment system component 148 and an inlet of another aftertreatment system component 148.

In some embodiments, the fastener is a clamp 170 (e.g., strap, band clamp, etc.), which applies the compressive force to secure the aftertreatment component cartridge 140 to the inlet body 106 and the outlet body 128 and suspends the aftertreatment component cartridge 140 in the aftertreatment system 100, as seen in FIGS. 3, 8, and 14. The clamp 170 includes a first clamp flange portion 172. The first clamp flange portion 172 compresses the inlet coupling flange portion 120 towards the first coupling wall portion 162. In this way, the clamp 170 couples the aftertreatment component cartridge 140 to the inlet body 106. The clamp 170 may include a bolt and a nut which cooperate to facilitate tightening and loosening of the clamp 170.

The clamp 170 also includes a second clamp flange portion 174. The second clamp flange portion 174 compresses the outlet coupling flange portion 136 towards the second coupling wall portion 163. In this way, the clamp 170 also couples the aftertreatment component cartridge 140 to the outlet body 128.

In some embodiments, the clamp 170 includes a band 176 (e.g., ring, belt, etc.). The band 176 is disposed on the outer surface of the clamp 170, as seen in FIG. 3. The clamp 170 also includes a winch 178 (e.g., adjustor, etc.). The winch 178 is used to couple the band 176 to the clamp 170. Therefore, the clamp 170 facilitates suspension of the aftertreatment component cartridge 140 within the inlet body 106 and the outlet body 128. By suspending the aftertreatment component cartridge 140 within the inlet body 106 and the outlet body 128 with the clamp 170, the aftertreatment system component 148 is more easily installed and uninstalled (e.g., for replacement, for servicing, etc.) compared to aftertreatment systems with multiple clamps that must each be removed to access an aftertreatment component. Unlike aftertreatment systems utilizing multiple clamps to suspend the aftertreatment component, use of the clamp 170 also provides additional mounting space on an exterior of the aftertreatment system 100, which provides a greater overall insulation length and reduces the number of joints and openings from which exhaust gas may escape.

In other embodiments, the fastener is a compression joint 180 (e.g., bolted joint, etc.). The compression joint 180 applies a compressive force to secure the aftertreatment component cartridge 140 to the inlet body 106 and outlet body 128 and suspend the aftertreatment component cartridge 140 within the inlet body 106 and the outlet body 128, as seen in FIG. 11. The compression joint 180 also includes a joint fastener 182 (e.g., bolt, screw, threaded fastener, etc.). The joint fastener 182 facilitates attachment of the compression joint 180 and compression of the coupler portion 161 between the inlet coupling flange portion 120 and the outlet coupling flange portion 136. In some embodiments, the inlet coupling flange portion 120, the coupler portion 161, and the outlet coupling flange portion 136 are threaded and are threadably engaged with the compression joint 180.

III. Example Method of Installing the Aftertreatment Component Cartridge

Figure 15:
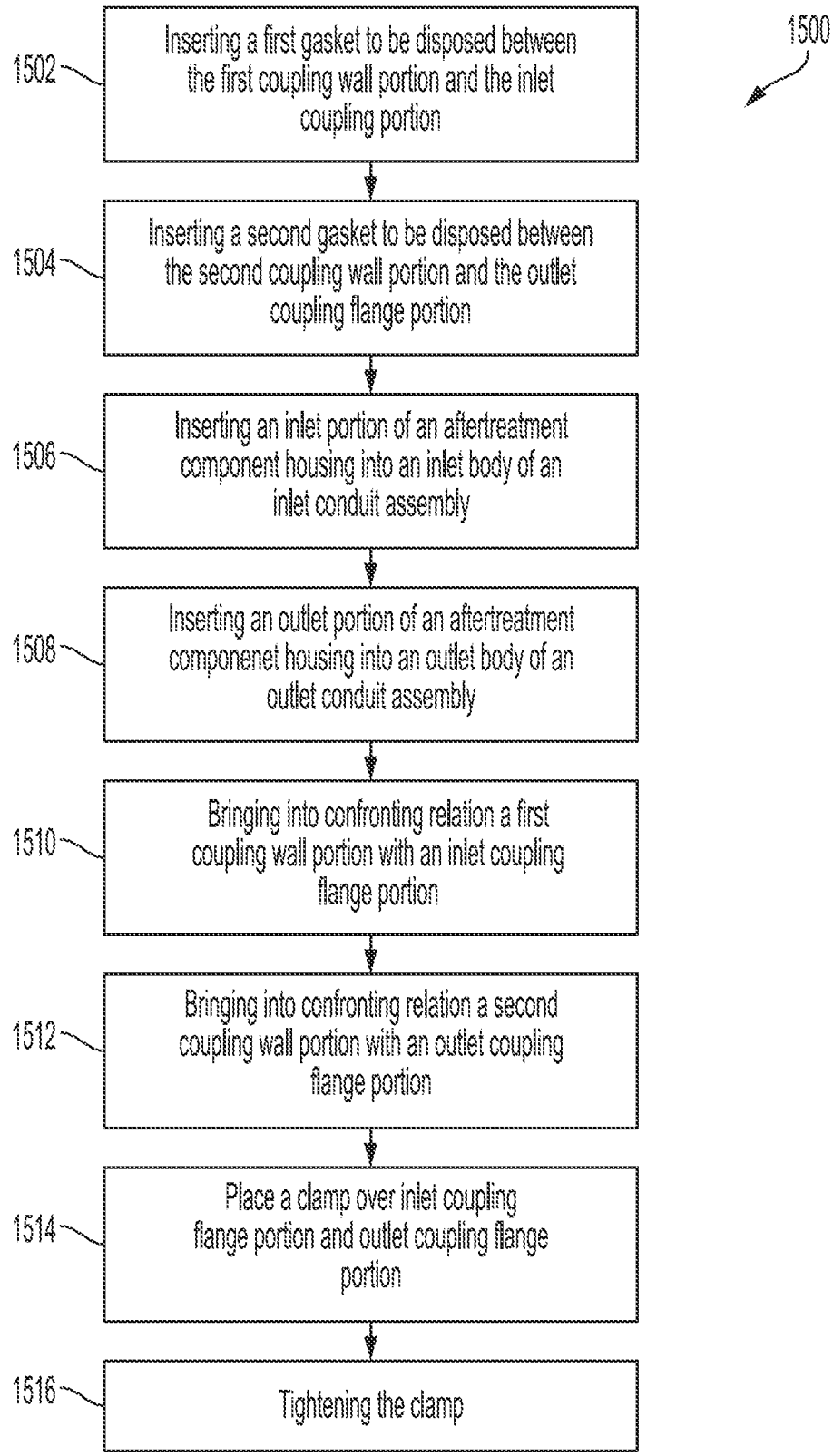
FIG. 15 is a flowchart illustrating the process for installing an aftertreatment component cartridge of the aftertreatment system.

FIG. 15 illustrates an installation process 1500 (e.g., method, etc.) for installing an aftertreatment component cartridge 140 of the aftertreatment system 100. The installation process 1500 may be performed by, including but not limited to, the original equipment manufacturer (i.e., when the aftertreatment system 100 is assembled, etc.) or a service technician (e.g., a mechanic, line worker, robot, automated machine, etc.).

In various embodiments, the installation process 1500 begins in block 1502 with inserting, by the service technician, the first gasket 166 between the first coupling wall portion 162 and the inlet coupling flange portion 120. In various embodiments, the installation process 1500 continues in block 1504 with inserting, by the service technician, the second gasket 168 between the second coupling wall portion 163 and the outlet coupling flange portion 136. In other embodiments, the first gasket 166 and/or the second gasket 168 is not included.

The installation process 1500 continues in block 1506 with inserting, by the service technician, an inlet portion 144 of the aftertreatment component housing 142 into the inlet body 106. As a result, the first flange portion 154 is disposed between the aftertreatment component housing 142 and the inlet body wall portion 114.

The installation process 1500 continues in block 1508 with inserting, by the service technician, the outlet portion 146 of the aftertreatment component housing 142 into the outlet body 128. As a result, the second flange portion 156 is disposed between the aftertreatment component housing 142 and the outlet body wall portion 132.

The installation process 1500 continues in block 1510 with bringing, by the service technician, the first coupling wall portion 162 into confronting relation with the inlet coupling flange portion 120. The installation process 1500 continues in block 1512 with bringing, by the service technician, the second coupling wall portion 163 into confronting relation with the outlet coupling flange portion 136.

The installation process 1500 continues in block 1514 with placing, by the service technician, a clamp 170 (e.g., strap, band clamp, etc.) over the inlet coupling flange portion 120 and the outlet coupling flange portion 136. As a result, the inlet coupling flange portion 120 and first gasket 166 are disposed between the first clamp flange portion 172 and the first coupling wall portion 162. Additionally, the outlet coupling flange portion 136 and the second gasket 168 are disposed between the second clamp flange portion 174 and the second coupling wall portion 163.

The installation process 1500 continues in block 1516 with tightening, by the service technician, the clamp 170 (e.g., by tightening a nut of the clamp 170, by tightening a bolt of the clamp 170, etc.). As a result, the first clamp flange portion 172 compresses the inlet coupling flange portion 120 such that the first gasket 166 is compressed between the first coupling wall portion 162 and the inlet coupling flange portion 120. Additionally, the second clamp flange portion 174 compresses the outlet coupling flange portion 136 such that the second gasket 168 is compressed between the second coupling wall portion 163 and the outlet coupling flange portion 136.

In some embodiments, the installation process 1500 may be performed without inserting the first gasket 166 and/or the second gasket 168 as described in blocks 1502 and 1504. In these embodiments, the installation process 1500 begins in block 1506 (e.g., skipping blocks 1502 and 1504).

IV. Example Method of Replacing the Aftertreatment Component Cartridge

Figure 16:
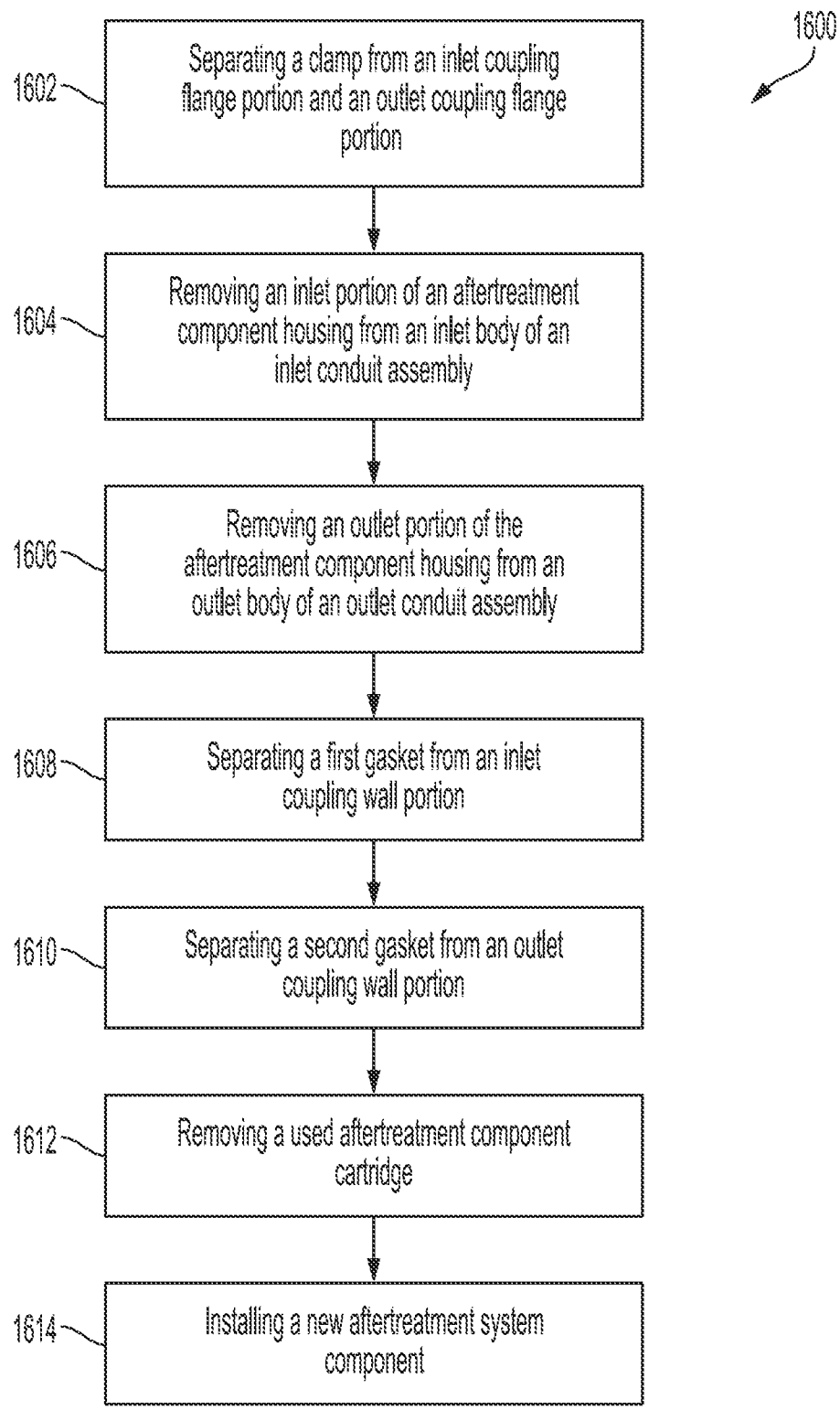
FIG. 16 is a flowchart illustrating the process for replacing the aftertreatment component cartridge of the aftertreatment system.

FIG. 16 illustrates a replacement process 1600 (e.g., method, etc.) for replacing an aftertreatment component cartridge 140 of the aftertreatment system 100 that has already been installed (e.g., through the installation process 1500, etc.). The replacement process 1600 may be performed by a service technician.

The replacement process 1600 begins in block 1602 with separating, by a service technician, a clamp 170 from the inlet coupling flange portion 120 and the outlet coupling flange portion 136. Specifically, the first clamp flange portion 172 is separated from the inlet coupling flange portion 120 and the second clamp flange portion 174 is separated from the outlet coupling flange portion 136.

The replacement process 1600 continues in block 1604 with removing, by the service technician, the inlet portion 144 from the inlet body 106. The replacement process 1600 continues in block 1606 with removing, by the service technician, the outlet portion 146 from the outlet body 128.

In some embodiments, the replacement process 1600 continues in block 1608 with separating, by the service technician, the first gasket 166 from the first coupling wall portion 162. In such embodiments, the first gasket 166 may be re-used with a replacement aftertreatment component cartridge 140. Similarly, in some embodiments, the replacement process 1600 continues in block 1610 with separating, by the service technician, the second gasket 168 from the second coupling wall portion 163. In such embodiments, the second gasket 168 may be re-used with a replacement aftertreatment component cartridge 140.

The replacement process 1600 continues in block 1612 with removing, by the service technician, a used aftertreatment component cartridge 140. The replacement process 1600 may be completed in block 1614 by installing, by the service technician, a new aftertreatment component cartridge 140. This installation may be completed according to the installation process 1500, as illustrated in FIG. 15.

In some embodiments, the replacement process 1600 may be performed without performing blocks 1608 and/or 1610, such as when the aftertreatment component cartridge 140 is installed without the first gasket 166 and/or the second gasket 168. In such applications, after removing the inlet portion 144 from the inlet body 106 in block 1604 and removing the outlet portion 146 from the outlet body 128 in block 1606, the replacement process 1600 continues in block 1612 with removing, by the service technician, a used aftertreatment component cartridge 140.

V. Overview of Additional Example Aftertreatment Systems

FIGS. 17-34 depict an aftertreatment system 200 (e.g., treatment system, etc.) for treating exhaust gas produced by an internal combustion engine (e.g., diesel internal combustion engine, gasoline internal combustion engine, hybrid internal combustion engine, propane internal combustion engine, dual-fuel internal combustion engine, etc.). As explained in more detail herein, the aftertreatment system 200 facilitates simplified and faster assembly and/or servicing than other systems (e.g., by changing a type of one or more of the aftertreatment components, etc.), thereby making the aftertreatment system 200 more desirable than other systems.

The aftertreatment system 200 is substantially similar to the aftertreatment system 100 shown in FIGS. 1-14. For example, the aftertreatment system 200 includes an inlet conduit assembly 202 (e.g., line system, pipe system, etc.) that is substantially similar to the inlet conduit assembly 102. The inlet conduit assembly 202 includes an inlet exhaust pipe 204 (e.g., pipe system, etc.) that is substantially similar to the inlet exhaust pipe 104. For example, the inlet exhaust pipe 204 receives an exhaust gas from an upstream component (e.g., header on the internal combustion engine, exhaust manifold on the internal combustion engine, the internal combustion engine, etc.). In some embodiments, the inlet exhaust pipe 204 is coupled (e.g., attached, fixed, welded, fastened, riveted, adhesively attached, bonded, pinned, etc.) to the upstream component. In other embodiments, the inlet exhaust pipe 204 is integrally formed with the upstream component.

The inlet conduit assembly 202 also includes an inlet body 206 (e.g., body, panel, etc.). In some embodiments, the inlet conduit assembly 202 also includes an inlet shell (not shown) that is substantially similar to the shell 108. The inlet body 206 includes an inlet body wall portion 214 (e.g., body, panel, etc.), also referred to herein as an "inlet body wall." The inlet body wall portion 214 receives the flow of exhaust gas from the inlet exhaust pipe 204.

In some embodiments, the inlet exhaust pipe 204 includes an inlet exhaust pipe flange (not shown) that is substantially similar to the inlet exhaust pipe flange (116). For example, the inlet exhaust pipe flange of the inlet exhaust pipe 204 may be disposed between and coupled to the inlet body wall portion 214. The inlet exhaust pipe flange may facilitate coupling of the inlet exhaust pipe 204 to the inlet conduit assembly 202.

In some embodiments, the inlet conduit assembly 102 also includes an inlet insulator (not shown) that is substantially similar to the inlet insulator 118.

The inlet body 206 also includes an inlet engagement member 220 (e.g. ring-shaped projection, circular protuberance, annular rib, etc.). The inlet engagement member 220 is downstream of the inlet body wall portion 214 and flares or extends outwardly (e.g., radially outwardly and axially outwardly, etc.) from the inlet body wall portion 214. More specifically, the inlet engagement member 220 includes an inlet engagement member wall 222. At least a portion of the inlet engagement member 220 extends outward from the inlet body wall 214 and along a slope from the inlet body wall 214. The slope is angled with respect to an extending direction of the inlet body 206. In some embodiments, the slope is between 15° and 90° with respect to the extending direction of the inlet body 206.

The inlet engagement member 220 also includes an inlet coupling flange 223. In some embodiments, the inlet coupling flange 223 is contiguous with the inlet engagement member wall 222 and extends outward (e.g., radially outwardly and axially outwardly, etc.) and in a downstream direction from the inlet engagement member wall 222 along the slope. In other embodiments, a portion (e.g., a distal portion, a radially outward portion, etc.) of the inlet engagement member wall 222 defines the inlet coupling flange 223 such that the inlet coupling flange 223 is part of the inlet engagement member wall 222.

Figure 17:
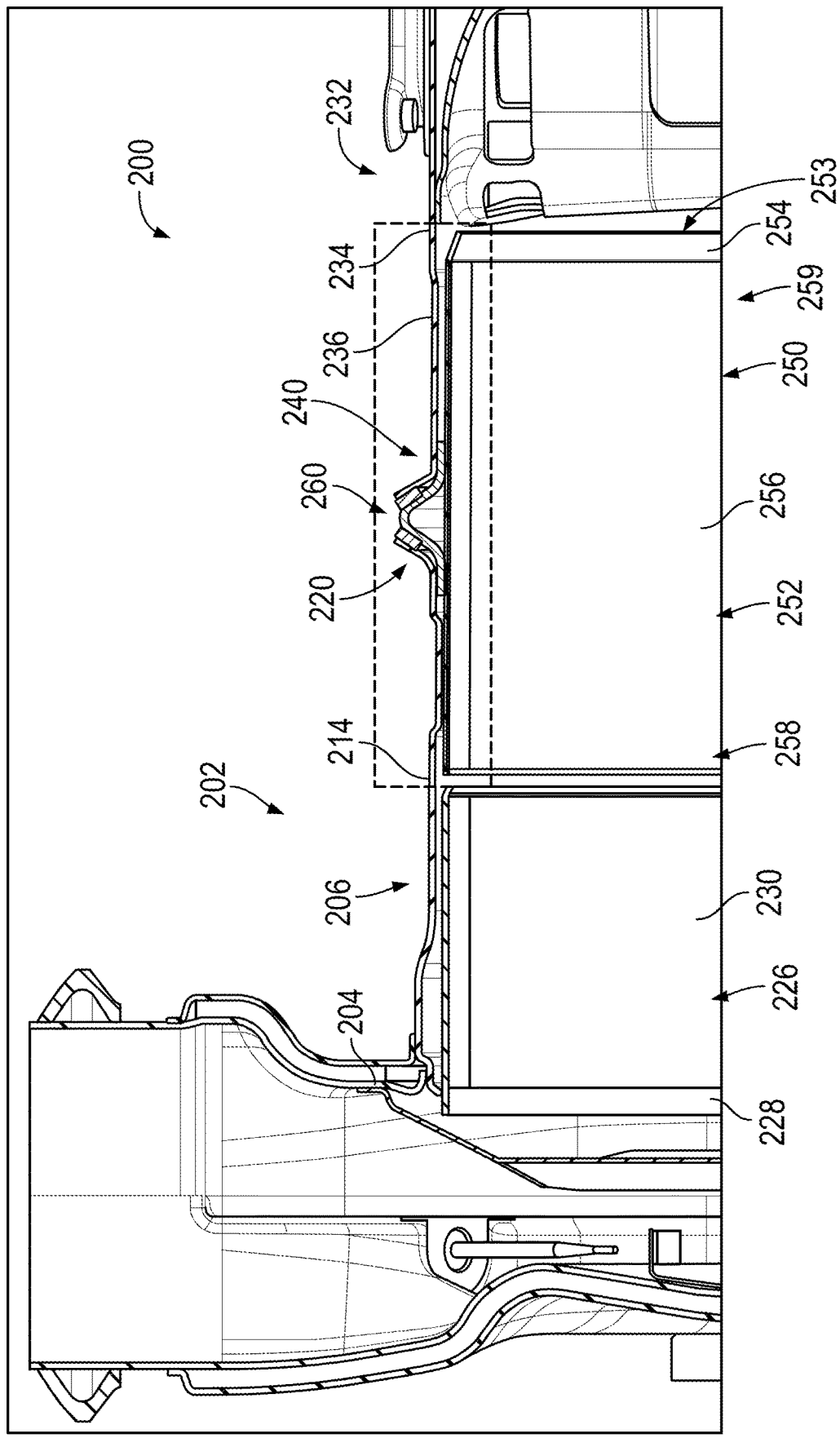
FIG. 17 is a cross-sectional view of an example aftertreatment system, in an example embodiment.

In some embodiments, inlet engagement member 220 also includes an inlet curved portion 224, as seen in FIGS. 17-18. The inlet curved portion 224 is contiguous with the inlet body wall portion 214 and the inlet engagement member wall 222. The inlet curved portion 224 extends outward (e.g., radially outwardly and axially outwardly, etc.) from the inlet body wall portion 214. More specifically, the inlet curved portion 224 extends along a curved path between the inlet body wall 214 and the inlet engagement member wall 222.

In some embodiments, the inlet body 206 is configured to at least partially house (e.g., contain at least partially within the inlet body wall 214), a first catalyst assembly 226. The first catalyst assembly 226 includes a first catalyst housing 228 and a first catalyst member 230. The first catalyst housing 228 is coupled (e.g., fixed) to the inlet body wall 214. The first catalyst housing 228 is configured to house the first catalyst member 230. The first catalyst member 230 is a conversion catalyst member (e.g., diesel oxidation catalyst (DOC) conversion catalyst member, catalyst metals, etc.) that facilitates conversion of various components (e.g., carbon monoxide (CO), hydrocarbons, etc.) of the exhaust gas into other components (e.g., carbon dioxide ($CO_2$), water vapor, etc.).

The aftertreatment system 200 also includes an outlet body 232 (e.g., line system, pipe system, etc.). The outlet body 232 is configured to provide the exhaust gas from the aftertreatment system 100 (e.g., to downstream components, to atmosphere, etc.).

The outlet body 232 includes an outlet exhaust pipe 234 (e.g., line system, pipe system, etc.). The outlet exhaust pipe 234 provides the exhaust gas from the aftertreatment system 200. The outlet body 232 also includes an outlet body wall portion 236 (e.g., body, panel, etc.), also referred to herein as an outlet body wall 236. The in some embodiments, the outlet body 232 also includes an outlet shell that is substantially similar to the outlet shell 130. The outlet shell 130 surrounds the outlet body 128 to contain the outlet body 128. In some embodiments, the outlet body 232 also includes an outlet insulator (e.g., insulator, mat, etc.) that is substantially similar to the outlet insulator 134.

The outlet body 128 also includes an outlet engagement member 240 (e.g., ring-shaped projection, circular protuberance, annular rib, etc.). The outlet engagement member 240 is upstream of the outlet body wall portion 236 and flares or extends outwardly from the outlet body wall portion 236. More specifically, the outlet engagement member 240 includes an outlet engagement member wall 242. At least a portion of the outlet engagement member wall 242 extends outward from the outlet body wall 236 and along a slope from the outlet body wall 236. The slope is angled with respect to an extending direction of the outlet body 232. The slope is angled with respect to an extending direction of the outlet body 232. In some embodiments, the slope is between 15° and 90° with respect to the extending direction of the outlet body 232.

The outlet engagement member 240 also includes an outlet coupling flange 243. In some embodiments, the outlet coupling flange 243 is contiguous with the outlet engagement member wall 242 and extends outward (e.g., radially outwardly and axially outwardly, etc.) and in an upstream direction from the outlet engagement member wall 242 along the slope. In other embodiments, a portion (e.g., a distal portion, a radially outward portion, etc.) of the outlet engagement member wall 242 defines the outlet coupling flange 243 such that the outlet coupling flange 243 is part of the outlet engagement member wall 242.

In some embodiments, outlet engagement member 240 also includes an outlet curved portion 244, as seen in FIGS. 17-18. The outlet curved portion 244 is contiguous with the outlet body wall portion 236 and the outlet engagement member wall 242. The outlet curved portion 244 extends outward (e.g., radially outwardly and axially outwardly, etc.) from the outlet body wall portion 236. More specifically, the outlet curved portion 244 extends along a curved path between the outlet body wall 236 and the outlet engagement member wall 242.

The aftertreatment system 100 includes an aftertreatment component cartridge 250 (e.g., cartridge, insert, etc.), also referred to herein as a cartridge 250. As explained in more detail herein, the inlet engagement member 220 and the outlet engagement member 240 cooperate to facilitate suspension of the cartridge 250, such that the cartridge 250 is at least partially within the inlet body 206 and/or the outlet body 232. The cartridge 250 is positioned between the inlet body 206 and the outlet body 232. More specifically, the cartridge 250 is positioned such that at least a portion of the cartridge 250 is downstream of the inlet body 206 and at least a portion of the outlet body 232 is downstream of the cartridge 250.

The aftertreatment component cartridge 250 includes an aftertreatment component assembly 252. The aftertreatment component assembly 252 includes a housing 253 (e.g., filtering housing, etc.). The housing 253 includes a housing wall 254 (also referred to herein as a "cartridge wall") that is configured to contain an aftertreatment system component. The housing 253 may be configured as a second catalyst housing 253. The housing 253 is configured to house an aftertreatment component therein. For example and as shown in FIG. 17, when the housing 253 is configured as the second catalyst housing 253, the second catalyst housing 253 houses a second catalyst member 256. The second catalyst member 256 is a conversion catalyst member (e.g., selective catalytic reduction (SCR) conversion catalyst member, catalyst metals, etc.) that facilitates conversion of various components (e.g., nitrogen oxides ($NO_x$), sulfur oxides ($SO_x$), etc.) of the exhaust gas into other components (e.g., nitrogen ($N_2$), water vapor, etc.). The housing 253 facilitates flow of the exhaust gas from the inlet body 206 into the second catalyst member 256.

The aftertreatment component housing 253 includes an inlet portion 258 (e.g., an upstream portion). The inlet portion 258 is at least partially inserted into the inlet body 106. The inlet portion 258 receives the exhaust gas from the inlet body 106, and provides the exhaust gas into the cartridge 250. The aftertreatment component housing 253 also includes an outlet portion 259. The outlet portion 259 is inserted into the outlet body 232. The outlet portion 259 receives the exhaust gas from the cartridge 250, and provides the exhaust gas from the cartridge 250.

In other embodiments, the component cartridge 250 includes a different aftertreatment system component. The aftertreatment system component is positioned within the aftertreatment component housing 253. The aftertreatment system component may treat the exhaust gas produced by an internal combustion engine. In some embodiments, the aftertreatment system component reduces the emission of undesirable components (e.g., nitrogen oxides ($NO_x$), etc.) in the exhaust gas. In some embodiments, the aftertreatment system component facilitates the removal of particulate (e.g., soot, particulate matter, etc.) from the exhaust gas by a filtration member (e.g., a diesel particulate filter (DPF), etc.).

In some embodiments, the component cartridge 250 is not limited to housing a single aftertreatment system component. For example, the component cartridge 250 may contain more than one aftertreatment system component, each aftertreatment system component 148 able to be any of the embodiments described herein. In some embodiments, the component cartridge 250 may contain two or more of the same aftertreatment system component.

In some embodiments, the aftertreatment component cartridge 250 also includes a mounting mat that is substantially similar to the mounting mat The cartridge 250 includes an adaptor 260 (e.g., projection, protuberance, rib, etc.). The adaptor 260 is coupled to the cartridge wall 254. The adaptor 260 cooperates with the cartridge wall 254, the inlet engagement member 220, and the outlet engagement member 240 to facilitate suspension of the cartridge 250 within the inlet body 206 and/or the outlet body 232 when a compressive force is applied to the adaptor 260. Different embodiments of the adaptor 260 enable use of different fasteners (e.g., clamps, compression joints, V-band body joints, etc.) to compress the adaptor 260 and suspend cartridge 250 within the inlet body 206 and the outlet body 232, as described in more detail herein.

In some embodiments, the adaptor 260 includes an adaptor wall 262 (e.g., ring, etc.). The adaptor wall 262 includes a first adaptor wall portion 264 coupled to the cartridge wall 254. The first adaptor wall portion 264 follows a curved path such that the first adaptor wall portion 264 extends outward (e.g., radially outward) from the adaptor wall 262. More specifically, an upstream portion of the first adaptor wall portion 264 is substantially parallel to an extending direction of the cartridge 250 and a downstream side of the first adaptor wall portion 264 is substantially parallel to the inlet coupling flange 223.

The adaptor wall 262 also includes a second adaptor wall portion 265 extending outward (e.g., radially outward) and in a downstream direction from the first adaptor wall portion 264. The second adaptor wall portion 265 extends along a curved path such that an upstream portion of the second adaptor wall portion 265 is substantially parallel to the inlet coupling flange 223 and a downstream side of the second adaptor wall portion 265 is substantially parallel to the outlet coupling flange 243. The second adaptor wall portion 265 defines a first adaptor engagement portion 268 (e.g., an upstream adaptor engagement portion) and a second adaptor engagement portion 269 (e.g., a downstream adaptor engagement portion). The first adaptor engagement portion 268 is configured to engage (e.g., directly by contacting, or indirectly via an intermediate component, such as a sealing member, gasket, or O-ring) the inlet coupling flange 223. The second adaptor engagement portion 269 is configured to engage (e.g., directly by contacting, or indirectly via an intermediate component, such as a sealing member, gasket, or O-ring) the outlet coupling flange 243. By engaging the inlet coupling flange 223 and the outlet coupling flange 243 by the first adaptor engagement portion 268 and the second adaptor engagement portion 269, the adaptor 260, the inlet engagement member 220, and the outlet engagement member 240 facilitate suspension of the cartridge 250 within the inlet body 206 and the outlet body 232 when a compressive force is applied to the adaptor 260.

The adaptor wall 262 also includes a third adaptor wall portion 266 extending inward (e.g., radially inward) and in a downstream direction from the second adaptor wall portion 265. The third adaptor wall portion 266 extends along a curved path such that an upstream portion of the third adaptor wall portion 266 is substantially parallel to the outlet coupling flange 243 and a downstream side of the third adaptor wall portion 266 is substantially parallel to the extending direction of the cartridge 250.

Consequently, when a compressive force is applied to the inlet engagement member 220 and the outlet engagement member 240, the compressive force is also applied to the adaptor 260, or, more specifically, the second adaptor wall portion 265, enabling the adaptor 260 to suspend the cartridge 250 within the inlet body 206 and the outlet body 232.

In some embodiments, the aftertreatment system 200 includes a first gasket 246 (e.g., spacers, seals, plugs, sealing member, etc.), also referred to herein as a first sealing member. The first gasket 246 may be made of a compressible material (e.g., rubber, elastomer, etc.). The first gasket 246 is disposed between the inlet coupling flange 223 and the second adaptor wall portion 265 such that the first gasket 246 is separated from the cartridge wall 254 by the adaptor 260. The first gasket 246 establishes a seal between the inlet coupling flange 223 and the second adaptor wall portion 265, or more specifically, the first adaptor engagement portion 268. For example, the first gasket 246 engages the inlet coupling flange 223 and first adaptor engagement portion 268 to form a first seal therebetween. In this way, when a compressive force is applied to the inlet coupling flange 223, the first gasket 246 is compressed between the inlet coupling flange 223 and the second adaptor wall portion 265.

Similarly, the aftertreatment system 200 may include a second gasket 248 (e.g., spacers, seals, plugs, sealing member, etc.), also referred to herein as a second sealing member. The second gasket 248 may be made of a compressible material (e.g. rubber, elastomer, etc.). The second gasket 248 is disposed between the outlet coupling flange 243 and the second adaptor wall portion 265 such that the second gasket 248 is separated from the cartridge wall 254 by the adaptor 260. The second gasket 248 establishes a seal between the outlet coupling flange 243 and second adaptor wall portion 265, or more specifically, the second adaptor engagement portion 269. The second gasket 248 engages the outlet coupling flange 243 and the second adaptor wall portion 265 to form a second seal therebetween. In this way, when a compressive force is applied to the outlet coupling flange 243, the second gasket 248 is compressed between the outlet coupling flange 243 and the second adaptor wall portion 265. The first gasket 246 and second gasket 248 may be substantially similar to the first gasket 166 and the second gasket 168, respectively.

In other embodiments, the first gasket 246 and/or the second gasket 248 is/are disposed in a different location than as shown in FIG. 18. In these embodiments, the first gasket 246 may be positioned between the inlet engagement member 220 and the adaptor 260 and/or the second gasket 248 may be positioned between the outlet engagement member 240 and the adaptor 260. In other embodiments, the aftertreatment system 200 does not include the first gasket 246 and/or the second gasket 248. In these embodiments, a first seal (e.g., a metal-to-metal seal) may be formed by the inlet coupling flange 223 engaging the second adaptor wall portion 265. A second seal (e.g., a metal-to-metal seal) may be formed by the outlet coupling flange 243 engaging the second adaptor wall portion 265. The metal-to-metal seal advantageously enables better tolerance and durability than current designs. Advantageously, when the aftertreatment system 200 does not include the first gasket 246 and/or the second gasket 248 the quantity of components in the joint created by the inlet engagement member 220, the outlet engagement member 240 and the adaptor 260, is reduced thereby simplifying the manufacturing process, assembly process, and replacement process. In some embodiments, the metal-to-metal contact between the inlet engagement member 220 and the adaptor 260 and/or the metal-to-metal contact between the outlet engagement member 240 and the adaptor 260 also mitigates against gasket creep.

In some embodiments, the metal-to-metal contact between the inlet engagement member 220 and the adaptor 260 and/or the metal-to-metal contact between the outlet engagement member 240 and the adaptor 260 does not form a seal therebetween. In some embodiments, the metal-to-metal contact between the inlet engagement member 220 and the adaptor 260 and/or the metal-to-metal contact between the outlet engagement member 240 and the adaptor 260 provides an alternate path for external forces to pass through the joint created by the inlet engagement member 220, the outlet engagement member 240 and the adaptor 260. Advantageously, the metal-to-metal contact between the inlet engagement member 220 and the adaptor 260 and/or the metal-to-metal contact between the outlet engagement member 240 and the adaptor 260 avoids over-compression of the gaskets (e.g., the first gasket 246 and/or the second gasket 248) due to external forces. In some embodiments, the metal-to-metal contact between the inlet engagement member 220 and the adaptor 260 and/or the metal-to-metal contact between the outlet engagement member 240 and the adaptor 260 also enables control of gasket compression thru the fit between the metal components and the gaskets (e.g., the first gasket 246 and/or the second gasket 248). For example, the cross sectional space created by the fit of the metal components (e.g., the inlet engagement member 220, the outlet engagement member 240 and the adaptor 260) is slightly smaller than the cross section of the gaskets (e.g., the first gasket 246 and/or the second gasket 248) thereby controlling the amount of gasket compression.

Referring now to FIGS. 19-34, various embodiments of the aftertreatment system 200 are shown. In particular, the embodiments described herein relate to variations of the inlet engagement member 220, outlet engagement member 240, and the adaptor 260.

Referring now to FIG. 19, a cross-sectional view of the aftertreatment system 200 shown in FIG. 17, according to another example embodiment. In the embodiment shown in FIG. 19, the inlet engagement member 220 is downstream of the inlet body wall portion 214 and flares or extends outwardly (e.g., radially outwardly and axially outwardly, etc.) from the inlet body wall portion 214. The inlet engagement member 220 includes an inlet engagement member wall 270.

The inlet engagement member wall 270 includes an inlet engagement member wall first portion 272 that extends outward from the inlet body wall 214 and along a slope from the inlet body wall 214. The slope is angled with respect to an extending direction of the inlet body 206. The inlet engagement member wall first portion 272 is contiguous with the inlet body wall 214.

The inlet engagement member wall 270 includes an inlet engagement member wall second portion 274 that extends outward (e.g., axially outward) and in a downstream direction from the inlet engagement member wall first portion 272. The inlet engagement member wall second portion 274 extends along a slope that is angled with respect to the inlet engagement member wall first portion 272. In some embodiments, the inlet engagement member wall second portion 274 is substantially parallel to the extending direction of the inlet body 206. The inlet engagement member wall second portion 274 is contiguous with the inlet engagement member wall first portion 272.

The inlet engagement member wall 270 includes an inlet engagement member wall third portion 276 that extends outward (e.g., radially outward) from the inlet engagement member wall second portion 274. The inlet engagement member wall third portion 276 extends along a slope that is angled with respect to the inlet engagement member wall second portion 274. More specifically, the inlet engagement member wall third portion 276 is substantially perpendicular to the inlet engagement member wall second portion 274. As shown in FIG. 19, the inlet engagement member wall 270 also includes an inlet engagement member wall first curved portion 275. The inlet engagement member wall first curved portion 275 is contiguous with the inlet engagement member wall second portion 274 and the inlet engagement member wall third portion 276. The inlet engagement member wall first curved portion 275 extends outward (e.g., radially outwardly and axially outwardly, etc.) from the inlet engagement member wall second portion 274. More specifically, the inlet engagement member wall first curved portion 275 extends along a curved path between the inlet engagement member wall second portion 274 and the inlet engagement member wall third portion 276. The inlet engagement member wall third portion 276 defines a first engagement surface 279, described in more detail herein.

The inlet engagement member wall 270 includes an inlet engagement member wall fourth portion, referred to herein as an inlet coupling flange 278. The inlet coupling flange 278 extends outward (e.g., radially outward) from the inlet engagement member wall third portion 276.

The inlet coupling flange 278 extends along a slope that is angled with respect to the inlet engagement member wall third portion 276. The angle of the slope is between 90° and 180° with respect to an extending direction of the inlet engagement member wall third portion 276. As shown in FIG. 19, the inlet engagement member wall 270 also includes an inlet engagement member wall second curved portion 277. The inlet engagement member wall second curved portion 277 is contiguous with the inlet engagement member wall third portion 276 and the inlet coupling flange 278. The inlet engagement member wall second curved portion 277 extends outward (e.g., radially outwardly and axially outwardly, etc.) from the inlet engagement member wall third portion 276. More specifically, the inlet engagement member wall second curved portion 277 extends along a curved path between the inlet engagement member wall third portion 276 and the inlet coupling flange 278.

The outlet engagement member 240 is upstream of the outlet body wall portion 236 and flares or extends outwardly (e.g., radially outwardly and axially outwardly, etc.) from the outlet body wall portion 236. The outlet engagement member 240 includes an outlet engagement member wall 280.

The outlet engagement member wall 280 includes an outlet engagement member wall first portion 282 that extends outward from the outlet body wall 236 and along a slope from the outlet body wall 236. The slope is angled with respect to an extending direction of the outlet body 232. The outlet engagement member wall first portion 282 is contiguous with the outlet body wall 236.

The outlet engagement member wall 280 includes an outlet engagement member wall second portion 284 that extends outward (e.g., axially outward) and in an upstream direction from the outlet engagement member wall first portion 282. The outlet engagement member wall second portion 284 extends along a slope that is angled with respect to the outlet engagement member wall first portion 282. In some embodiments, the outlet engagement member wall second portion 284 is substantially parallel to the extending direction of the outlet body 232. The outlet engagement member wall second portion 284 is contiguous with the outlet engagement member wall first portion 282.

The outlet engagement member wall 280 includes an outlet engagement member wall third portion 286 that extends outward (e.g., radially outward) from the outlet engagement member wall second portion 284. The outlet engagement member wall third portion 286 extends along a slope that is angled with respect to the outlet engagement member wall second portion 284. More specifically, the outlet engagement member wall third portion 286 is substantially perpendicular to the outlet engagement member wall second portion 284. As shown in FIG. 19, the outlet engagement member wall 280 also includes an outlet engagement member wall first curved portion 285. The outlet engagement member wall first curved portion 285 is contiguous with the outlet engagement member wall second portion 284 and the outlet engagement member wall third portion 286. The outlet engagement member wall first curved portion 285 extends outward (e.g., radially outwardly and axially outwardly, etc.) from the outlet engagement member wall second portion 284. More specifically, the outlet engagement member wall first curved portion 285 extends along a curved path between the outlet engagement member wall second portion 284 and the outlet engagement member wall third portion 286. The outlet engagement member wall third portion 286 defines a second engagement surface 289, described in more detail herein.

The outlet engagement member wall 280 includes an outlet engagement member wall fourth portion, referred to herein as an outlet coupling flange 288). The outlet coupling flange 288 extends outward (e.g., radially outward) from the outlet engagement member wall third portion 286. The outlet coupling flange 288 extends along a slope that is angled with respect to the outlet engagement member wall third portion 286. The angle of the slope is between 90° and 180° with respect to an extending direction of the outlet engagement member wall third portion 286. As shown in FIG. 19, the outlet engagement member wall 280 also includes an outlet engagement member wall second curved portion 287. The outlet engagement member wall second curved portion 287 is contiguous with the outlet engagement member wall third portion 286 and the outlet coupling flange 288. The outlet engagement member wall second curved portion 287 extends outward (e.g., radially outwardly and axially outwardly, etc.) from the outlet engagement member wall third portion 286. More specifically, the outlet engagement member wall second curved portion 287 extends along a curved path between the outlet engagement member wall third portion 286 and the outlet coupling flange 288.

As shown in FIG. 19, the adaptor 260 is disposed between the inlet engagement member 220 and the outlet engagement member 240. In some embodiments, the adaptor 260 is coupled to the cartridge wall 254. In other embodiments, the adaptor 260 is monolithically formed with the cartridge wall 254. As described herein, the adaptor 260 cooperates with the cartridge wall 254, the inlet engagement member 220, and the outlet engagement member 240 to facilitate suspension of the cartridge 250 within the inlet body 206 and/or the outlet body 232 when a compressive force is applied to the adaptor 260.

The adaptor 260 includes an adaptor wall 290 (e.g., ring, etc.). The adaptor wall 290 includes an adaptor wall first portion 291. In some embodiments, the adaptor wall first portion 291 is coupled to the cartridge wall 254. In other embodiments, the adaptor wall first portion 291 is monolithically formed with the cartridge wall 254. The adaptor wall first portion 291 extends outward (e.g., radially outward) from the cartridge wall 254. In some embodiments, the adaptor wall first portion 291 is substantially perpendicular to an extending direction of the cartridge 250 and/or substantially perpendicular to the cartridge wall 254.

The adaptor wall 290 also includes an adaptor wall second portion 292 extending outward (e.g., radially outward, axially outward) and in a downstream direction from the adaptor wall first portion 291. The adaptor wall second portion 292 is contiguous with the adaptor wall first portion 291. A flat portion of the adaptor wall second portion 292 extends along a slope that is angled with respect to the adaptor wall first portion 291. The angle of the slope is between 90° and 180° with respect to an extending direction of the adaptor wall first portion 291.

The adaptor wall 290 also includes an adaptor wall third portion 293 that extends outward (e.g., radially outward) from the adaptor wall second portion 292. The adaptor wall third portion 293 is contiguous with the adaptor wall second portion 292. The adaptor wall third portion 293 extends along a slope that is angled with respect to the adaptor wall second portion 292. More specifically, the adaptor wall third portion 293 is substantially parallel to the inlet engagement member wall third portion 276, substantially parallel to the adaptor wall first portion 291, and substantially perpendicular to an extending direction of the cartridge 250. In some embodiments, the adaptor wall third portion 293 defines a first adaptor engagement surface 294a (e.g., an upstream adaptor engagement surface).

The adaptor wall 290 also includes an adaptor wall fourth portion 294 that extends outward (e.g., radially outward, axially outward) and in a downstream direction from the adaptor wall third portion 293. The adaptor wall fourth portion 294 is contiguous with the adaptor wall third portion 293. The adaptor wall fourth portion 294 extends along a slope that is angled with respect to the adaptor wall third portion 293. More specifically, the adaptor wall fourth portion 294 is substantially parallel to the inlet coupling flange 278.

The adaptor 260 includes an adaptor wall 290 (e.g., ring, etc.). The adaptor wall 290 includes an adaptor wall fifth portion 295. In some embodiments, the adaptor wall fifth portion 295 is coupled to the cartridge wall 254. In other embodiments, the adaptor wall fifth portion 295 is monolithically formed with the cartridge wall 254. The adaptor wall fifth portion 295 extends outward (e.g., radially outward) from the cartridge wall 254. In some embodiments, the adaptor wall fifth portion 295 is substantially perpendicular to an extending direction of the cartridge 250 and/or substantially perpendicular to the cartridge wall 254.

The adaptor wall 290 also includes an adaptor wall sixth portion 296 extending outward (e.g., radially outward, axially outward) and in an upstream direction from the adaptor wall fifth portion 295. The adaptor wall sixth portion 296 is contiguous with the adaptor wall fifth portion 295. A flat portion of the adaptor wall sixth portion 296 extends along a slope that is angled with respect to the adaptor wall fifth portion 295. The angle of the slope is between 90° and 180° with respect to an extending direction of the adaptor wall fifth portion 295.

The adaptor wall 290 also includes an adaptor wall seventh portion 297 that extends outward (e.g., radially outward) from the adaptor wall sixth portion 296. The adaptor wall seventh portion 297 is contiguous with the adaptor wall sixth portion 296. The adaptor wall seventh portion 297 extends along a slope that is angled with respect to the adaptor wall sixth portion 296. More specifically, the adaptor wall seventh portion 297 is substantially parallel to the outlet engagement member wall third portion 286, substantially parallel to the adaptor wall fifth portion 295, and substantially perpendicular to an extending direction of the cartridge 250. In some embodiments, the adaptor wall seventh portion 297 defines a second adaptor engagement surface 298a (e.g., a downstream adaptor engagement surface).

The adaptor wall 290 also includes an adaptor wall eighth portion 298 that extends outward (e.g., radially outward, axially outward) and in an upstream direction from the adaptor wall seventh portion 297. The adaptor wall eighth portion 298 is contiguous with the adaptor wall seventh portion 297. The adaptor wall eighth portion 298 extends along a slope that is angled with respect to the adaptor wall seventh portion 297. More specifically, the adaptor wall eighth portion 298 is substantially parallel to the outlet coupling flange 288.

The adaptor wall 290 also includes an adaptor wall ninth portion 299 that extends between the adaptor wall fourth portion 294 and the adaptor wall eighth portion 298. More specifically, the adaptor wall ninth portion 299 extends outward (e.g., radially outward, axially outward) and in a downstream direction from the adaptor wall fourth portion 294 towards an apex and extends inward (e.g., radially inward) in the downstream direction from the apex towards the adaptor wall eighth portion 298. The adaptor wall ninth portion 299 is contiguous with the adaptor wall fourth portion 294 and the adaptor wall eighth portion 298.

In some embodiments, when a compressive force is applied to the inlet engagement member 220 and the outlet engagement member 240, the compressive force is also applied to the adaptor 260, enabling the adaptor 260 to suspend the cartridge 250 within the inlet body 206 and the outlet body 232.

In some embodiments, when a compressive force is applied to the inlet engagement member 220 and the outlet engagement member 240, or, more specifically, the first engagement surface 279, engages the adaptor wall third portion 293, or, more specifically, the upstream adaptor engagement surface 294a, to form a first seal therebetween, and the outlet engagement member wall third portion 286, or, more specifically, the second engagement surface 289, engages the adaptor wall seventh portion 297, or, more specifically, the downstream adaptor engagement surface 298a, to form a second seal therebetween.

In some embodiments, the aftertreatment system 200 shown in FIG. 19 includes the first gasket 246, also referred to herein as a first sealing member. The first gasket 246 is disposed between the inlet engagement member wall 270, or more specifically, the inlet engagement member wall third portion 276 and the adaptor wall third portion 293 such that the first gasket 246 is separated from the cartridge wall 254 by the adaptor 260. The first gasket 246 establishes a first seal between the inlet engagement member wall 270, or, more specifically, the first engagement surface 279, and the adaptor wall third portion 293, or, more specifically, the upstream adaptor engagement surface 294a. For example, the first gasket 246 engages the first engagement surface 279 and the upstream adaptor engagement surface 294a to form a first seal therebetween. In this way, when a compressive force is applied to the inlet coupling flange 278, the first gasket 246 is compressed between the inlet engagement member wall third portion 276 and the adaptor wall third portion 293.

Similarly, the aftertreatment system 200 may include a second gasket 248, also referred to herein as a second sealing member. The second gasket 248 is disposed between the outlet engagement member wall 280, or more specifically, the outlet engagement member wall third portion 286 and the adaptor wall seventh portion 297 such that the second gasket 248 is separated from the cartridge wall 254 by the adaptor 260. The second gasket 248 establishes a second seal between the outlet engagement member wall third portion 286, or, more specifically, the second engagement surface 289, and the adaptor wall seventh portion 297, or, more specifically, the downstream adaptor engagement surface 298a. For example, the second gasket 248 engages the second engagement surface 289 and the downstream adaptor engagement surface 298a to form a second seal therebetween. In this way, when a compressive force is applied to the outlet coupling flange 288, the second gasket 248 is compressed between the outlet coupling flange 288 and the adaptor wall eighth portion 298.

In other embodiments, the first gasket 246 and/or the second gasket 248 is/are disposed in a different location than as shown in FIG. 19. In these embodiments, the first gasket 246 may be positioned between the inlet engagement member 220 and the adaptor 260 and/or the second gasket 248 may be positioned between the outlet engagement member 240 and the adaptor 260. In other embodiments, the aftertreatment system 200 does not include the first gasket 246 and/or the second gasket 248. In these embodiments, a first seal (e.g., a metal-to-metal seal) may be formed by the inlet coupling flange 278 engaging the adaptor wall fourth portion 294. A second seal (e.g., a metal-to-metal seal) may be formed by the outlet coupling flange 288 engaging the adaptor wall eighth portion 298. Advantageously, when the aftertreatment system 200 does not include the first gasket 246 and/or the second gasket 248 the quantity of components in the joint created by the inlet engagement member 220, the outlet engagement member 240 and the adaptor 260, is reduced thereby simplifying the manufacturing process, assembly process, and replacement process. In some embodiments, the metal-to-metal contact between the inlet engagement member 220 and the adaptor 260 and/or the metal-to-metal contact between the outlet engagement member 240 and the adaptor 260 also mitigates against gasket creep.

In some embodiments, the metal-to-metal contact between the inlet engagement member 220 and the adaptor 260 and/or the metal-to-metal contact between the outlet engagement member 240 and the adaptor 260 does not form a seal therebetween. In some embodiments, the metal-to-metal contact between the inlet engagement member 220 and the adaptor 260 and/or the metal-to-metal contact between the outlet engagement member 240 and the adaptor 260 provides an alternate path for external forces to pass through the joint created by the inlet engagement member 220, the outlet engagement member 240 and the adaptor 260. Advantageously, the metal-to-metal contact between the inlet engagement member 220 and the adaptor 260 and/or the metal-to-metal contact between the outlet engagement member 240 and the adaptor 260 avoids over-compression of the gaskets (e.g., the first gasket 246 and/or the second gasket 248) due to external forces. In some embodiments, the metal-to-metal contact between the inlet engagement member 220 and the adaptor 260 and/or the metal-to-metal contact between the outlet engagement member 240 and the adaptor 260 also enables control of gasket compression thru the fit between the metal components and the gaskets. For example, the cross sectional space created by the fit of the metal components (e.g., the inlet engagement member 220, the outlet engagement member 240 and the adaptor 260) is slightly smaller than the cross section of the gaskets (e.g., the first gasket 246 and/or the second gasket 248) thereby controlling the amount of gasket compression.

Figure 20:
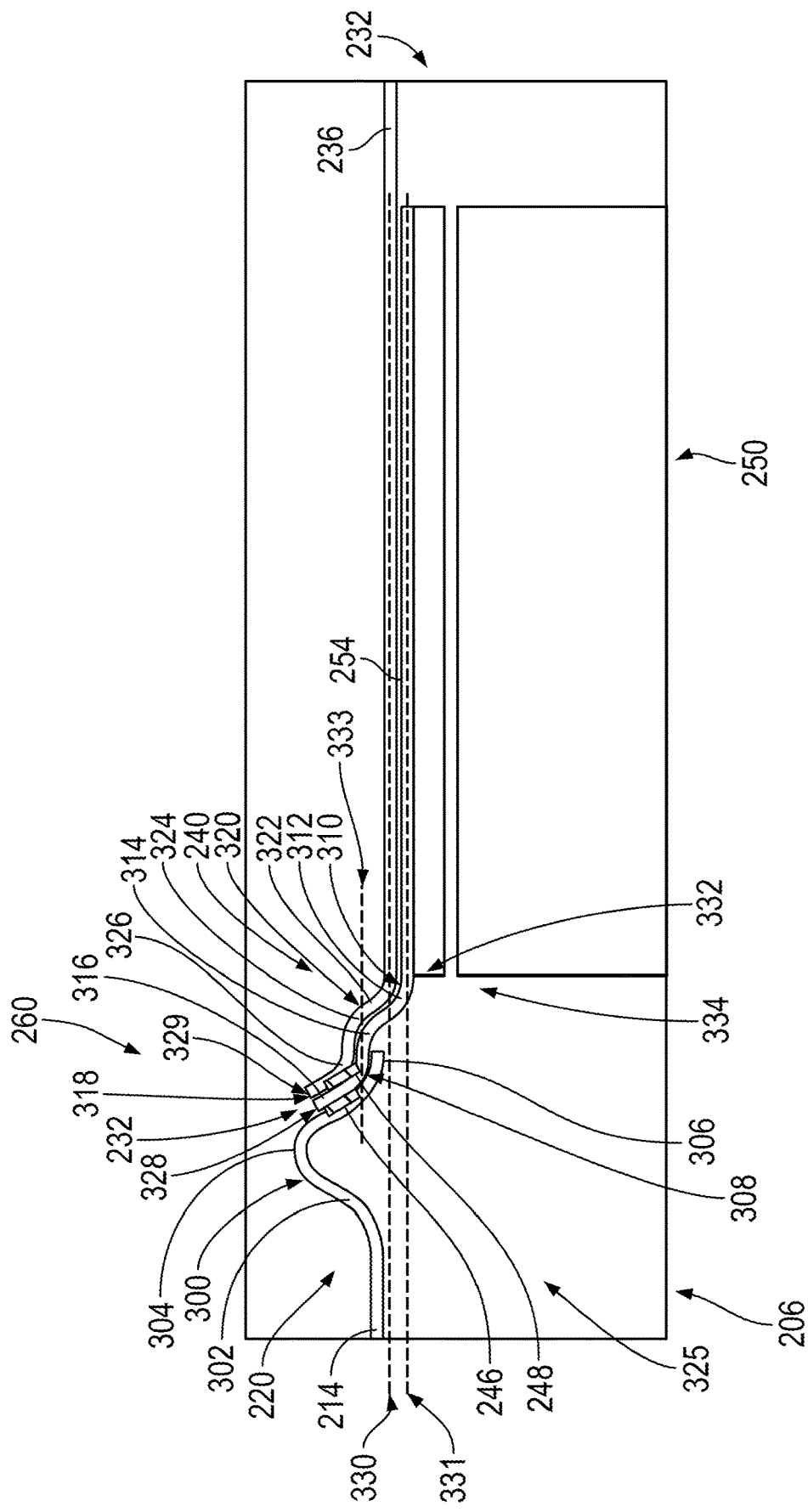
FIG. 20 is a cross-sectional view of the aftertreatment system shown in FIG. 17, according to another example embodiment.

Now referring to FIG. 20 is a cross-sectional view of the aftertreatment system 200 is shown according to another example embodiment. In the embodiment shown in FIG. 20, the inlet engagement member 220 is downstream of the inlet body wall portion 214 and flares or extends outwardly (e.g., radially outwardly and axially outwardly, etc.) from the inlet body wall portion 214. The inlet engagement member 220 includes an inlet engagement member wall 300.

The inlet engagement member wall 300 includes an inlet engagement member wall first portion 302 that extends outward (e.g., radially outward and/or axially outward), in a downstream direction, and along a slope from the inlet body wall 214. The slope is angled with respect to an extending direction of the inlet body 206. In some embodiments, the slope is between 15° and 90° with respect to the extending direction of the inlet body 206. In some embodiments, the inlet engagement member wall first portion 302 is curved such that the inlet engagement member wall first portion 302 defines a curved wall portion between the inlet body wall 214 and a downstream portion of the inlet engagement member wall first portion 302, where the downstream portion of the inlet engagement member wall first portion 302 extends along the slope. The inlet engagement member wall first portion 302 is contiguous with the inlet body wall 214.

The inlet engagement member wall 300 includes an inlet engagement member wall second portion 304 that extends in a downstream direction from the inlet engagement member wall first portion 302. In some embodiments, the inlet engagement member wall second portion 304 is a curved wall portion. In some embodiments, the inlet engagement member wall second portion 304 at least partially extends outward (e.g., radially outward) from the inlet engagement member wall first portion 302. More specifically, an upstream portion of the inlet engagement member wall second portion 304 extends in a radially outward and in the downstream direction from the inlet engagement member wall first portion 302. A downstream portion of the inlet engagement member wall second portion 304 extends radially inward and in the downstream direction from the upstream portion of the inlet engagement member wall second portion 304.

The inlet engagement member wall 300 includes an inlet engagement member wall third portion 306, referred to herein as an inlet coupling flange 306. The inlet coupling flange 306 extends outward from the inlet body wall 214 (e.g., axially outward) in the downstream direction. The inlet coupling flange 306 extends that extends inward (e.g., radially inward), in a downstream direction, and along a slope from the inlet engagement member wall second portion 304. The slope is angled with respect to an extending direction of the inlet body 206. In some embodiments, the slope is between 15° and 90° with respect to the extending direction of the inlet body 206. In some embodiments, the inlet engagement member wall third portion 306 is curved such that the inlet engagement member wall third portion 306 defines a curved wall portion between inlet engagement member wall second portion 304 and a downstream portion of the inlet engagement member wall third portion 306, where the downstream portion of the inlet engagement member wall third portion 306 extends along the slope. The inlet engagement member wall third portion 306 is contiguous with the inlet engagement member wall second portion 304. In some embodiments, the inlet engagement member wall third portion 306 defines an inlet coupling flange such that the inlet coupling flange that extends outward from the inlet body wall 214 in a downstream direction.

The outlet engagement member 240 is upstream of the outlet body wall portion 236 and flares or extends outwardly (e.g., radially outwardly and axially outwardly, etc.) from the outlet body wall portion 236. The outlet engagement member 240 includes an outlet engagement member wall 310.

The outlet engagement member wall 310 includes an outlet engagement member wall first portion 312 that extends outward (e.g., radially outward) from the outlet body wall 236 in an upstream direction. More specifically, at least a portion of the outlet engagement member wall first portion 312 extends outward from the outlet body wall 236 at a first angle with respect to an extending direction of the outlet body wall 236. The first angle is defined between the extending direction of the outlet body wall 236, shown as a dashed line 330, and the slope, shown as a dotted line 332. The outlet engagement member wall first portion 312 is continuous with the outlet body wall 236.

The outlet engagement member wall 310 includes an outlet engagement member wall second portion 314 that extends outward (e.g., axially outward) from the outlet engagement member wall first portion 312 in the upstream direction. More specifically, at least a portion of the outlet engagement member wall second portion 314 extends outward from the outlet engagement member wall first portion 312 at a second angle with respect to an extending direction of the outlet body wall 236. The second angle is defined between the extending direction of the outlet body wall 236 (e.g., the dashed line 330), and the slope, shown as a dashed line 333. The outlet engagement member wall second portion 314 is continuous with the outlet engagement member wall first portion 312.

The outlet engagement member wall 310 includes an outlet engagement member wall third portion 316 that extends outward (e.g., axially outward) from the outlet engagement member wall second portion 314 in the upstream direction. More specifically, at least a portion of the outlet engagement member wall third portion 316 extends outward from the outlet engagement member wall second portion 314 at a third angle with respect to an extending direction of the outlet body wall 236. The third angle is defined between the extending direction of the outlet body wall 236 (e.g., the dashed line 330), and the slope, shown as a dotted line 334. The outlet engagement member wall third portion 316 is continuous with the outlet engagement member wall second portion 314. In some embodiments, the outlet engagement member wall third portion 316 defines an outlet coupling flange such that the outlet coupling flange that extends outward from the outlet body wall 236 in an upstream direction.

The adaptor 260 is upstream of the outlet body wall portion 236 and flares or extends outwardly (e.g., radially outwardly and axially outwardly, etc.) from the outlet body wall portion 236. The outlet engagement member 240 includes an outlet engagement member wall 310.

The outlet engagement member wall 310 includes an outlet engagement member wall first portion 312 that extends outward (e.g., radially outward) from the outlet body wall 236 in an upstream direction. More specifically, at least a portion of the outlet engagement member wall first portion 312 extends outward from the outlet body wall 236 at a first angle with respect to an extending direction of the outlet body wall 236. The first angle is defined between the extending direction of the outlet body wall 236, shown as a dashed line 330, and the slope, shown as a dotted line 332. The outlet engagement member wall first portion 312 is continuous with the outlet body wall 236. More specifically, a downstream side of the outlet engagement member wall first portion 312 is contiguous with an upstream side of the outlet body wall 236.

The outlet engagement member wall 310 includes an outlet engagement member wall second portion 314 that extends outward (e.g., axially outward) from the outlet engagement member wall first portion 312 in the upstream direction. More specifically, at least a portion of the outlet engagement member wall second portion 314 extends outward from the outlet engagement member wall first portion 312 at a second angle with respect to an extending direction of the outlet body wall 236. The second angle is defined between the extending direction of the outlet body wall 236 (e.g., the dashed line 330), and the slope, shown as a dashed line 333. The outlet engagement member wall second portion 314 is continuous with the outlet engagement member wall first portion 312.

The outlet engagement member wall 310 includes an outlet engagement member wall third portion 316 that extends outward (e.g., axially outward) from the outlet engagement member wall second portion 314 in the upstream direction. More specifically, at least a portion of the outlet engagement member wall third portion 316 extends outward from the outlet engagement member wall second portion 314 at a third angle with respect to an extending direction of the outlet body wall 236. The third angle is defined between the extending direction of the outlet body wall 236 (e.g., the dashed line 330), and the slope, shown as a dotted line 334. The outlet engagement member wall third portion 316 is continuous with the outlet engagement member wall second portion 314.

The adaptor 260 is disposed between the inlet engagement member 220 and the outlet engagement member 240. In some embodiments, the adaptor 260 is coupled to the cartridge wall 254. In other embodiments, the adaptor 260 is monolithically formed with the cartridge wall 254. As described herein, the adaptor 260 cooperates with the cartridge wall 254, the inlet engagement member 220, and the outlet engagement member 240 to facilitate suspension of the cartridge 250 within the inlet body 206 and/or the outlet body 232 when a compressive force is applied to the adaptor 260. The adaptor 260 includes an adaptor wall 320.

The adaptor wall 320 includes an adaptor wall first portion 322 that extends outward (e.g., radially outward) from the cartridge wall 254 in an upstream direction. More specifically, at least a portion of the adaptor wall first portion 322 extends outward from the cartridge wall 254 at the first angle with respect to an extending direction of the cartridge 250. As described above, the first angle is defined between the extending direction of the outlet body wall 236, shown as a dashed line 330, and the slope, shown as a dotted line 332. The adaptor wall first portion 322 is contiguous with the cartridge wall 254. More specifically, a downstream side of the adaptor wall first portion 322 is contiguous with an upstream side of the cartridge wall 254.

The adaptor wall 320 includes an adaptor wall second portion 324 that extends outward (e.g., axially outward) from the adaptor wall first portion 322 in the upstream direction. More specifically, at least a portion of the adaptor wall second portion 324 extends outward from the outlet engagement member wall first portion 312 at the second angle with respect to an extending direction of the cartridge wall 254. As described above, the second angle is defined between the extending direction of the cartridge wall 254 (e.g., the dashed line 330), and the slope, shown as a dashed line 333. The adaptor wall second portion 324 is continuous with the adaptor wall first portion 322.

The adaptor wall 320 includes an adaptor wall third portion 326 that extends outward (e.g., axially outward) from the adaptor wall second portion 324 in the upstream direction. More specifically, at least a portion of the adaptor wall third portion 326 extends outward from the adaptor wall second portion 324 at the third angle with respect to an extending direction of the cartridge wall 254. As described above, the third angle is defined between the extending direction of the outlet cartridge wall 254 (e.g., the dashed line 330), and the slope, shown as a dotted line 334. The adaptor wall third portion 326 is continuous with the adaptor wall second portion 324. In some embodiments, the adaptor wall third portion 326 defines an adaptor coupling flange.

As shown in FIG. 20, a shape of the outlet engagement member 240 conforms to a shape of the adaptor 260 such that the adaptor coupling flange is disposed between the inlet engagement member wall third portion 306 (e.g., the inlet coupling flange) and the outlet coupling flange. As used herein, "conform", or more specifically, "conforming to a shape" refers to an arrangement of two or more parts that have similar shapes. For example, the two shapes that conform to each other may be congruent such that the two shapes are substantially similar in shape and size such that corresponding surfaces of the shapes are parallel, coaxial, or otherwise similar. In other arrangements, congruent shapes may be mirror images of each other.

In some embodiments, an upstream side of the adaptor wall third portion 326 (e.g., the adaptor coupling flange) defines a first adaptor engagement surface 328. In some embodiments, a downstream side of the adaptor wall first portion 322, a downstream side of the adaptor wall second portion 324, and a downstream side of the adaptor wall third portion 326 (e.g., the adaptor coupling flange) cooperate to define a second adaptor engagement surface 329.

In some embodiments, an upstream side of the outlet engagement member wall first portion 312, an upstream side of the outlet engagement member wall second portion 314, and an upstream side of the outlet engagement member wall third portion 316 (e.g., the outlet coupling flange) cooperate to define an outlet engagement surface 318.

In some embodiments, a downstream side of the inlet engagement member wall third portion 306 (e.g., the inlet coupling flange) defines an inlet engagement surface 308.

In some embodiments, when a compressive force is applied to the inlet engagement member 220 and the outlet engagement member 240, the compressive force is also applied to the adaptor 260, enabling the adaptor 260 to suspend the cartridge 250 within the inlet body 206 and the outlet body 232.

In some embodiments, the inlet engagement surface engages the first adaptor engagement surface to form a first seal therebetween. In some embodiments, the outlet engagement surface engages the second adaptor engagement surface to form a second seal therebetween.

In some embodiments, the aftertreatment system 200 shown in FIG. 20 includes the first gasket 246, also referred to herein as a first sealing member. The first gasket 246 is disposed between the inlet engagement member wall third portion 306 (e.g., the inlet coupling flange, the inlet engagement surface 308) and the upstream side of the adaptor wall third portion 326 (e.g., the adaptor coupling flange), or more specifically, the first adaptor engagement surface, such that the first gasket 246 is separated from the cartridge wall 254 by the adaptor 260. The first gasket 246 establishes a first seal between the inlet engagement member wall third portion 306 (e.g., the inlet coupling flange, the inlet engagement surface 308), and the upstream side of the adaptor wall third portion 326 (e.g., the adaptor coupling flange, the outlet engagement surface 318), or more specifically, the inlet engagement surface 308. For example, the first gasket 246 engages the inlet coupling flange and the first adaptor engagement surface 328 to form a first seal therebetween. In this way, when a compressive force is applied to the inlet engagement member wall third portion 306, the first gasket 246 is compressed between the inlet engagement member wall third portion 306 and the adaptor wall third portion 326.

Similarly, the aftertreatment system 200 may include a second gasket 248, also referred to herein as a second sealing member. The second gasket 248 is disposed between the upstream side of the outlet engagement member wall third portion 316 (e.g., the outlet coupling flange, the outlet engagement surface 318) and the downstream side of the adaptor wall third portion 326 (e.g., the adaptor coupling flange) such that the second gasket 248 is separated from the cartridge wall 254 by the adaptor 260. The second gasket 248 establishes a second seal between the outlet engagement member wall third portion 316 (e.g., the outlet coupling flange), and the downstream side of the adaptor wall third portion 326 (e.g., the adaptor coupling flange). For example, the second gasket 248 engages the outlet engagement member wall third portion 316 and the adaptor coupling flange to form a second seal therebetween. In this way, when a compressive force is applied to the outlet engagement member wall third portion 316, the second gasket 248 is compressed between the outlet engagement member wall third portion 316 and the second adaptor wall third portion 326.

In other embodiments, the first gasket 246 and/or the second gasket 248 is/are disposed in a different location than as shown in FIG. 20. In these embodiments, the first gasket 246 may be positioned between the inlet engagement member 220 and the adaptor 260 and/or the second gasket 248 may be positioned between the outlet engagement member 240 and the adaptor 260. In other embodiments, the aftertreatment system 200 does not include the first gasket 246 and/or the second gasket 248. In these embodiments, a first seal (e.g., a metal-to-metal seal) may be formed by the inlet engagement member wall third portion 306 engaging the adaptor wall third portion 326. A second seal (e.g., a metal-to-metal seal) may be formed by the outlet engagement member wall third portion 316 engaging the second adaptor wall third portion 326. Advantageously, when the aftertreatment system 200 does not include the first gasket 246 and/or the second gasket 248 the quantity of components in the joint created by the inlet engagement member 220, the outlet engagement member 240 and the adaptor 260, is reduced thereby simplifying the manufacturing process, assembly process, and replacement process. In some embodiments, the metal-to-metal contact between the inlet engagement member 220 and the adaptor 260 and/or the metal-to-metal contact between the outlet engagement member 240 and the adaptor 260 also mitigates against gasket creep.

In some embodiments, the metal-to-metal contact between the inlet engagement member 220 and the adaptor 260 and/or the metal-to-metal contact between the outlet engagement member 240 and the adaptor 260 does not form a seal therebetween. In some embodiments, the metal-to-metal contact between the inlet engagement member 220 and the adaptor 260 and/or the metal-to-metal contact between the outlet engagement member 240 and the adaptor 260 provides an alternate path for external forces to pass through the joint created by the inlet engagement member 220, the outlet engagement member 240 and the adaptor 260. Advantageously, the metal-to-metal contact between the inlet engagement member 220 and the adaptor 260 and/or the metal-to-metal contact between the outlet engagement member 240 and the adaptor 260 avoids over-compression of the gaskets (e.g., the first gasket 246 and/or the second gasket 248) due to external forces. In some embodiments, the metal-to-metal contact between the inlet engagement member 220 and the adaptor 260 and/or the metal-to-metal contact between the outlet engagement member 240 and the adaptor 260 also enables control of gasket compression thru the fit between the metal components and the gaskets. For example, the cross sectional space created by the fit of the metal components (e.g., the inlet engagement member 220, the outlet engagement member 240 and the adaptor 260) is slightly smaller than the cross section of the gaskets (e.g., the first gasket 246 and/or the second gasket 248) thereby controlling the amount of gasket compression.

Figure 21:
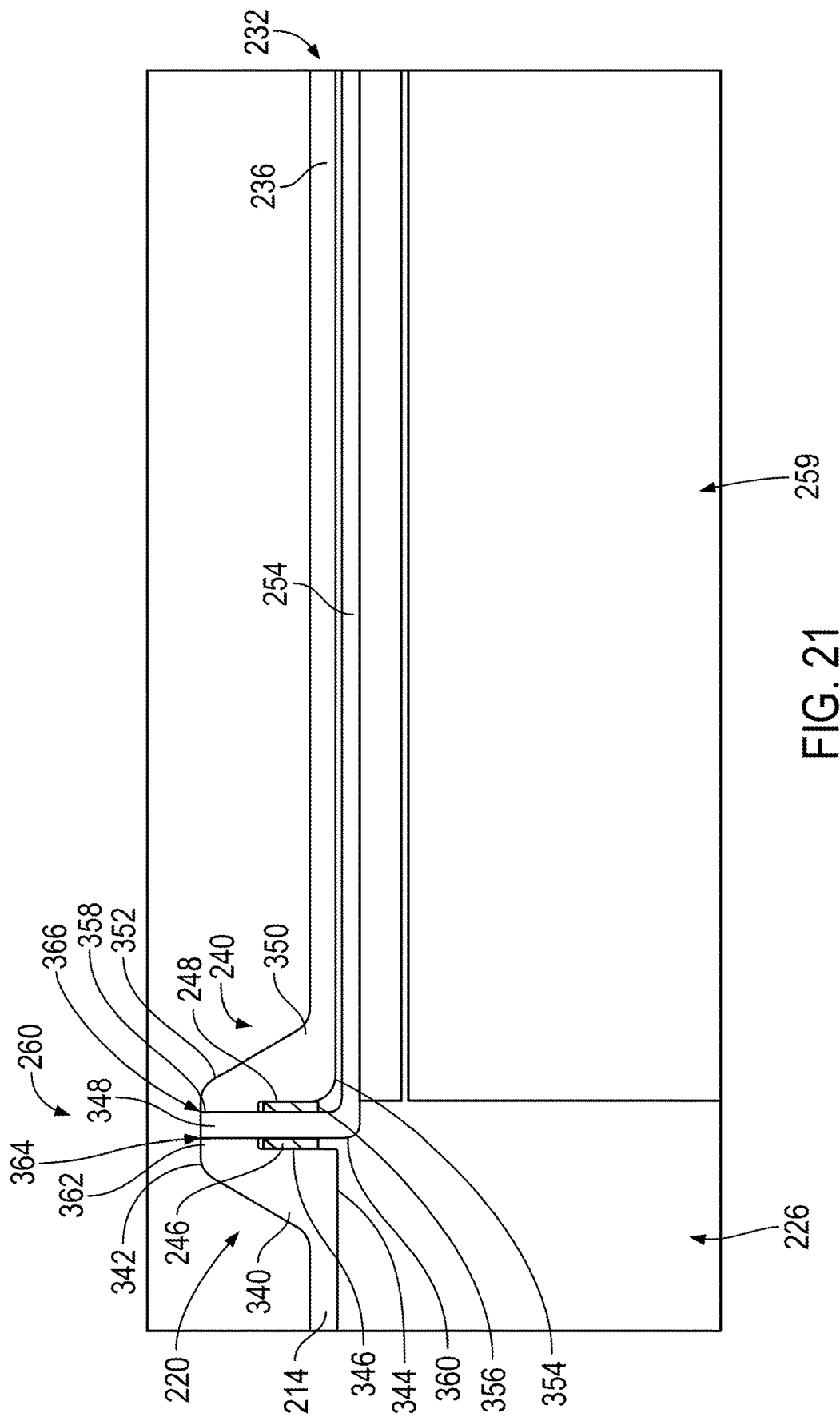
FIG. 21 is a cross-sectional view of the aftertreatment system shown in FIG. 17, according to another example embodiment.

FIG. 21 is a cross-sectional view of the aftertreatment system 200, according to another example embodiment. In the embodiment shown in FIG. 21, the inlet engagement member 220 is downstream of the inlet body wall portion 214 and flares or extends outwardly (e.g., radially outwardly and axially outwardly, etc.) and in a downstream direction from the inlet body wall portion 214. The inlet engagement member 220 includes an inlet engagement member wall 340.

The inlet engagement member wall 340 extends outward from the inlet body wall 214. At least a portion of the inlet engagement member wall 340 extends along a slope from the inlet body wall 214. The slope is angled with respect to an extending direction of the inlet body 206. The angle is between 15° and 90° with respect to the extending direction of the inlet body 206. The inlet engagement member wall 340 is contiguous with the inlet body wall 214.

The inlet engagement member wall 340 includes an inlet engagement member wall first surface 342 (e.g., an outer surface, an inlet engagement member wall outer surface) that extends along the slope. The inlet engagement member wall 340 also includes an inlet engagement member wall second surface 344 (e.g., an inner surface, an inlet engagement member wall inner surface) that extends substantially parallel to the extending direction of the inlet body 206. The inlet engagement member wall 340 also includes an inlet engagement member wall third surface 346 (e.g., a radial surface, an inlet engagement member wall radial surface) that extends in a radial direction substantially perpendicular to the extending direction of the inlet body 206 and/or the inlet engagement member wall second surface 344.

The inlet engagement member 220 also includes an inlet coupling flange 348 that extends outward (e.g., axially outward) in a downstream direction from the inlet engagement member wall 340. More specifically, the inlet coupling flange 348 extends away from the inlet engagement member wall third surface 346 in the downstream direction. The inlet coupling flange 348 is contiguous with the inlet engagement member wall 340.

The outlet body 232 includes an outlet engagement member 240 that is positioned upstream of the outlet body wall 236 and flares or extends outwardly (e.g., radially outwardly and axially outwardly, etc.) and in an upstream direction from the outlet body wall 236. The outlet engagement member 240 includes an outlet engagement member wall 350.

The outlet engagement member wall 350 extends outward from the outlet body wall 236. At least a portion of the outlet engagement member wall 350 extends along a slope from the outlet body wall 236. The slope is angled with respect to an extending direction of the outlet body 232. The angle is between 15° and 90° with respect to the extending direction of the outlet body 232. The outlet engagement member wall 350 is contiguous with the outlet body wall 236.

The outlet engagement member wall 350 includes an outlet engagement member wall first surface 352 (e.g., an outer surface, an outlet engagement member wall outer surface) that extends along the slope. The outlet engagement member wall 350 also includes an outlet engagement member wall second surface 354 (e.g., an inner surface, an outlet engagement member wall inner surface) that extends substantially parallel to the extending direction of the outlet body 232. The outlet engagement member wall 350 also includes an outlet engagement member wall third surface 356 (e.g., a radial surface, an outlet engagement member wall radial surface) that extends in a radial direction substantially perpendicular to the extending direction of the outlet body 232 and/or the outlet engagement member wall second surface 354.

The outlet engagement member wall 350 also includes an outlet coupling flange 358 that extends outward (e.g., axially outward) in an upstream direction from the outlet engagement member wall 350. More specifically, the outlet coupling flange 358 extends away from the outlet engagement member wall third surface 356 in the upstream direction. The outlet coupling flange 358 is contiguous with the outlet engagement member wall 350.

As shown in FIG. 21, the adaptor 260 is disposed between the inlet engagement member 220 and the outlet engagement member 240. In some embodiments, the adaptor 260 is coupled to the cartridge wall 254. In other embodiments, the adaptor 260 is monolithically formed with the cartridge wall 254. As described herein, the adaptor 260 cooperates with the cartridge wall 254, the inlet engagement member 220, and the outlet engagement member 240 to facilitate suspension of the cartridge 250 within the inlet body 206 and/or the outlet body 232 when a compressive force is applied to the adaptor 260.

The adaptor 260 includes a base 360 that extends outward from the cartridge wall 254 such that at least a portion of the base 360 extends upstream of the cartridge wall 254. In some embodiments, the base 360 is attached to an outer surface of the cartridge wall 254. In some embodiments, the base 360 is monolithically formed with the cartridge wall 254. In some embodiments, the base 360 is substantially parallel to or coaxial with the cartridge wall 254.

The adaptor 260 also includes a projection 362 that extends radially outward from the base 360. In some embodiments, the projection 362 is substantially perpendicular to the base 360. In some embodiments, the projection 362 is disposed between the inlet coupling flange 348 and the outlet coupling flange 358. The projection 362 includes a first engagement side 364 (e.g., an upstream side). The projection 362 also includes a second engagement side 366 (e.g., a downstream side).

In some embodiments, the first engagement side 364 of the projection 362 engages the inlet coupling flange 348. In some embodiments, the engagement of the first engagement side 364 of the projection 362 and the inlet coupling flange 348 forms a first seal therebetween. In some embodiments, the second engagement side 366 of the projection 362 engages the outlet coupling flange 358. In some embodiments, the engagement of the second engagement side 366 of the projection 362 and the outlet coupling flange 358 forms a second seal therebetween.

In some embodiments, the aftertreatment system 200 shown in FIG. 21 includes the first gasket 246, also referred to herein as a first sealing member. The first gasket 246 is disposed between the inlet engagement member wall 340 or, more specifically, inlet engagement member wall third surface 346 and the first engagement side 364 of the projection 362 such that the first gasket 246 is separated from the cartridge wall 254 by the adaptor 260. The first gasket 246 establishes a first seal between the inlet engagement member wall third surface 346 and the first engagement side 364 of the projection 362. For example, the first gasket 246 engages the inlet engagement member wall third surface 346 and the first engagement side 364 of the projection 362 to form a first seal therebetween. In this way, when a compressive force is applied to the inlet engagement member wall 340, the first gasket 246 is compressed between the inlet engagement member wall third surface 346 and the first engagement side 364 of the projection 362.

Similarly, the aftertreatment system 200 may include a second gasket 248, also referred to herein as a second sealing member. The second gasket 248 is disposed between the outlet engagement member wall 350 or, more specifically, outlet engagement member wall third surface 356 and the second engagement side 366 of the projection 362 such that the second gasket 248 is separated from the cartridge wall 254 by the adaptor 260. The second gasket 248 establishes a second seal between the outlet engagement member wall third surface 356 and the second engagement side 366 of the projection 362. For example, the second gasket 248 engages the outlet engagement member wall third surface 356 and the second engagement side 366 of the projection 362 to form a second seal therebetween. In this way, when a compressive force is applied to the outlet engagement member wall 350, the second gasket 248 is compressed between the outlet engagement member wall third surface 356 and the second engagement side 366 of the projection 362.

In other embodiments, the first gasket 246 and/or the second gasket 248 is/are disposed in a different location than as shown in FIG. 21. In these embodiments, the first gasket 246 may be positioned between the inlet engagement member 220 and the adaptor 260 and/or the second gasket 248 may be positioned between the outlet engagement member 240 and the adaptor 260. In other embodiments, the aftertreatment system 200 does not include the first gasket 246 and/or the second gasket 248. In these embodiments, a first seal (e.g., a metal-to-metal seal) may be formed by the inlet coupling flange 348 engaging the first engagement side 364 of the projection 362. A second seal (e.g., a metal-to-metal seal) may be formed by the outlet coupling flange 358 engaging the second engagement side 366 of the projection 362. Advantageously, when the aftertreatment system 200 does not include the first gasket 246 and/or the second gasket 248 the quantity of components in the joint created by the inlet engagement member 220, the outlet engagement member 240 and the adaptor 260, is reduced thereby simplifying the manufacturing process, assembly process, and replacement process. In some embodiments, the metal-to-metal contact between the inlet engagement member 220 and the adaptor 260 and/or the metal-to-metal contact between the outlet engagement member 240 and the adaptor 260 also mitigates against gasket creep.

In some embodiments, the metal-to-metal contact between the inlet engagement member 220 and the adaptor 260 and/or the metal-to-metal contact between the outlet engagement member 240 and the adaptor 260 does not form a seal therebetween. In some embodiments, the metal-to-metal contact between the inlet engagement member 220 and the adaptor 260 and/or the metal-to-metal contact between the outlet engagement member 240 and the adaptor 260 provides an alternate path for external forces to pass through the joint created by the inlet engagement member 220, the outlet engagement member 240 and the adaptor 260. Advantageously, the metal-to-metal contact between the inlet engagement member 220 and the adaptor 260 and/or the metal-to-metal contact between the outlet engagement member 240 and the adaptor 260 avoids over-compression of the gaskets (e.g., the first gasket 246 and/or the second gasket 248) due to external forces. In some embodiments, the metal-to-metal contact between the inlet engagement member 220 and the adaptor 260 and/or the metal-to-metal contact between the outlet engagement member 240 and the adaptor 260 also enables control of gasket compression thru the fit between the metal components and the gaskets. For example, the cross sectional space created by the fit of the metal components (e.g., the inlet engagement member 220, the outlet engagement member 240 and the adaptor 260) is slightly smaller than the cross section of the gaskets (e.g., the first gasket 246 and/or the second gasket 248) thereby controlling the amount of gasket compression.

Figure 22:
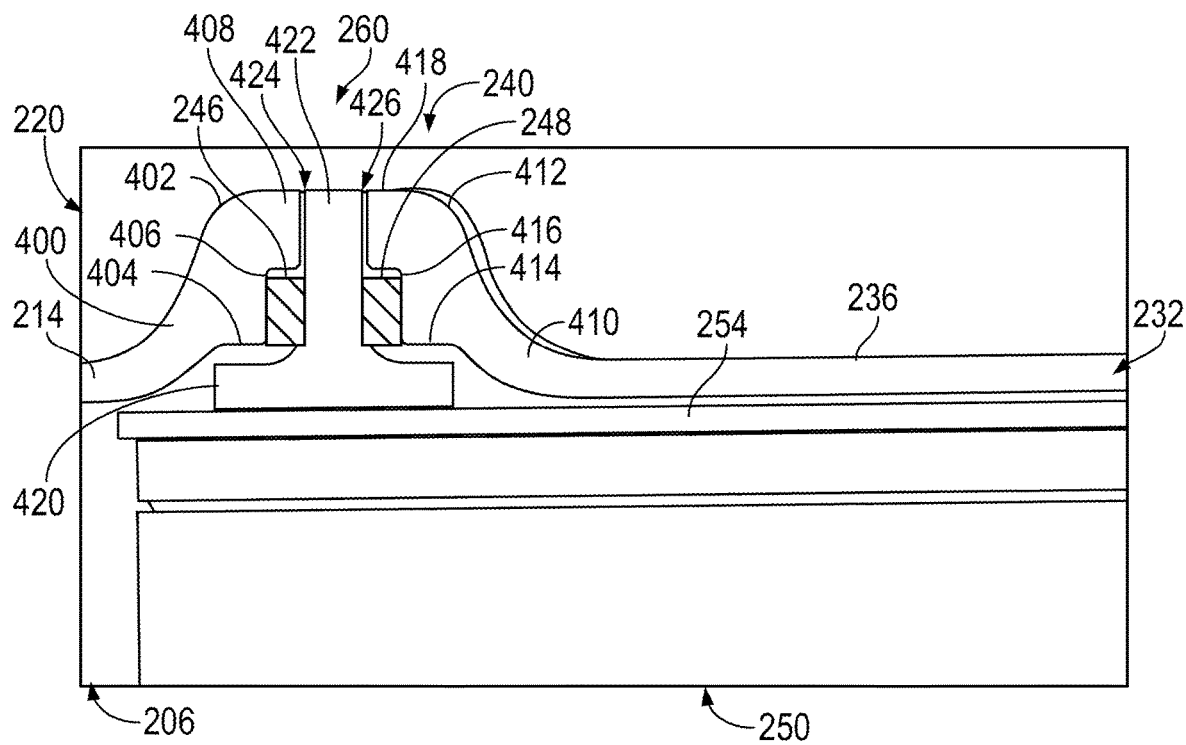
FIG. 22 is a cross-sectional view of the aftertreatment system shown in FIG. 17, according to another example embodiment.

FIG. 22 is a cross-sectional view of the aftertreatment system 200, according to another example embodiment. In the embodiment shown in FIG. 22, the inlet engagement member 220 is downstream of the inlet body wall portion 214 and flares or extends outwardly (e.g., radially outwardly and axially outwardly, etc.) and in a downstream direction from the inlet body wall portion 214. The inlet engagement member 220 includes an inlet engagement member wall 400.

The inlet engagement member wall 400 extends outward from the inlet body wall 214. In some embodiments, at least a portion of the inlet engagement member wall 400 extends along a slope from the inlet body wall 214. The slope is angled with respect to an extending direction of the inlet body 206. The angle is between 15° and 90° with respect to the extending direction of the inlet body 206. In other embodiments, at least a portion of the inlet engagement member wall 400 extends along a curved path from the inlet body wall 214. The inlet engagement member wall 400 is contiguous with the inlet body wall 214.

The inlet engagement member wall 400 includes an inlet engagement member wall first surface 402 (e.g., an outer surface, an inlet engagement member wall outer surface) that extends along the slope and/or the curved path. The inlet engagement member wall 400 also includes an inlet engagement member wall second surface 404 (e.g., an inner surface, an inlet engagement member wall inner surface) that extends substantially parallel to the extending direction of the inlet body 206. In some embodiments, the inlet engagement member wall second surface 404 is spaced away from the inlet body wall 214 in a radially outward direction. The inlet engagement member wall 400 also includes an inlet engagement member wall third surface 406 (e.g., a radial surface, an inlet engagement member wall radial surface) that extends in a radial direction substantially perpendicular to the extending direction of the inlet body 206 and/or the inlet engagement member wall second surface 404.

The inlet engagement member 220 also includes an inlet coupling flange 408 that extends outward (e.g., axially outward) in a downstream direction from the inlet engagement member wall 400. More specifically, the inlet coupling flange 408 extends away from the inlet engagement member wall third surface 406 in the downstream direction. The inlet coupling flange 408 is contiguous with the inlet engagement member wall 400.

The outlet body 232 includes an outlet engagement member 240 that is positioned upstream of the outlet body wall 236 and flares or extends outwardly (e.g., radially outwardly and axially outwardly, etc.) and in an upstream direction from the outlet body wall 236. The outlet engagement member 240 includes an outlet engagement member wall 410.

The outlet engagement member wall 410 extends outward from the outlet body wall 236. In some embodiments, at least a portion of the outlet engagement member wall 410 extends along a slope from the outlet body wall 236. The slope is angled with respect to an extending direction of the outlet body 232. The angle is between 15° and 90° with respect to the extending direction of the outlet body 232. In other embodiments, at least a portion of the outlet engagement member wall 410 extends along a curved path from the outlet body wall 236. The outlet engagement member wall 410 is contiguous with the outlet body wall 236.

The outlet engagement member wall 410 includes an outlet engagement member wall first surface 412 (e.g., an outer surface) that extends along the slope and/or the curved path. The outlet engagement member wall 410 also includes an outlet engagement member wall second surface 414 (e.g., an inner surface) that extends substantially parallel to the extending direction of the outlet body 232. In some embodiments, the outlet engagement member wall second surface 414 is spaced radially outward from the outlet body wall 236. The outlet engagement member wall 410 also includes an outlet engagement member wall third surface 416 (e.g., a radial surface) that extends in a radial direction substantially perpendicular to the extending direction of the outlet body 232 and/or the outlet engagement member wall second surface 414.

The outlet engagement member wall 350 also includes an outlet coupling flange 418 that extends outward (e.g., axially outward) in an upstream direction from the outlet engagement member wall 410. More specifically, the outlet coupling flange 418 extends away from the outlet engagement member wall third surface 416 in the upstream direction. The outlet coupling flange 418 is contiguous with the outlet engagement member wall 410.

As shown in FIG. 22, the adaptor 260 is disposed between the inlet engagement member 220 and the outlet engagement member 240. In some embodiments, the adaptor 260 is coupled to the cartridge wall 254. In other embodiments, the adaptor 260 is monolithically formed with the cartridge wall 254. As described herein, the adaptor 260 cooperates with the cartridge wall 254, the inlet engagement member 220, and the outlet engagement member 240 to facilitate suspension of the cartridge 250 within the inlet body 206 and/or the outlet body 232 when a compressive force is applied to the adaptor 260.

The adaptor 260 includes a base 420 that is substantially parallel to and/or coaxial with the cartridge wall 254. In some embodiments, the base 420 is coupled to the cartridge wall 254. In other embodiments, the base 420 is monolithically formed with the cartridge wall 254. In some embodiments, at least a portion of the base 420 is disposed outward (e.g., radially outward) from the cartridge wall 254. In some embodiments, the base 360 is attached to an outer surface (e.g., a radially outer surface) of the cartridge wall 254.

The adaptor 260 also includes a coupler portion 422 that extends radially outward from the base 420. In some embodiments, the coupler portion 422 is substantially perpendicular to the base 420. In some embodiments, the coupler portion 422 is disposed between the inlet coupling flange 408 and the outlet coupling flange 418. The coupler portion 422 includes a first engagement side 424 (e.g., an upstream side). The coupler portion 422 also includes a second engagement side 426 (e.g., a downstream side). In some embodiments, the coupler portion 422 extends outward from a center (e.g., an axial center) of the base 420.

In some embodiments, the first engagement side of 424 the coupler portion 422 engages the inlet coupling flange 408. In some embodiments, the engagement of the first engagement side of 424 the coupler portion 422 and the inlet coupling flange 408 forms a first seal therebetween. In some embodiments, the second engagement side 426 of the coupler portion 422 engages the outlet coupling flange 418. In some embodiments, the engagement of the second engagement side 426 of the coupler portion 422 and the outlet coupling flange 418 forms a second seal therebetween.

In some embodiments, the aftertreatment system 200 shown in FIG. 22 includes the first gasket 246, also referred to herein as a first sealing member. The first gasket 246 is disposed between the inlet engagement member wall 400, or, more specifically, the inlet engagement member wall third surface 406 and the first engagement side 424 of the coupler portion 422 such that the first gasket 246 is separated from the cartridge wall 254 by the adaptor 260. The first gasket 246 establishes a first seal between the inlet engagement member wall third surface 406 and the first engagement side 424 of the coupler portion 422. For example, the first gasket 246 engages the inlet engagement member wall third surface 406 and the first engagement side 424 of the coupler portion 422 to form a first seal therebetween. In this way, when a compressive force is applied to the inlet engagement member wall 400, the first gasket 246 is compressed between the engagement member wall third surface 406 and the first engagement side 424 of the coupler portion 422.

Similarly, the aftertreatment system 200 may include a second gasket 248, also referred to herein as a second sealing member. The second gasket 248 is disposed between the outlet engagement member wall 410, or, more specifically, the outlet engagement member wall third surface 416 and the second engagement side 426 of the coupler portion 422 such that the second gasket 248 is separated from the cartridge wall 254 by the adaptor 260. The second gasket 248 establishes a second seal between the outlet engagement member wall third surface 416 and the second engagement side 426 of the coupler portion 422. For example, the second gasket 248 engages the outlet engagement member wall third surface 416 and the second engagement side 426 of the coupler portion 422 to form a second seal therebetween. In this way, when a compressive force is applied to the outlet engagement member wall 410, the second gasket 248 is compressed between the outlet engagement member wall third surface 416 and the second engagement side 426 of the coupler portion 422.

In other embodiments, the first gasket 246 and/or the second gasket 248 is/are disposed in a different location than as shown in FIG. 22. In these embodiments, the first gasket 246 may be positioned between the inlet engagement member 220 and the adaptor 260 and/or the second gasket 248 may be positioned between the outlet engagement member 240 and the adaptor 260. In other embodiments, the aftertreatment system 200 does not include the first gasket 246 and/or the second gasket 248. In these embodiments, a first seal (e.g., a metal-to-metal seal) may be formed by the inlet coupling flange 408 engaging the first engagement side 424 of the coupler portion 422. A second seal (e.g., a metal-to-metal seal) may be formed by the outlet coupling flange 418 engaging the second engagement side 426 of the coupler portion 422. Advantageously, when the aftertreatment system 200 does not include the first gasket 246 and/or the second gasket 248 the quantity of components in the joint created by the inlet engagement member 220, the outlet engagement member 240 and the adaptor 260, is reduced thereby simplifying the manufacturing process, assembly process, and replacement process. In some embodiments, the metal-to-metal contact between the inlet engagement member 220 and the adaptor 260 and/or the metal-to-metal contact between the outlet engagement member 240 and the adaptor 260 also mitigates against gasket creep.

In some embodiments, the metal-to-metal contact between the inlet engagement member 220 and the adaptor 260 and/or the metal-to-metal contact between the outlet engagement member 240 and the adaptor 260 does not form a seal therebetween. In some embodiments, the metal-to-metal contact between the inlet engagement member 220 and the adaptor 260 and/or the metal-to-metal contact between the outlet engagement member 240 and the adaptor 260 provides an alternate path for external forces to pass through the joint created by the inlet engagement member 220, the outlet engagement member 240 and the adaptor 260. Advantageously, the metal-to-metal contact between the inlet engagement member 220 and the adaptor 260 and/or the metal-to-metal contact between the outlet engagement member 240 and the adaptor 260 avoids over-compression of the gaskets (e.g., the first gasket 246 and/or the second gasket 248) due to external forces. In some embodiments, the metal-to-metal contact between the inlet engagement member 220 and the adaptor 260 and/or the metal-to-metal contact between the outlet engagement member 240 and the adaptor 260 also enables control of gasket compression thru the fit between the metal components and the gaskets. For example, the cross sectional space created by the fit of the metal components (e.g., the inlet engagement member 220, the outlet engagement member 240 and the adaptor 260) is slightly smaller than the cross section of the gaskets (e.g., the first gasket 246 and/or the second gasket 248) thereby controlling the amount of gasket compression.

Figure 23:
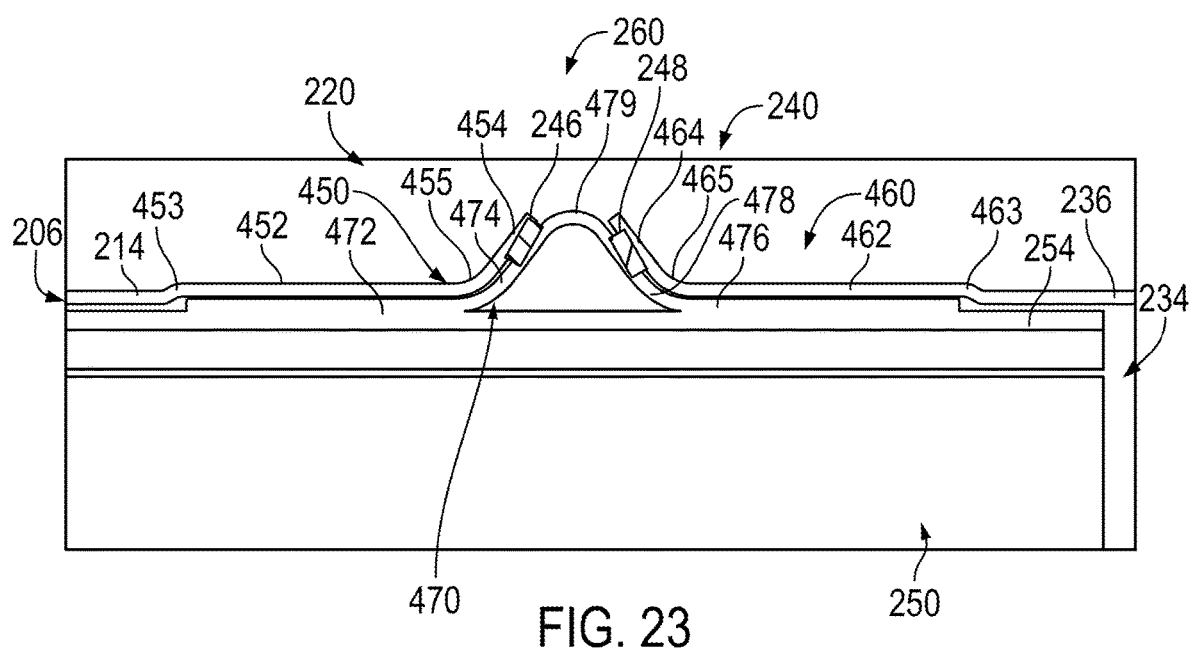
FIG. 23 is a cross-sectional view of the aftertreatment system shown in FIG. 17, according to another example embodiment.
Figure 24:
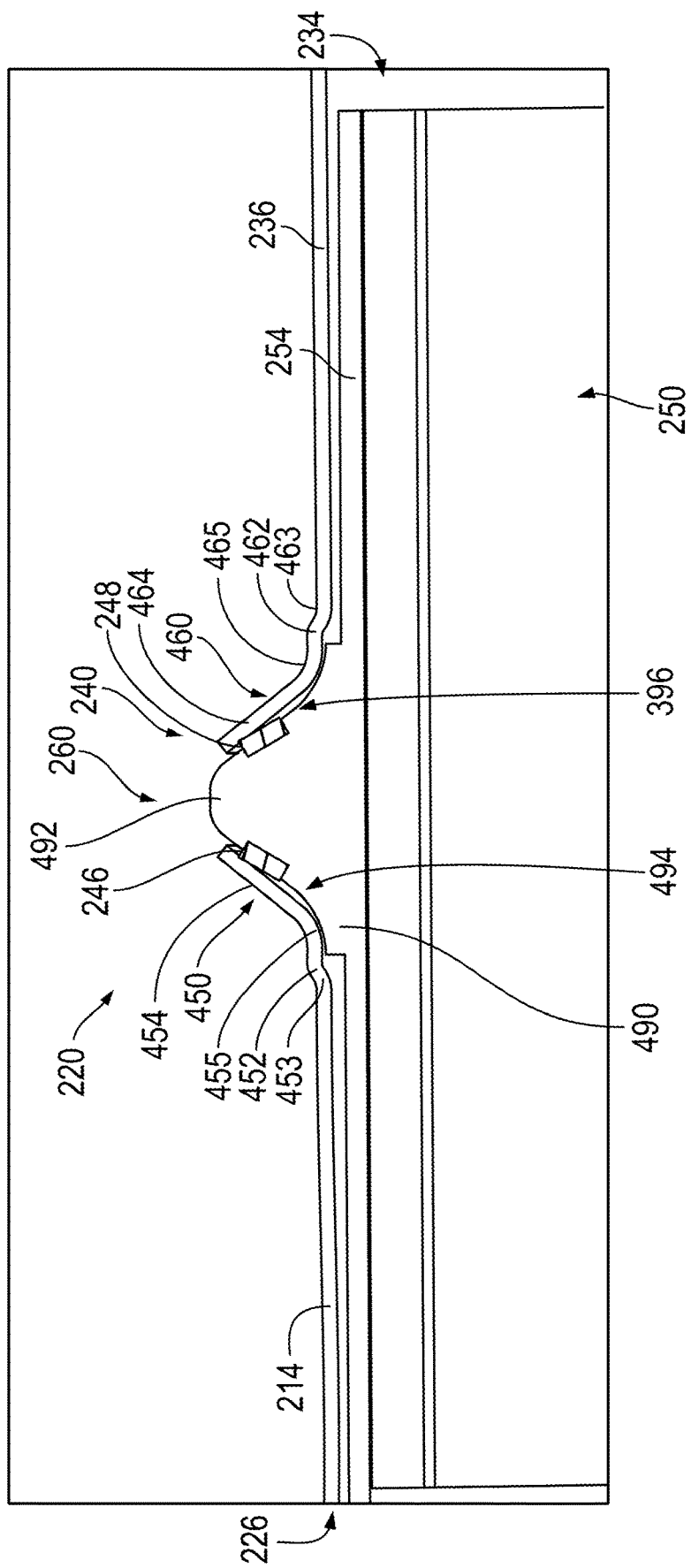
FIG. 24 is a cross-sectional view of the aftertreatment system shown in FIG. 17, according to another example embodiment.

Now referring to FIGS. 23 and 24, cross-sectional views of the aftertreatment system 200 are shown, according to a various example embodiments. In the embodiment shown in FIGS. 23 and 24, the inlet engagement member 220 is downstream of the inlet body wall portion 214 and flares or extends outwardly (e.g., radially outwardly and axially outwardly, etc.) from the inlet body wall portion 214. The inlet engagement member 220 includes an inlet engagement member wall 450.

The inlet engagement member wall 450 includes an inlet engagement member wall first portion 452 that extends outward from the inlet body wall 214 and substantially parallel to the inlet body wall 214. In some embodiments, the inlet engagement member wall first portion 452 is contiguous with the inlet body wall 214. In other embodiments, and as shown in FIGS. 23 and 24, the inlet engagement member wall 450 includes an inlet engagement member wall first curved portion 453. The inlet engagement member wall first curved portion 453 is contiguous with the inlet body wall 214 and contiguous with the inlet engagement member wall first portion 452. The inlet engagement member wall first curved portion 453 extends outward (e.g., radially outwardly and axially outwardly, etc.) from the inlet body wall 214. More specifically, the inlet engagement member wall first curved portion 453 extends along a curved path between the inlet body wall 214 and the inlet engagement member wall first portion 452.

The inlet engagement member wall 450 includes an inlet engagement member wall second portion, referred to herein as an inlet coupling flange 454. The inlet coupling flange 454 extends outward (e.g., radially outward) from the inlet engagement member wall first portion 452. The inlet coupling flange 454 extends along a slope that is angled with respect to the inlet engagement member wall first portion 452. The slope is angled with respect to an extending direction of the inlet engagement member wall first portion 452 and/or the inlet body wall 214. In some embodiments, the slope is between 15° and 90° with respect to the extending direction of the inlet engagement member wall first portion 452 and/or the inlet body wall 214. In some embodiments, the inlet coupling flange 454 is contiguous with the inlet engagement member wall first portion 452. In other embodiments, and as shown in FIGS. 23 and 24, inlet engagement member wall 450 an inlet engagement member wall second curved portion 455. The inlet engagement member wall second curved portion 455 is contiguous with inlet engagement member wall first portion 452 and contiguous with the inlet coupling flange 454. The inlet engagement member wall second curved portion 455 extends outward (e.g., radially outwardly and axially outwardly, etc.) from the inlet engagement member wall first portion 452. More specifically, the inlet engagement member wall second curved portion 455 extends along a curved path between the inlet engagement member wall first portion 452 and the inlet coupling flange 454.

The outlet engagement member 240 is upstream of the outlet body wall portion 236 and flares or extends outwardly (e.g., radially outwardly and axially outwardly, etc.) from the outlet body wall portion 236. The outlet engagement member 240 includes an outlet engagement member wall 460.

The outlet engagement member wall 460 includes outlet engagement member wall first portion 462 extends that extends outward from the outlet body wall 236 and substantially parallel to the outlet body wall 236. In some embodiments, the outlet engagement member wall first portion 462 is contiguous with the outlet body wall 236. In other embodiments, and as shown in FIGS. 23 and 24, outlet engagement member wall 460 includes an outlet engagement member wall first curved portion 463. The outlet engagement member wall first curved portion 463 is contiguous with the outlet body wall 236 and contiguous with the outlet engagement member wall first portion 462. The outlet engagement member wall first curved portion 463 extends outward (e.g., radially outwardly and axially outwardly, etc.) from the outlet body wall 236. More specifically, the outlet engagement member wall first curved portion 463 extends along a curved path between the outlet body wall 236 and the outlet engagement member wall first portion 462.

The outlet engagement member wall 460 includes an outlet engagement member wall second portion, referred to herein as an outlet coupling flange 464. The outlet coupling flange 464 extends outward (e.g., radially outward) from the outlet engagement member wall first portion 462. The outlet coupling flange 464 extends along a slope that is angled with respect to the outlet engagement member wall first portion 462. The slope is angled with respect to an extending direction of the outlet engagement member wall first portion 462 and/or the outlet body wall 236. In some embodiments, the slope is between 15° and 90° with respect to the extending direction of the outlet engagement member wall first portion 462 and/or the outlet body wall 236. In some embodiments, the outlet coupling flange 464 is contiguous with the outlet engagement member wall first portion 462. In other embodiments, and as shown in FIGS. 23 and 24, the outlet coupling flange 464 includes an outlet engagement member wall second curved portion 465. The outlet engagement member wall second curved portion 465 is contiguous with outlet engagement member wall first portion 462 and contiguous with outlet coupling flange 464. The outlet engagement member wall second curved portion 465 extends outward (e.g., radially outwardly and axially outwardly, etc.) from the outlet engagement member wall first portion 462. More specifically, the outlet engagement member wall second curved portion 465 extends along a curved path between the outlet engagement member wall first portion 462 and the outlet coupling flange 464.

As shown in FIG. 23, the adaptor 260 is disposed between the inlet engagement member 220 and the outlet engagement member 240. In some embodiments, the adaptor 260 is coupled to the cartridge wall 254. In other embodiments, the adaptor 260 is monolithically formed with the cartridge wall 254. As described herein, the adaptor 260 cooperates with the cartridge wall 254, the inlet engagement member 220, and the outlet engagement member 240 to facilitate suspension of the cartridge 250 within the inlet body 206 and/or the outlet body 232 when a compressive force is applied to the adaptor 260.

The adaptor 260 includes an adaptor wall 470 (e.g., ring, etc.). The adaptor wall 470 includes an adaptor wall first portion 472. In some embodiments, the adaptor wall first portion 472 is coupled to the cartridge wall 254. In other embodiments, the adaptor wall first portion 472 is monolithically formed with the cartridge wall 254. The adaptor wall first portion 472 extends outward (e.g., radially outward) from the cartridge wall 254. In some embodiments, the adaptor wall first portion 291 is substantially parallel to an extending direction of the cartridge 250 and/or substantially parallel to the cartridge wall 254.

The adaptor wall 470 also includes an adaptor wall second portion 474 extending outward (e.g., radially outward, axially outward) and in a downstream direction from the adaptor wall first portion 472. The adaptor wall second portion 474 is contiguous with the adaptor wall first portion 472. A flat portion of the adaptor wall second portion 474 extends along a slope that is angled with respect to the adaptor wall first portion 472. The angle of the slope is between 15° and 90° with respect to an extending direction of the adaptor wall first portion 472. In some embodiments, the adaptor wall second portion 474 is substantially parallel to the inlet coupling flange 454.

The adaptor wall 470 includes an adaptor wall third portion 476. In some embodiments, the adaptor wall third portion 476 is coupled to the cartridge wall 254. In other embodiments, the adaptor wall third portion 476 is monolithically formed with the cartridge wall 254. The adaptor wall third portion 476 extends outward (e.g., radially outward) from the cartridge wall 254. In some embodiments, the adaptor wall third portion 476 is substantially parallel to an extending direction of the cartridge 250 and/or substantially parallel to the cartridge wall 254. The adaptor wall third portion 476 is positioned downstream of the adaptor wall first portion 472.

The adaptor wall 470 also includes an adaptor wall fourth portion 478 extending outward (e.g., radially outward, axially outward) and in an upstream direction from the adaptor wall fourth portion 478. The adaptor wall fourth portion 478 is contiguous with the adaptor wall third portion 476. A flat portion of the adaptor wall fourth portion 478 extends along a slope that is angled with respect to the adaptor wall third portion 476. The angle of the slope is between 90° and 180° with respect to an extending direction of the adaptor wall third portion 476. In some embodiments, the adaptor wall fourth portion 478 is substantially parallel to the outlet coupling flange 464.

The adaptor wall 470 also includes an adaptor wall fifth portion 479 that extends between the adaptor wall second portion 474 and the adaptor wall fourth portion 478. More specifically, the adaptor wall fifth portion 479 extends outward (e.g., radially outward, axially outward) and in a downstream direction from the adaptor wall second portion 474 towards an apex and extends inward (e.g., radially inward) in the downstream direction from the apex towards the adaptor wall fourth portion 478. The adaptor wall fifth portion 479 is contiguous with the adaptor wall second portion 474 and the adaptor wall fourth portion 478.

In some embodiments, when a compressive force is applied to the inlet engagement member 220 and the outlet engagement member 240, the compressive force is also applied to the adaptor 260, enabling the adaptor 260 to suspend the cartridge 250 within the inlet body 206 and the outlet body 232.

In some embodiments, when a compressive force is applied to the inlet engagement member 220 and the outlet engagement member 240, the inlet coupling flange 454, engages the adaptor wall second portion 474 to form a first seal therebetween. The outlet coupling flange 464 engages the adaptor wall fourth portion 478 to form a second seal therebetween.

In some embodiments, the aftertreatment system 200 shown in FIG. 23 includes the first gasket 246, also referred to herein as a first sealing member. The first gasket 246 is disposed between the inlet coupling flange 454 and the adaptor wall second portion 474 such that the first gasket 246 is separated from the cartridge wall 254 by the adaptor 260. The first gasket 246 establishes a first seal between the inlet coupling flange 454 and the adaptor wall second portion 474. For example, the first gasket 246 engages the inlet coupling flange 454 and the adaptor wall second portion 474 to form a first seal therebetween. In this way, when a compressive force is applied to the inlet coupling flange 454, the first gasket 246 is compressed between the inlet coupling flange 454 and the adaptor wall second portion 474.

Similarly, the aftertreatment system 200 may include a second gasket 248, also referred to herein as a second sealing member. The second gasket 248 is disposed between the outlet coupling flange 464 and the adaptor wall fourth portion 478 such that the second gasket 248 is separated from the cartridge wall 254 by the adaptor 260. The second gasket 248 establishes a second seal between the outlet coupling flange 464 and the adaptor wall fourth portion 478. For example, the second gasket 248 engages the outlet coupling flange 464 and the adaptor wall fourth portion 478 to form a second seal therebetween. In this way, when a compressive force is applied to the outlet coupling flange 464, the second gasket 248 is compressed between the outlet coupling flange 464 and the adaptor wall fourth portion 478.

In other embodiments, the first gasket 246 and/or the second gasket 248 is/are disposed in a different location than as shown in FIG. 23. In these embodiments, the first gasket 246 may be positioned between the inlet engagement member 220 and the adaptor 260 and/or the second gasket 248 may be positioned between the outlet engagement member 240 and the adaptor 260. In other embodiments, the aftertreatment system 200 does not include the first gasket 246 and/or the second gasket 248. In these embodiments, a first seal (e.g., a metal-to-metal seal) may be formed by the inlet coupling flange 454 engaging the adaptor wall second portion 474. A second seal (e.g., a metal-to-metal seal) may be formed by the outlet coupling flange 464 engaging the adaptor wall fourth portion 478. Advantageously, when the aftertreatment system 200 does not include the first gasket 246 and/or the second gasket 248 the quantity of components in the joint created by the inlet engagement member 220, the outlet engagement member 240 and the adaptor 260, is reduced thereby simplifying the manufacturing process, assembly process, and replacement process. In some embodiments, the metal-to-metal contact between the inlet engagement member 220 and the adaptor 260 and/or the metal-to-metal contact between the outlet engagement member 240 and the adaptor 260 also mitigates against gasket creep.

In some embodiments, the metal-to-metal contact between the inlet engagement member 220 and the adaptor 260 and/or the metal-to-metal contact between the outlet engagement member 240 and the adaptor 260 does not form a seal therebetween. In some embodiments, the metal-to-metal contact between the inlet engagement member 220 and the adaptor 260 and/or the metal-to-metal contact between the outlet engagement member 240 and the adaptor 260 provides an alternate path for external forces to pass through the joint created by the inlet engagement member 220, the outlet engagement member 240 and the adaptor 260. Advantageously, the metal-to-metal contact between the inlet engagement member 220 and the adaptor 260 and/or the metal-to-metal contact between the outlet engagement member 240 and the adaptor 260 avoids over-compression of the gaskets (e.g., the first gasket 246 and/or the second gasket 248) due to external forces. In some embodiments, the metal-to-metal contact between the inlet engagement member 220 and the adaptor 260 and/or the metal-to-metal contact between the outlet engagement member 240 and the adaptor 260 also enables control of gasket compression thru the fit between the metal components and the gaskets. For example, the cross sectional space created by the fit of the metal components (e.g., the inlet engagement member 220, the outlet engagement member 240 and the adaptor 260) is slightly smaller than the cross section of the gaskets (e.g., the first gasket 246 and/or the second gasket 248) thereby controlling the amount of gasket compression.

As shown in FIG. 24, the adaptor 260 is disposed between the inlet engagement member 220 and the outlet engagement member 240. In some embodiments, the adaptor 260 is coupled to the cartridge wall 254. In other embodiments, the adaptor 260 is monolithically formed with the cartridge wall 254. As described herein, the adaptor 260 cooperates with the cartridge wall 254, the inlet engagement member 220, and the outlet engagement member 240 to facilitate suspension of the cartridge 250 within the inlet body 206 and/or the outlet body 232 when a compressive force is applied to the adaptor 260.

The adaptor 260 includes a base 490 that extends outward from the cartridge wall 254. In some embodiments, the base 490 is attached to an outer surface of the cartridge wall 254. In some embodiments, the base 490 is monolithically formed with the cartridge wall 254. In some embodiments, the base 490 is substantially parallel to or coaxial with the cartridge wall 254.

The adaptor 260 also includes a projection 492 that extends radially outward from the base 490. In some embodiments, the projection 492 is substantially perpendicular to the base 490. In some embodiments, the projection 492 is disposed between the inlet coupling flange 454 and the outlet coupling flange 464. The projection 492 includes a first engagement side (e.g., an upstream side) 494. The projection 492 also includes a second engagement side (e.g., a downstream side) 496.

In some embodiments, the first engagement side 494 engages the inlet coupling flange 454. In some embodiments, the engagement of the first engagement side 494 and the inlet coupling flange 454 forms a first seal therebetween. In some embodiments, the second engagement side 496 engages the outlet coupling flange 464. In some embodiments, the engagement of the second engagement side 496 and the outlet coupling flange 464 forms a second seal therebetween.

In some embodiments, the aftertreatment system 200 shown in FIG. 24 includes the first gasket 246, also referred to herein as a first sealing member. The first gasket 246 is disposed between the inlet coupling flange 454 and the first engagement side 494 such that the first gasket 246 is separated from the cartridge wall 254 by the adaptor 260. The first gasket 246 establishes a first seal between the inlet coupling flange 454 and the first engagement side 494. For example, the first gasket 246 engages the inlet coupling flange 454 and the first engagement side 494 to form a first seal therebetween. In this way, when a compressive force is applied to the inlet coupling flange 454, the first gasket 246 is compressed between the inlet coupling flange 454 and the first engagement side 494.

Similarly, the aftertreatment system 200 may include a second gasket 248, also referred to herein as a second sealing member. The second gasket 248 is disposed between the outlet coupling flange 464 and the second engagement side 496 such that the second gasket 248 is separated from the cartridge wall 254 by the adaptor 260. The second gasket 248 establishes a second seal between the outlet coupling flange 464 and the second engagement side 496. For example, the second gasket 248 engages the outlet coupling flange 464 and the second engagement side 496 to form a second seal therebetween. In this way, when a compressive force is applied to the outlet coupling flange 464, the second gasket 248 is compressed between the outlet coupling flange 464 and the second engagement side 496.

In other embodiments, the first gasket 246 and/or the second gasket 248 is/are disposed in a different location than as shown in FIG. 24. In these embodiments, the first gasket 246 may be positioned between the inlet engagement member 220 and the adaptor 260 and/or the second gasket 248 may be positioned between the outlet engagement member 240 and the adaptor 260. In other embodiments, the aftertreatment system 200 does not include the first gasket 246 and/or the second gasket 248. In these embodiments, a first seal (e.g., a metal-to-metal seal) may be formed by the inlet coupling flange 454 engaging the first engagement side 494. A second seal (e.g., a metal-to-metal seal) may be formed by the outlet coupling flange 464 and the second engagement side 496. Advantageously, when the aftertreatment system 200 does not include the first gasket 246 and/or the second gasket 248 the quantity of components in the joint created by the inlet engagement member 220, the outlet engagement member 240 and the adaptor 260, is reduced thereby simplifying the manufacturing process, assembly process, and replacement process. In some embodiments, the metal-to-metal contact between the inlet engagement member 220 and the adaptor 260 and/or the metal-to-metal contact between the outlet engagement member 240 and the adaptor 260 also mitigates against gasket creep.

In some embodiments, the metal-to-metal contact between the inlet engagement member 220 and the adaptor 260 and/or the metal-to-metal contact between the outlet engagement member 240 and the adaptor 260 does not form a seal therebetween. In some embodiments, the metal-to-metal contact between the inlet engagement member 220 and the adaptor 260 and/or the metal-to-metal contact between the outlet engagement member 240 and the adaptor 260 provides an alternate path for external forces to pass through the joint created by the inlet engagement member 220, the outlet engagement member 240 and the adaptor 260. Advantageously, the metal-to-metal contact between the inlet engagement member 220 and the adaptor 260 and/or the metal-to-metal contact between the outlet engagement member 240 and the adaptor 260 avoids over-compression of the gaskets (e.g., the first gasket 246 and/or the second gasket 248) due to external forces. In some embodiments, the metal-to-metal contact between the inlet engagement member 220 and the adaptor 260 and/or the metal-to-metal contact between the outlet engagement member 240 and the adaptor 260 also enables control of gasket compression thru the fit between the metal components and the gaskets. For example, the cross sectional space created by the fit of the metal components (e.g., the inlet engagement member 220, the outlet engagement member 240 and the adaptor 260) is slightly smaller than the cross section of the gaskets (e.g., the first gasket 246 and/or the second gasket 248) thereby controlling the amount of gasket compression.

Figure 25:
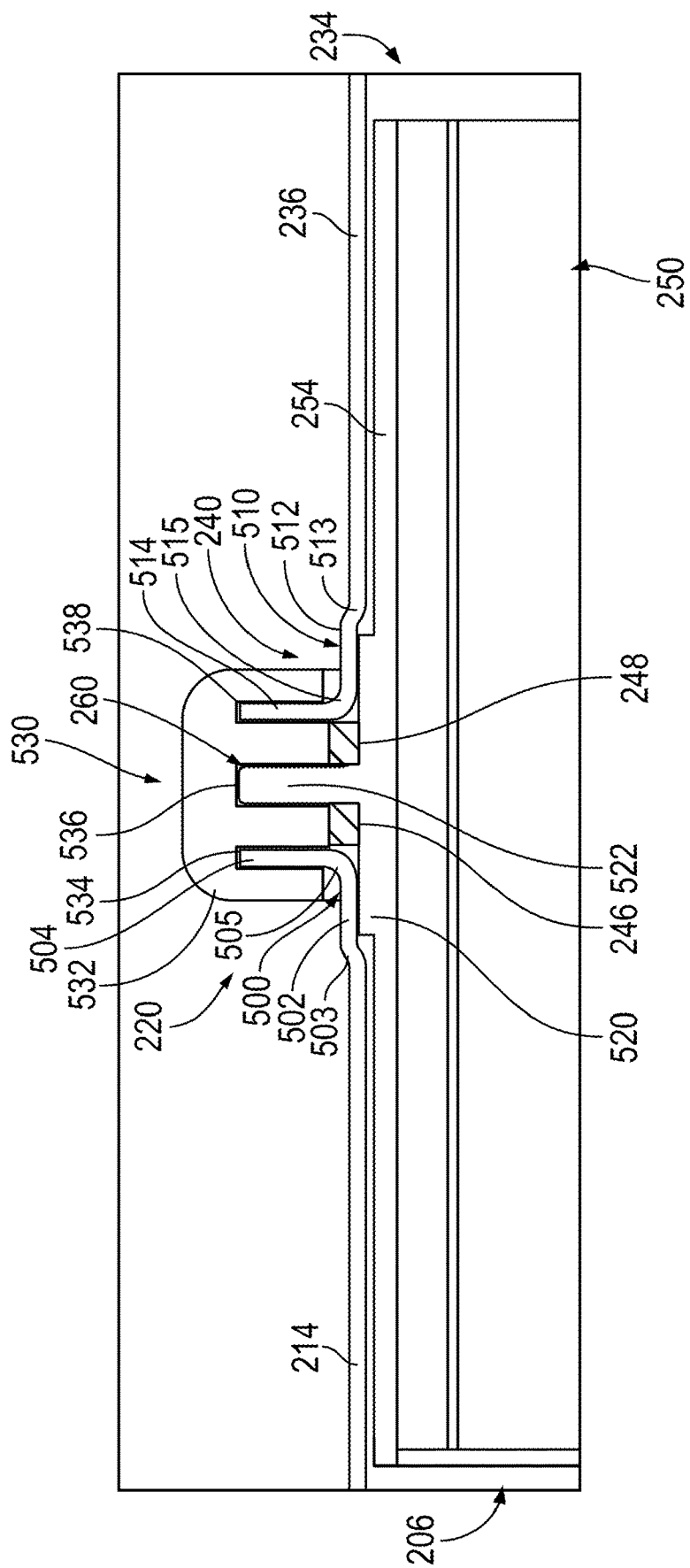
FIG. 25 is a cross-sectional view of the aftertreatment system shown in FIG. 17, according to another example embodiment.

FIG. 25 is a cross-sectional view of the aftertreatment system 200, according to another example embodiment. In the embodiment shown in FIG. 25, the inlet engagement member 220 is downstream of the inlet body wall portion 214 and flares or extends outwardly (e.g., radially outwardly and axially outwardly, etc.) from the inlet body wall portion 214. The inlet engagement member 220 includes an inlet engagement member wall 500.

The inlet engagement member wall 500 includes an inlet engagement member wall first portion 502 that extends outward from the inlet body wall 214 and substantially parallel to the inlet body wall 214. In some embodiments, the inlet engagement member wall first portion 502 is contiguous with the inlet body wall 214. In other embodiments, and as shown in FIG. 25, the inlet engagement member wall 500 includes an inlet engagement member wall first curved portion 503. The inlet engagement member wall first curved portion 503 is contiguous with the inlet body wall 214 and contiguous with the inlet engagement member wall first portion 502. The inlet engagement member wall first curved portion 503 extends outward (e.g., radially outwardly and axially outwardly, etc.) from the inlet body wall 214. More specifically, the inlet engagement member wall first curved portion 503 extends along a curved path between the inlet body wall 214 and the inlet engagement member wall first portion 502.

The inlet engagement member wall 500 includes an inlet engagement member wall second portion, referred to herein as an inlet coupling flange 504. The inlet coupling flange 504 extends outward (e.g., radially outward) from the inlet engagement member wall first portion 502. The inlet coupling flange 504 extends along a slope that is angled with respect to the inlet engagement member wall first portion 502. The slope is angled with respect to an extending direction of the inlet engagement member wall first portion 502 and/or the inlet body wall 214. In some embodiments, the slope is between 15° and 90° with respect to the extending direction of the inlet engagement member wall first portion 502 and/or the inlet body wall 214. As shown in FIG. 25, the inlet coupling flange 504 is substantially perpendicular to the inlet engagement member wall first portion 502 (e.g., the angle of the slope is 90°).

In some embodiments, the inlet coupling flange 504 is contiguous with the inlet engagement member wall first portion 502. In other embodiments, and as shown in FIG. 25, the inlet engagement member wall 500 includes an inlet engagement member wall second curved portion 505. The inlet engagement member wall second curved portion 505 is contiguous with inlet engagement member wall first portion 502 and contiguous with the inlet coupling flange 504. The inlet engagement member wall second curved portion 505 extends outward (e.g., radially outwardly and axially outwardly, etc.) from the inlet engagement member wall first portion 502. More specifically, the inlet engagement member wall second curved portion 505 extends along a curved path between the inlet engagement member wall first portion 502 and the inlet coupling flange 504.

The outlet engagement member 240 is upstream of the outlet body wall portion 236 and flares or extends outwardly (e.g., radially outwardly and axially outwardly, etc.) from the outlet body wall portion 236. The outlet engagement member 240 includes an outlet engagement member wall 510.

The outlet engagement member wall 510 includes an outlet engagement member wall first portion 512 that extends outward from the outlet body wall 236 and substantially parallel to the outlet body wall 236. In some embodiments, the outlet engagement member wall first portion 512 is contiguous with the outlet body wall 236. In other embodiments, and as shown in FIG. 25, the outlet engagement member wall 510 includes an outlet engagement member wall first curved portion 513. The outlet engagement member wall first curved portion 513 is contiguous with the outlet body wall 236 and contiguous with the outlet engagement member wall first portion 512. The outlet engagement member wall first curved portion 513 extends outward (e.g., radially outwardly and axially outwardly, etc.) from the outlet body wall 236. More specifically, the outlet engagement member wall first curved portion 513 extends along a curved path between the outlet body wall 236 and the outlet engagement member wall first portion 512.

The outlet engagement member wall 510 includes an outlet engagement member wall second portion, referred to herein as an outlet coupling flange 514. The outlet coupling flange 514 extends outward (e.g., radially outward) from the outlet engagement member wall first portion 512. The outlet coupling flange 514 extends along a slope that is angled with respect to the outlet engagement member wall first portion 512. The slope is angled with respect to an extending direction of the outlet engagement member wall first portion 512 and/or the outlet body wall 236. In some embodiments, the slope is between 15° and 90° with respect to the extending direction of the outlet engagement member wall first portion 512 and/or the outlet body wall 236. As shown in FIG. 25, the outlet coupling flange 514 is substantially perpendicular to the outlet engagement member wall first portion 512 (e.g., the angle of the slope is 90°).

In some embodiments, the outlet coupling flange 514 is contiguous with the outlet engagement member wall first portion 512. In other embodiments, and as shown in FIG. 25, the outlet coupling flange 514 includes an outlet engagement member wall second curved portion 515. The outlet engagement member wall second curved portion 515 is contiguous with outlet engagement member wall first portion 512 and contiguous with the outlet coupling flange 514. The outlet engagement member wall second curved portion 515 extends outward (e.g., radially outwardly and axially outwardly, etc.) from the outlet engagement member wall first portion 512. More specifically, the outlet engagement member wall second curved portion 515 extends along a curved path between the outlet engagement member wall first portion 512 and the outlet coupling flange 514.

As shown in FIG. 25, the adaptor 260 is disposed between the inlet engagement member 220 and the outlet engagement member 240. In some embodiments, the adaptor 260 is coupled to the cartridge wall 254. In other embodiments, the adaptor 260 is monolithically formed with the cartridge wall 254. As described herein, the adaptor 260 cooperates with the cartridge wall 254, the inlet engagement member 220, and the outlet engagement member 240 to facilitate suspension of the cartridge 250 within the inlet body 206 and/or the outlet body 232 when a compressive force is applied to the adaptor 260.

The adaptor 260 includes a base 520 that extends outward from the cartridge wall 254. In some embodiments, the base 520 is attached to an outer surface of the cartridge wall 254. In some embodiments, the base 520 is monolithically formed with the cartridge wall 254. In some embodiments, the base 520 is substantially parallel to and/or coaxial with the cartridge wall 254.

The adaptor 260 also includes a projection 522 that extends radially outward from the base 520. In some embodiments, the projection 522 is substantially perpendicular to the base 520. In some embodiments, the projection 522 is disposed between the inlet coupling flange 504 and the outlet coupling flange 514. The projection 522 includes a first engagement side (e.g., an upstream side). The projection 492 also includes a second engagement side (e.g., a downstream side).

In the embodiment shown in FIG. 25, the aftertreatment system 200 includes an engagement member 530. The engagement member 530 includes an engagement member body 532.

The engagement member body 532 defines a first recess 534 that is configured to receive the inlet coupling flange 504. In some embodiments, when the first recess 534 receives the inlet coupling flange 504, the inlet coupling flange 504 engages engagement member body 532 at the first recess 534 to form a first seal therebetween.

The engagement member body 532 defines a second recess 536 that is configured to receive the projection 522. In some embodiments, when the second recess 536 receives the projection 522, the projection 522 engages engagement member body 532 at the second recess 536 to form a first seal therebetween.

The engagement member body 532 defines a third recess 538 that is configured to receive the outlet coupling flange 514. In some embodiments, when the third recess 538 receives the outlet coupling flange 514, the outlet coupling flange 514 engages engagement member body 532 at the third recess 538 to form a third seal therebetween.

In some embodiments, the aftertreatment system 200 shown in FIG. 25 includes the first gasket 246 and/or the second gasket 248, also referred to herein as a first sealing member and a second sealing member, respectively. The first gasket 246 and/or the second gasket 248 is/are disposed between the engagement member body 532 and the base 520 such that the first gasket 246 and/or the second gasket 248 is separated from the cartridge wall 254 by the base 520. The first gasket 246 and/or the second gasket 248 establishes a first seal and/or a second seal, respectively, between the engagement member body 532 and the base 520. For example, the first gasket 246 and/or the second gasket 248 engages the engagement member body 532 and the base 520 to form a first seal and/or a second seal therebetween. In this way, when a compressive force is applied to the engagement member 530, the first gasket and/or the second gasket 248 is/are compressed between the engagement member body 532 and the base 520.

In other embodiments, the first gasket 246 and/or the second gasket 248 is/are disposed in a different location than as shown in FIG. 25. In other embodiments, the aftertreatment system 200 does not include the first gasket 246 and/or the second gasket 248. In these embodiments, a first seal (e.g., a metal-to-metal seal) may be formed by the projection 522 engaging the engagement member body 532 at the second recess 536. A second seal (e.g., a metal-to-metal seal) may be formed by the outlet coupling flange 514 engaging the engagement member body 532 at the third recess 538. Advantageously, when the aftertreatment system 200 does not include the first gasket 246 and/or the second gasket 248 the quantity of components in the joint created by the inlet engagement member 220, the outlet engagement member 240 and the adaptor 260, is reduced thereby simplifying the manufacturing process, assembly process, and replacement process. In some embodiments, the metal-to-metal contact between the inlet engagement member 220 and the engagement member 530, the metal-to-metal contact between the outlet engagement member 240 and the engagement member 530, and/or the metal-to-metal contact between the adaptor 260 and the engagement member 530 also mitigates against gasket creep.

In some embodiments, the metal-to-metal contact between the inlet engagement member 220 and the engagement member 530, the metal-to-metal contact between the outlet engagement member 240 and the engagement member 530, and/or the metal-to-metal contact between the adaptor 260 and the engagement member 530 does not form a seal therebetween. In some embodiments, the metal-to-metal contact between the inlet engagement member 220 and the engagement member 530, the metal-to-metal contact between the outlet engagement member 240 and the engagement member 530, and/or the metal-to-metal contact between the adaptor 260 and the engagement member 530 provides an alternate path for external forces to pass through the joint created by the inlet engagement member 220, the outlet engagement member 240, the adaptor 260, and the engagement member 530. Advantageously, the metal-to-metal contact between the inlet engagement member 220 and the engagement member 530, the metal-to-metal contact between the outlet engagement member 240 and the engagement member 530, and/or the metal-to-metal contact between the adaptor 260 and the engagement member 530 avoids over-compression of the gaskets (e.g., the first gasket 246 and/or the second gasket 248) due to external forces. In some embodiments, the metal-to-metal contact between the inlet engagement member 220 and the engagement member 530, the metal-to-metal contact between the outlet engagement member 240 and the engagement member 530, and/or the metal-to-metal contact between the adaptor 260 and the engagement member 530 also enables control of gasket compression thru the fit between the metal components and the gaskets. For example, the cross sectional space created by the fit of the metal components (e.g., the inlet engagement member 220, the outlet engagement member 240 and the adaptor 260) is slightly smaller than the cross section of the gaskets (e.g., the first gasket 246 and/or the second gasket 248) thereby controlling the amount of gasket compression.

Now referring to FIGS. 26 and 27, cross-sectional view of the aftertreatment system 200 are shown, according to various example embodiments. In the embodiment shown in FIGS. 26 and 27, the inlet engagement member 220 is downstream of the inlet body wall portion 214 and flares or extends outwardly (e.g., radially outwardly and axially outwardly, etc.) from the inlet body wall portion 214. The inlet engagement member 220 includes an inlet engagement member wall 540.

The inlet engagement member wall 540 includes an inlet engagement member wall first portion 542 that extends outward from the inlet body wall 214 and substantially parallel to the inlet body wall 214. In some embodiments, the inlet engagement member wall first portion 542 is contiguous with the inlet body wall 214. In other embodiments, and as shown in FIGS. 26 and 27, the inlet engagement member wall 540 includes an inlet engagement member wall first curved portion 543. The inlet engagement member wall first curved portion 543 is contiguous with the inlet body wall 214 and contiguous with the inlet engagement member wall first portion 542. The inlet engagement member wall first curved portion 543 extends outward (e.g., radially outwardly and axially outwardly, etc.) from the inlet body wall 214. More specifically, the inlet engagement member wall first curved portion 543 extends along a curved path between the inlet body wall 214 and the inlet engagement member wall first portion 542.

The inlet engagement member wall 540 includes an inlet engagement member wall second portion 544 that extends outward (e.g., radially outward, axially outward) and in a downstream direction from the inlet engagement member wall first portion 542. The inlet engagement member wall second portion 544 extends along a slope that is angled with respect to the inlet engagement member wall first portion 542. In some embodiments, the angle of the slope is between 15° and 90° with respect to the extending direction of the inlet engagement member wall first portion 542. In other embodiments and as shown in FIG. 26, the inlet engagement member wall second portion 544 extends along a curved path. The inlet engagement member wall second portion 544 is contiguous with the inlet engagement member wall first portion 542.

The inlet engagement member wall 540 includes an inlet engagement member wall third portion 546 that extends outward (e.g., radially outward, axially outward) and in an upstream direction from the inlet engagement member wall second portion 544. The inlet engagement member wall third portion 546 extends along a slope that is angled with respect to the inlet engagement member wall second portion 544. In some embodiments, the angle of the slope is between 15° and 180° with respect to the extending direction of the inlet engagement member wall second portion 544. For example, as shown in FIG. 27, the angle of the slope is approximately 90° such that the inlet engagement member wall third portion 546 is substantially perpendicular to the inlet engagement member wall second portion 544. In other embodiments and as shown in FIG. 26, the inlet engagement member wall third portion 546 extends along a curved path. In some embodiments, the inlet engagement member wall third portion 546 is contiguous with the inlet engagement member wall second portion 544.

The inlet engagement member wall 540 includes an inlet engagement member wall fourth portion, shown as an inlet coupling flange 548. The inlet coupling flange 548 extends outward (e.g., radially outward, axially outward) and in a downstream direction from the inlet engagement member wall third portion 546. The inlet coupling flange 548 extends along a slope that is angled with respect to the inlet engagement member wall third portion 546. In some embodiments, the angle of the slope is between 15° and 180° with respect to the extending direction of the inlet engagement member wall third portion 546. For example, as shown in FIG. 27, the angle of the slope is approximately 90° such that the inlet coupling flange 548 is substantially perpendicular to inlet engagement member wall third portion 546. In other embodiments and as shown in FIG. 26, the inlet coupling flange 548 extends along a curved path. In some embodiments, the inlet coupling flange 548 is contiguous with the inlet engagement member wall third portion 546.

The outlet engagement member 240 is upstream of the outlet body wall portion 236 and flares or extends outwardly (e.g., radially outwardly and axially outwardly, etc.) from the outlet body wall portion 236. The outlet engagement member 240 includes an outlet engagement member wall 550.

The outlet engagement member wall 550 includes an outlet engagement member wall first portion 552 that extends outward from the outlet body wall 236 and substantially parallel to the outlet body wall 236. In some embodiments, the outlet engagement member wall first portion 552 is contiguous with the outlet body wall 236. In other embodiments, and as shown in FIGS. 26 and 27, the outlet engagement member wall 550 includes an outlet engagement member wall first curved portion 553. The outlet engagement member wall first curved portion 553 is contiguous with the outlet body wall 236 and contiguous with the outlet engagement member wall first portion 552. The outlet engagement member wall first curved portion 553 extends outward (e.g., radially outwardly and axially outwardly, etc.) from the outlet body wall 236. More specifically, the outlet engagement member wall first curved portion 553 extends along a curved path between the outlet body wall 236 and the outlet engagement member wall first portion 552.

The outlet engagement member wall 550 includes an outlet engagement member wall second portion 554 that extends outward (e.g., radially outward, axially outward) and in an upstream direction from the outlet engagement member wall first portion 552. The outlet engagement member wall second portion 554 extends along a slope that is angled with respect to the outlet engagement member wall first portion 552. In some embodiments, the angle of the slope is between 15° and 90° with respect to the extending direction of the outlet engagement member wall first portion 552. In other embodiments and as shown in FIG. 26, the outlet engagement member wall second portion 554 extends along a curved path. The outlet engagement member wall second portion 554 is contiguous with the outlet engagement member wall first portion 552.

The outlet engagement member wall 550 includes an outlet engagement member wall third portion 556 that extends outward (e.g., radially outward, axially outward) and in a downstream direction from the outlet engagement member wall second portion 554. The outlet engagement member wall third portion 556 extends along a slope that is angled with respect to the outlet engagement member wall second portion 554. In some embodiments, the angle of the slope is between 15° and 180° with respect to the extending direction of the outlet engagement member wall second portion 554. For example, as shown in FIG. 27, the angle of the slope is approximately 90° such that the outlet engagement member wall third portion 556 is substantially perpendicular to the outlet engagement member wall second portion 554. In other embodiments and as shown in FIG. 26, the outlet engagement member wall third portion 556 extends along a curved path. In some embodiments, the outlet engagement member wall third portion 556 is contiguous with the outlet engagement member wall second portion 554.

The outlet engagement member wall 550 includes an outlet engagement member wall fourth portion, shown as an outlet coupling flange 558. The outlet coupling flange 558 extends outward (e.g., radially outward, axially outward) and in a downstream direction from the outlet engagement member wall third portion 556. The outlet coupling flange 558 extends along a slope that is angled with respect to the outlet engagement member wall third portion 556. In some embodiments, the angle of the slope is between 15° and 180° with respect to the extending direction of the outlet engagement member wall third portion 556. For example, as shown in FIG. 27, the angle of the slope is approximately 90° such that the outlet coupling flange 558 is substantially perpendicular to outlet engagement member wall third portion 556. In other embodiments and as shown in FIG. 26, the outlet coupling flange 558 extends along a curved path. In some embodiments, the outlet coupling flange 558 is contiguous with the outlet engagement member wall third portion 556.

As shown in FIGS. 26 and 27, the adaptor 260 is disposed between the inlet engagement member 220 and the outlet engagement member 240. In some embodiments, the adaptor 260 is coupled to the cartridge wall 254. In other embodiments, the adaptor 260 is monolithically formed with the cartridge wall 254. As described herein, the adaptor 260 cooperates with the cartridge wall 254, the inlet engagement member 220, and the outlet engagement member 240 to facilitate suspension of the cartridge 250 within the inlet body 206 and/or the outlet body 232 when a compressive force is applied to the adaptor 260.

The adaptor 260 includes a base 560 that extends outward from the cartridge wall 254. In some embodiments, the base 560 is attached to an outer surface of the cartridge wall 254. In some embodiments, the base 560 is monolithically formed with the cartridge wall 254. In some embodiments, the base 560 is substantially parallel to or coaxial with the cartridge wall 254.

The adaptor 260 also includes a projection 562 that extends radially outward from the base 560. In some embodiments, the projection 562 is substantially perpendicular to the base 560. In some embodiments, the projection 562 is disposed between the inlet coupling flange 548 and the outlet coupling flange 558. The projection 562 defines a first recess 564 (e.g., an upstream recess). The projection 562 also includes a second recess 566 (e.g., a downstream recess).

In some embodiments, a shape of the inlet engagement member wall 540 conforms to a shape of an upstream side of the projection 562. More specifically, the first recess 564 is sized to receive at least a portion of the inlet engagement member wall 540 such that the portion of the inlet engagement member wall 540 engages the projection 562 at the first recess 564. In some embodiments, the engagement of the portion of the inlet engagement member wall 540 and the projection 562 at the first recess 564 forms a first seal therebetween.

In some embodiments, the inlet coupling flange 548 engages at least a portion of the upstream side of the projection 562 and forms a seal therebetween. In other embodiments, the aftertreatment system 200 shown in FIGS. 26 and 27 includes the first gasket 246, also referred to herein as a first sealing member. In some embodiments and as shown in FIG. 26, the first gasket 246 is disposed between the inlet coupling flange 548 and the upstream side of the projection 562 such that the first gasket 246 is separated from the cartridge wall 254 by the adaptor 260. The first gasket 246 establishes a first seal between the inlet coupling flange 548 and the upstream side of the projection 562. For example, the first gasket 246 engages the inlet coupling flange 548 and the upstream side of the projection 562 to form a first seal therebetween. In this way, when a compressive force is applied to the inlet coupling flange 548, the first gasket 246 is compressed between the inlet coupling flange 548 and the upstream side of the projection 562. In other embodiments and as shown in FIG. 27, the first gasket 246 is disposed between the inlet engagement member wall 540 and the upstream side of the projection 562 such that the first gasket 246 is separated from the cartridge wall 254 by the adaptor 260. The first gasket 246 establishes a first seal between the inlet engagement member wall 540 and the upstream side of the projection 562. For example, the first gasket 246 engages the inlet engagement member wall 540 and the upstream side of the projection 562 to form a first seal therebetween. In this way, when a compressive force is applied to the inlet engagement member wall 540, the first gasket 246 is compressed between the inlet engagement member wall 540 and the upstream side of the projection 562.

In some embodiments, a shape of the outlet engagement member wall 550 conforms to a shape of a downstream side of the projection 562. More specifically, the second recess 566 is sized to receive at least a portion of the outlet engagement member wall 550 such that the portion of the outlet engagement member wall 550 engages the projection 562 at the second recess 566. In some embodiments, the engagement of the portion of the outlet engagement member wall 550 and the projection 562 at the second recess 566 forms a second seal therebetween.

In some embodiments, the outlet coupling flange 558 engages at least a portion of the downstream side of the projection 562 and forms a seal therebetween. In other embodiments, the aftertreatment system 200 may include a second gasket 248, also referred to herein as a second sealing member. In some embodiments and as shown in FIG. 26, the second gasket 248 is disposed between the outlet coupling flange 558 and the downstream side of the projection 562 such that the second gasket 248 is separated from the cartridge wall 254 by the adaptor 260. The second gasket 248 establishes a second seal between the outlet coupling flange 558 and the downstream side of the projection 562. For example, the second gasket 248 engages the outlet coupling flange 558 and the downstream side of the projection 562 to form a second seal therebetween. In this way, when a compressive force is applied to the outlet coupling flange 558, the second gasket 248 is compressed between the outlet coupling flange 558 and the downstream side of the projection 562. In other embodiments and as shown in FIG. 27, the second gasket 248 is disposed between the outlet engagement member wall 550 and the downstream side of the projection 562 such that the second gasket 248 is separated from the cartridge wall 254 by the adaptor 260. The second gasket 248 establishes a second seal between the outlet engagement member wall 550 and the downstream side of the projection 562. For example, the second gasket 248 engages the outlet engagement member wall 550 and the downstream side of the projection 562 to form a second seal therebetween. In this way, when a compressive force is applied to the outlet engagement member wall 550, the second gasket 248 is compressed between the outlet engagement member wall 550 and the upstream side of the projection 562.

In other embodiments, the first gasket 246 and/or the second gasket 248 is/are disposed in a different location than as shown in FIGS. 26 and 27. In these embodiments, the first gasket 246 may be positioned between the inlet engagement member 220 and the adaptor 260 and/or the second gasket 248 may be positioned between the outlet engagement member 240 and the adaptor 260. In other embodiments, the aftertreatment system 200 does not include the first gasket 246 and/or the second gasket 248. In these embodiments, a first seal (e.g., a metal-to-metal seal) may be formed by the outlet engagement member wall 550 engaging the projection 562 at the second recess 566. A second seal (e.g., a metal-to-metal seal) may be formed by the outlet coupling flange 558 engaging the downstream side of the projection 562. Advantageously, when the aftertreatment system 200 does not include the first gasket 246 and/or the second gasket 248 the quantity of components in the joint created by the inlet engagement member 220, the outlet engagement member 240 and the adaptor 260, is reduced thereby simplifying the manufacturing process, assembly process, and replacement process. In some embodiments, the metal-to-metal contact between the inlet engagement member 220 and the adaptor 260 and/or the metal-to-metal contact between the outlet engagement member 240 and the adaptor 260 also mitigates against gasket creep.

In some embodiments, the metal-to-metal contact between the inlet engagement member 220 and the adaptor 260 and/or the metal-to-metal contact between the outlet engagement member 240 and the adaptor 260 does not form a seal therebetween. In some embodiments, the metal-to-metal contact between the inlet engagement member 220 and the adaptor 260 and/or the metal-to-metal contact between the outlet engagement member 240 and the adaptor 260 provides an alternate path for external forces to pass through the joint created by the inlet engagement member 220, the outlet engagement member 240 and the adaptor 260. Advantageously, the metal-to-metal contact between the inlet engagement member 220 and the adaptor 260 and/or the metal-to-metal contact between the outlet engagement member 240 and the adaptor 260 avoids over-compression of the gaskets (e.g., the first gasket 246 and/or the second gasket 248) due to external forces. In some embodiments, the metal-to-metal contact between the inlet engagement member 220 and the adaptor 260 and/or the metal-to-metal contact between the outlet engagement member 240 and the adaptor 260 also enables control of gasket compression thru the fit between the metal components and the gaskets. For example, the cross sectional space created by the fit of the metal components (e.g., the inlet engagement member 220, the outlet engagement member 240 and the adaptor 260) is slightly smaller than the cross section of the gaskets (e.g., the first gasket 246 and/or the second gasket 248) thereby controlling the amount of gasket compression.

Figure 28:
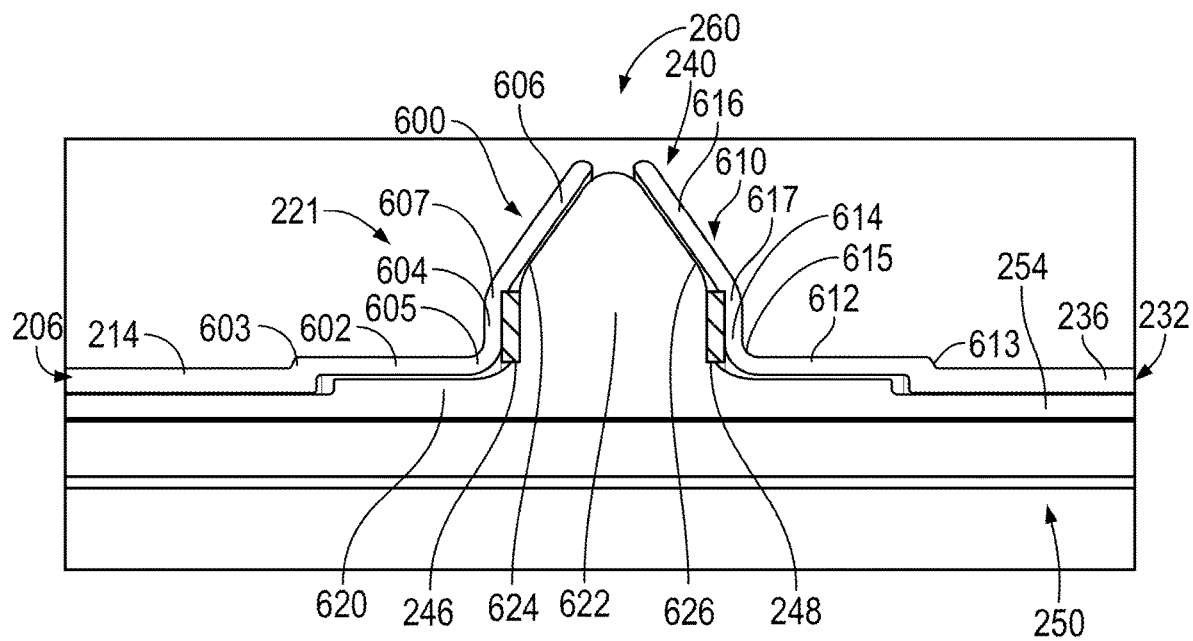
FIG. 28 is a cross-sectional view of the aftertreatment system shown in FIG. 17, according to another example embodiment.
Figure 29:
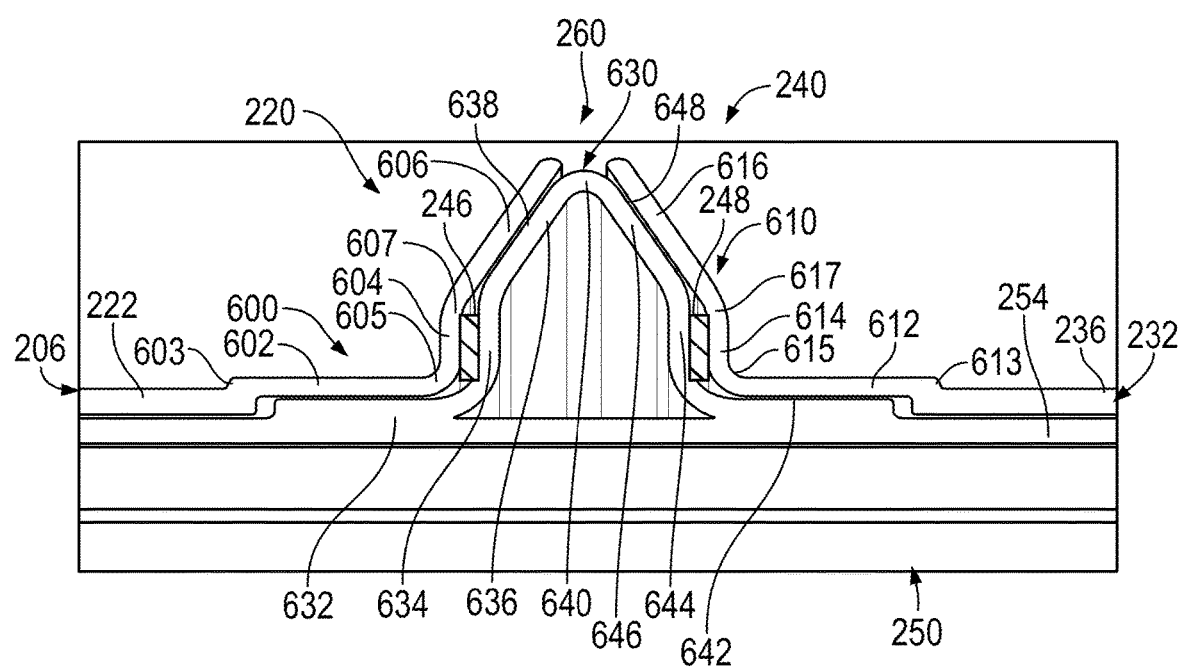
FIG. 29 is a cross-sectional view of the aftertreatment system shown in FIG. 17, according to another example embodiment.

Now referring to FIGS. 28 and 29, cross-sectional views of the aftertreatment system 200 are shown, according to a various example embodiments. In the embodiment shown in FIGS. 28 and 29, the inlet engagement member 220 is downstream of the inlet body wall portion 214 and flares or extends outwardly (e.g., radially outwardly and axially outwardly, etc.) from the inlet body wall portion 214. The inlet engagement member 220 includes an inlet engagement member wall 600.

The inlet engagement member wall 600 includes an inlet engagement member wall first portion 602 that extends outward from the inlet body wall 214 and substantially parallel to the inlet body wall 214. In some embodiments, the inlet engagement member wall first portion 602 is contiguous with the inlet body wall 214. In other embodiments, and as shown in FIGS. 28 and 29, the inlet engagement member wall 600 includes an inlet engagement member wall first curved portion 603. The inlet engagement member wall first curved portion 603 is contiguous with the inlet body wall 214 and contiguous with the inlet engagement member wall first portion 602. The inlet engagement member wall first curved portion 603 extends outward (e.g., radially outwardly and axially outwardly, etc.) from the inlet body wall 214. More specifically, the inlet engagement member wall first curved portion 603 extends along a curved path between the inlet body wall 214 and the inlet engagement member wall first portion 602.

The inlet engagement member wall 600 includes an inlet engagement member wall second portion 604 that extends outward (e.g., radially outward) from the inlet engagement member wall first portion 602. The inlet engagement member wall second portion 604 extends along a slope that is angled with respect to the inlet engagement member wall first portion 602. More specifically, the inlet engagement member wall second portion 604 is substantially perpendicular to the inlet engagement member wall first portion 602. In some embodiments, the inlet engagement member wall second portion 604 is contiguous with the inlet engagement member wall first portion 602. In other embodiments, and as shown in FIGS. 28 and 29, the inlet engagement member wall 600 includes an inlet engagement member wall second curved portion 605. The inlet engagement member wall second curved portion 605 is contiguous with the inlet engagement member wall first portion 602 and contiguous with the inlet engagement member wall second portion 604. The inlet engagement member wall second curved portion 605 extends outward (e.g., radially outwardly and axially outwardly, etc.) from the inlet engagement member wall first portion 602. More specifically, the inlet engagement member wall second curved portion 605 extends along a curved path between the inlet engagement member wall first portion 602 and the inlet engagement member wall second portion 604.

The inlet engagement member wall 600 includes an inlet engagement member wall third portion, referred to herein as an inlet coupling flange 606. The inlet coupling flange 606 extends outward (e.g., radially outward) from the inlet engagement member wall second portion 604.

The inlet coupling flange 606 extends along a slope that is angled with respect to the inlet engagement member wall second portion 604. The angle of the slope is between 15° and 90° with respect to an extending direction of the inlet engagement member wall second portion 604. The inlet coupling flange 606 defines a first engagement surface, described in more detail herein. In some embodiments, the inlet coupling flange 606 is contiguous with the inlet engagement member wall second portion 604. In other embodiments, and as shown in FIGS. 28 and 29, the inlet coupling flange 606 includes an inlet engagement member wall third curved portion 607. The inlet engagement member wall third curved portion 607 is contiguous with the inlet engagement member wall second portion 604 and contiguous with the inlet coupling flange 606. The inlet engagement member wall third curved portion 607 extends outward (e.g., radially outwardly and axially outwardly, etc.) from the inlet engagement member wall second portion 604. More specifically, the inlet engagement member wall third curved portion 607 extends along a curved path between the inlet engagement member wall second portion 604 and the inlet coupling flange 606.

The outlet engagement member 240 is upstream of the outlet body wall portion 236 and flares or extends outwardly (e.g., radially outwardly and axially outwardly, etc.) from the outlet body wall portion 236. The outlet engagement member 240 includes an outlet engagement member wall 610.

The outlet engagement member wall 610 includes an outlet engagement member wall first portion 612 that extends outward from the outlet body wall 236 and substantially parallel to the outlet body wall 236. In some embodiments, the outlet engagement member wall first portion 612 is contiguous with the outlet body wall 236. In other embodiments, and as shown in FIGS. 28 and 29, the outlet engagement member wall 610 includes an outlet engagement member wall first curved portion 613. The outlet engagement member wall first curved portion 613 is contiguous with the outlet body wall 236 and contiguous with the outlet engagement member wall first portion 612. The outlet engagement member wall first curved portion 613 extends outward (e.g., radially outwardly and axially outwardly, etc.) from the outlet body wall 236. More specifically, the outlet engagement member wall first curved portion 613 extends along a curved path between the outlet body wall 236 and the outlet engagement member wall first portion 612.

The outlet engagement member wall 610 includes an outlet engagement member wall second portion 614 that extends outward (e.g., radially outward) from the outlet engagement member wall first portion 612. The outlet engagement member wall second portion 614 extends along a slope that is angled with respect to the outlet engagement member wall first portion 612. More specifically, the outlet engagement member wall second portion 614 is substantially perpendicular to the outlet engagement member wall first portion 612. In some embodiments, the outlet engagement member wall second portion 614 is contiguous with the outlet engagement member wall first portion 612. In other embodiments, and as shown in FIGS. 28 and 29, the outlet engagement member wall 610 includes an outlet engagement member wall second curved portion 615. The outlet engagement member wall second curved portion 615 is contiguous with the outlet engagement member wall first portion 612 and contiguous with the outlet engagement member wall second portion 614. The outlet engagement member wall second curved portion 615 extends outward (e.g., radially outwardly and axially outwardly, etc.) from the outlet engagement member wall first portion 612. More specifically, the outlet engagement member wall second curved portion 615 extends along a curved path between the outlet engagement member wall first portion 612 and the outlet engagement member wall second portion 614.

The outlet engagement member wall 610 includes an outlet engagement member wall third portion, referred to herein as an outlet coupling flange 616. The outlet coupling flange 616 extends outward (e.g., radially outward) from the outlet engagement member wall second portion 614.

The outlet coupling flange 616 extends along a slope that is angled with respect to the outlet engagement member wall second portion 614. The angle of the slope is between 15° and 90° with respect to an extending direction of the outlet engagement member wall second portion 614. The outlet coupling flange 616 defines a second engagement surface, described in more detail herein. In some embodiments, the outlet coupling flange 616 is contiguous with the outlet engagement member wall second portion 614. In other embodiments, and as shown in FIGS. 28 and 29, the outlet coupling flange 616 includes an outlet engagement member wall third curved portion 617. The outlet engagement member wall third curved portion 617 is contiguous with the outlet engagement member wall second portion 614 and contiguous with the outlet coupling flange 616. The outlet engagement member wall third curved portion 617 extends outward (e.g., radially outwardly and axially outwardly, etc.) from the outlet engagement member wall second portion 614. More specifically, the outlet engagement member wall third curved portion 617 extends along a curved path between the outlet engagement member wall second portion 614 and the outlet coupling flange 616.

As shown in FIG. 28, the adaptor 260 is disposed between the inlet engagement member 220 and the outlet engagement member 240. In some embodiments, the adaptor 260 is coupled to the cartridge wall 254. In other embodiments, the adaptor 260 is monolithically formed with the cartridge wall 254. As described herein, the adaptor 260 cooperates with the cartridge wall 254, the inlet engagement member 220, and the outlet engagement member 240 to facilitate suspension of the cartridge 250 within the inlet body 206 and/or the outlet body 232 when a compressive force is applied to the adaptor 260.

The adaptor 260 includes a base 620 that extends outward from the cartridge wall 254. In some embodiments, the base 620 is attached to an outer surface of the cartridge wall 254. In some embodiments, the base 620 is monolithically formed with the cartridge wall 254. In some embodiments, the base 620 is substantially parallel to or coaxial with the cartridge wall 254.

The adaptor 260 also includes a projection 622 that extends radially outward from the base 620. In some embodiments, the projection 622 is substantially perpendicular to the base 620. In some embodiments, the projection 622 is disposed between the inlet coupling flange 606 and the outlet coupling flange 616. The projection 622 includes a first engagement side (e.g., an upstream side) 624. The projection 622 also includes a second engagement side (e.g., a downstream side) 626.

In some embodiments, the first engagement side 624 engages the inlet coupling flange 606. In some embodiments, the engagement of the first engagement side 624 and the inlet coupling flange 606 forms a first seal therebetween. In some embodiments, the second engagement side 626 engages the outlet coupling flange 616. In some embodiments, the engagement of the second engagement side 626 and the outlet coupling flange 616 forms a second seal therebetween.

In some embodiments, the aftertreatment system 200 shown in FIG. 28 includes the first gasket 246, also referred to herein as a first sealing member. The first gasket 246 is disposed between the inlet engagement member wall 600 and the first engagement side 624 such that the first gasket 246 is separated from the cartridge wall 254 by the adaptor 260. The first gasket 246 establishes a first seal between the inlet engagement member wall 600 and the first engagement side 624. For example, the first gasket 246 engages the inlet engagement member wall 600 and the first engagement side 624 to form a first seal therebetween. In this way, when a compressive force is applied to the inlet engagement member wall 600, the first gasket 246 is compressed between the inlet engagement member wall 600 and the first engagement side 624.

Similarly, the aftertreatment system 200 may include a second gasket 248, also referred to herein as a second sealing member. The second gasket 248 is disposed between the outlet engagement member wall 610 and the second engagement side 626 such that the second gasket 248 is separated from the cartridge wall 254 by the adaptor 260. The second gasket 248 establishes a second seal between the outlet engagement member wall 610 and the second engagement side 626. For example, the second gasket 248 engages the outlet engagement member wall 610 and the second engagement side 626 to form a second seal therebetween. In this way, when a compressive force is applied to the outlet engagement member wall 610, the second gasket 248 is compressed between the outlet engagement member wall 610 and the second engagement side 626.

In other embodiments, the first gasket 246 and/or the second gasket 248 is/are disposed in a different location than as shown in FIG. 28. In these embodiments, the first gasket 246 may be positioned between the inlet engagement member 220 and the adaptor 260 and/or the second gasket 248 may be positioned between the outlet engagement member 240 and the adaptor 260. In other embodiments, the aftertreatment system 200 does not include the first gasket 246 and/or the second gasket 248. In these embodiments, a first seal (e.g., a metal-to-metal seal) may be formed by inlet coupling flange 606 engaging the first engagement side 624. A second seal (e.g., a metal-to-metal seal) may be formed by the outlet coupling flange 616 engaging the second engagement side 626. Advantageously, when the aftertreatment system 200 does not include the first gasket 246 and/or the second gasket 248 the quantity of components in the joint created by the inlet engagement member 220, the outlet engagement member 240 and the adaptor 260, is reduced thereby simplifying the manufacturing process, assembly process, and replacement process. In some embodiments, the metal-to-metal contact between the inlet engagement member 220 and the adaptor 260 and/or the metal-to-metal contact between the outlet engagement member 240 and the adaptor 260 also mitigates against gasket creep.

In some embodiments, the metal-to-metal contact between the inlet engagement member 220 and the adaptor 260 and/or the metal-to-metal contact between the outlet engagement member 240 and the adaptor 260 does not form a seal therebetween. In some embodiments, the metal-to-metal contact between the inlet engagement member 220 and the adaptor 260 and/or the metal-to-metal contact between the outlet engagement member 240 and the adaptor 260 provides an alternate path for external forces to pass through the joint created by the inlet engagement member 220, the outlet engagement member 240 and the adaptor 260. Advantageously, the metal-to-metal contact between the inlet engagement member 220 and the adaptor 260 and/or the metal-to-metal contact between the outlet engagement member 240 and the adaptor 260 avoids over-compression of the gaskets (e.g., the first gasket 246 and/or the second gasket 248) due to external forces. In some embodiments, the metal-to-metal contact between the inlet engagement member 220 and the adaptor 260 and/or the metal-to-metal contact between the outlet engagement member 240 and the adaptor 260 also enables control of gasket compression thru the fit between the metal components and the gaskets. For example, the cross sectional space created by the fit of the metal components (e.g., the inlet engagement member 220, the outlet engagement member 240 and the adaptor 260) is slightly smaller than the cross section of the gaskets (e.g., the first gasket 246 and/or the second gasket 248) thereby controlling the amount of gasket compression.

As shown in FIG. 29, the adaptor 260 is disposed between the inlet engagement member 220 and the outlet engagement member 240. In some embodiments, the adaptor 260 is coupled to the cartridge wall 254. In other embodiments, the adaptor 260 is monolithically formed with the cartridge wall 254. As described herein, the adaptor 260 cooperates with the cartridge wall 254, the inlet engagement member 220, and the outlet engagement member 240 to facilitate suspension of the cartridge 250 within the inlet body 206 and/or the outlet body 232 when a compressive force is applied to the adaptor 260.

The adaptor 260 includes an adaptor wall 630 (e.g., ring, etc.). The adaptor wall 630 includes an adaptor wall first portion 632. In some embodiments, the adaptor wall first portion 632 is coupled to the cartridge wall 254. In other embodiments, the adaptor wall first portion 632 is monolithically formed with the cartridge wall 254. In some embodiments, the adaptor wall first portion 632 is substantially parallel to an extending direction of the cartridge 250 and/or substantially parallel to the cartridge wall 254. In some embodiments, the adaptor wall first portion 632 is attached to an outer surface of the cartridge wall 254.

The adaptor wall 630 also includes an adaptor wall second portion 634 extending outward (e.g., radially outward, axially outward) and in a downstream direction from the adaptor wall first portion 632. The adaptor wall second portion 634 is contiguous with the adaptor wall first portion 632. A flat portion of the adaptor wall second portion 634 extends along a slope that is angled with respect to the adaptor wall first portion 632. The angle of the slope is between 15° and 90° with respect to an extending direction of the adaptor wall first portion 632. In some embodiments, the flat portion of the adaptor wall second portion 634 is substantially parallel to the inlet engagement member wall second portion 604 and/or substantially perpendicular to the adaptor wall first portion 632.

The adaptor wall 630 includes an adaptor wall third portion 636. In some embodiments, the adaptor wall third portion 636 extends outward (e.g., radially outward, axially outward) and in a downstream direction from the adaptor wall second portion 634. The adaptor wall third portion 636 is contiguous with the adaptor wall second portion 634. A flat portion of the adaptor wall third portion 636 extends along a slope that is angled with respect to the adaptor wall second portion 634. The angle of the slope is between 15° and 90° with respect to an extending direction of the adaptor wall second portion 634. In some embodiments, the flat portion of the adaptor wall third portion 636 is substantially parallel to the inlet coupling flange 606. In some embodiments, the adaptor wall third portion 636 defines a first engagement surface 638 (e.g., an upstream engagement surface).

The adaptor wall 630 includes an adaptor wall fourth portion 642. In some embodiments, the adaptor wall fourth portion 642 is coupled to the cartridge wall 254. In other embodiments, the adaptor wall fourth portion 642 is monolithically formed with the cartridge wall 254. In some embodiments, the adaptor wall fourth portion 642 is substantially parallel to an extending direction of the cartridge 250 and/or substantially parallel to the cartridge wall 254. In some embodiments, the adaptor wall fourth portion 642 is attached to an outer surface of the cartridge wall 254.

The adaptor wall 630 also includes an adaptor wall fifth portion 644 extending outward (e.g., radially outward, axially outward) and in an upstream direction from the adaptor wall fourth portion 642. The adaptor wall fifth portion 644 is contiguous with the adaptor wall fourth portion 642. A flat portion of the adaptor wall fifth portion 644 extends along a slope that is angled with respect to the adaptor wall fourth portion 642. The angle of the slope is between 15° and 90° with respect to an extending direction of the adaptor wall fourth portion 642. In some embodiments, the flat portion of the adaptor wall fifth portion 644 is substantially parallel to the outlet engagement member wall second portion 614 and/or substantially perpendicular to the adaptor wall fourth portion 642.

The adaptor wall 630 includes an adaptor wall sixth portion 646. In some embodiments, the adaptor wall sixth portion 646 extends outward (e.g., radially outward, axially outward) and in a downstream direction from the adaptor wall fifth portion 644. The adaptor wall sixth portion 646 is contiguous with the adaptor wall fifth portion 644. A flat portion of the adaptor wall sixth portion 646 extends along a slope that is angled with respect to the adaptor wall fifth portion 644. The angle of the slope is between 15° and 90° with respect to an extending direction of the adaptor wall fifth portion 644. In some embodiments, the flat portion of the adaptor wall sixth portion 646 is substantially parallel to the outlet coupling flange 616. In some embodiments, the adaptor wall sixth portion 646 defines a second engagement surface 648 (e.g., a downstream engagement surface).

The adaptor wall 290 also includes an adaptor wall seventh portion 640 that extends between the adaptor wall third portion 636 and the adaptor wall sixth portion 646. More specifically, the adaptor wall seventh portion 640 extends outward (e.g., radially outward, axially outward) and in a downstream direction from the adaptor wall third portion 636 towards an apex and extends inward (e.g., radially inward) in the downstream direction from the apex towards the adaptor wall sixth portion 646. The adaptor wall seventh portion 640 is contiguous with the adaptor wall third portion 636 and the adaptor wall sixth portion 646.

In some embodiments, when a compressive force is applied to the inlet engagement member 220 and the outlet engagement member 240, the compressive force is also applied to the adaptor 260, enabling the adaptor 260 to suspend the cartridge 250 within the inlet body 206 and the outlet body 232.

In some embodiments, when a compressive force is applied to the inlet engagement member 220 and the outlet engagement member 240, the inlet coupling flange 606 engages the first engagement surface 638 to form a first seal therebetween. The outlet coupling flange 616 engages the second engagement surface 648 to form a second seal therebetween.

In some embodiments, the aftertreatment system 200 shown in FIG. 29 includes the first gasket 246, also referred to herein as a first sealing member. The first gasket 246 is disposed between the inlet engagement member wall 600 and the adaptor wall second portion 634 such that the first gasket 246 is separated from the cartridge wall 254 by the adaptor 260. The first gasket 246 establishes a first seal between the inlet engagement member wall 600 and the adaptor wall second portion 634. For example, the first gasket 246 engages the inlet engagement member wall 600 and the adaptor wall second portion 634 to form a first seal therebetween. In this way, when a compressive force is applied to the inlet engagement member wall 600, the first gasket 246 is compressed between the inlet engagement member wall 600 and the adaptor wall second portion 634.

Similarly, the aftertreatment system 200 may include a second gasket 248, also referred to herein as a second sealing member. The second gasket 248 is disposed between the outlet engagement member wall 610 and the adaptor wall fifth portion 644 such that the second gasket 248 is separated from the cartridge wall 254 by the adaptor 260. The second gasket 248 establishes a second seal between the outlet engagement member wall 610 and the adaptor wall fifth portion 644. For example, the second gasket 248 engages the outlet engagement member wall 610 and the adaptor wall fifth portion 644 to form a second seal therebetween. In this way, when a compressive force is applied to the outlet engagement member wall 610, the second gasket 248 is compressed between the outlet engagement member wall 610 and the adaptor wall fifth portion 644.

In other embodiments, the first gasket 246 and/or the second gasket 248 is/are disposed in a different location than as shown in FIG. 29. In these embodiments, the first gasket 246 may be positioned between the inlet engagement member 220 and the adaptor 260 and/or the second gasket 248 may be positioned between the outlet engagement member 240 and the adaptor 260. In other embodiments, the aftertreatment system 200 does not include the first gasket 246 and/or the second gasket 248. In these embodiments, a first seal (e.g., a metal-to-metal seal) may be formed by inlet coupling flange 606 engaging the first engagement surface 638. A second seal (e.g., a metal-to-metal seal) may be formed by the outlet coupling flange 616 engaging the second engagement surface 648. Advantageously, when the aftertreatment system 200 does not include the first gasket 246 and/or the second gasket 248 the quantity of components in the joint created by the inlet engagement member 220, the outlet engagement member 240 and the adaptor 260, is reduced thereby simplifying the manufacturing process, assembly process, and replacement process. In some embodiments, the metal-to-metal contact between the inlet engagement member 220 and the adaptor 260 and/or the metal-to-metal contact between the outlet engagement member 240 and the adaptor 260 also mitigates against gasket creep.

In some embodiments, the metal-to-metal contact between the inlet engagement member 220 and the adaptor 260 and/or the metal-to-metal contact between the outlet engagement member 240 and the adaptor 260 does not form a seal therebetween. In some embodiments, the metal-to-metal contact between the inlet engagement member 220 and the adaptor 260 and/or the metal-to-metal contact between the outlet engagement member 240 and the adaptor 260 provides an alternate path for external forces to pass through the joint created by the inlet engagement member 220, the outlet engagement member 240 and the adaptor 260. Advantageously, the metal-to-metal contact between the inlet engagement member 220 and the adaptor 260 and/or the metal-to-metal contact between the outlet engagement member 240 and the adaptor 260 avoids over-compression of the gaskets (e.g., the first gasket 246 and/or the second gasket 248) due to external forces. In some embodiments, the metal-to-metal contact between the inlet engagement member 220 and the adaptor 260 and/or the metal-to-metal contact between the outlet engagement member 240 and the adaptor 260 also enables control of gasket compression thru the fit between the metal components and the gaskets. For example, the cross sectional space created by the fit of the metal components (e.g., the inlet engagement member 220, the outlet engagement member 240 and the adaptor 260) is slightly smaller than the cross section of the gaskets (e.g., the first gasket 246 and/or the second gasket 248) thereby controlling the amount of gasket compression.

Figure 30:
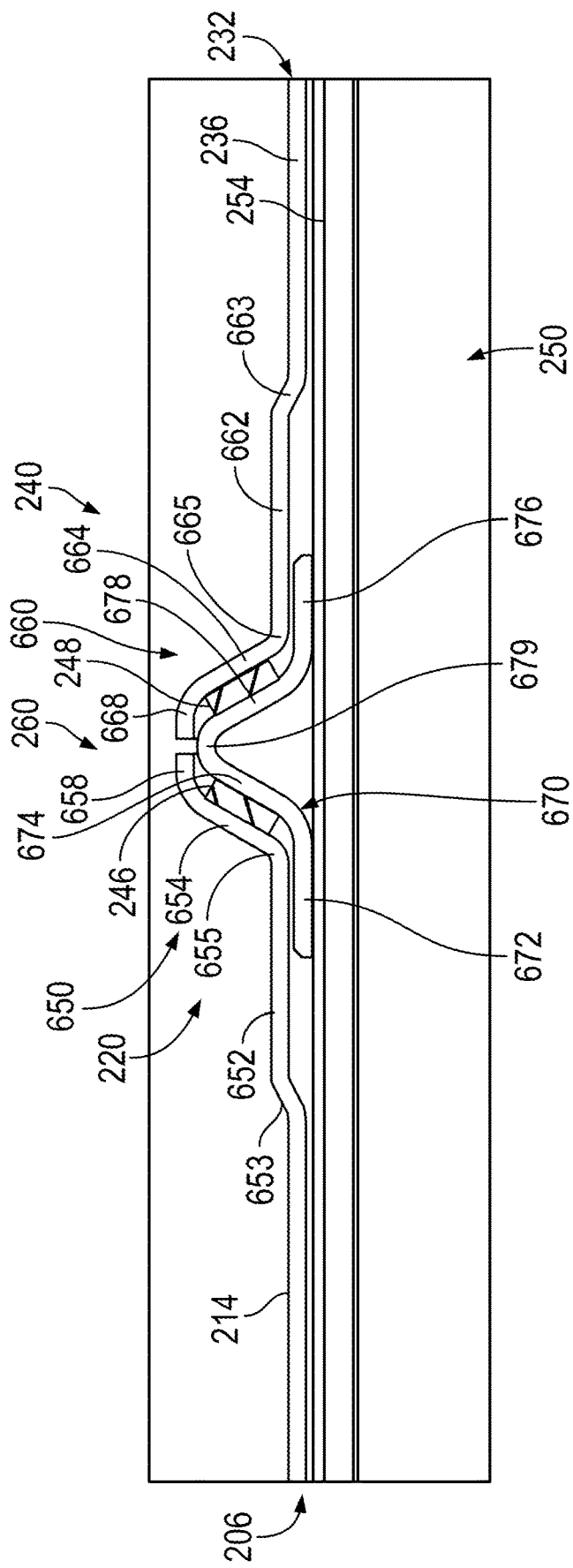
FIG. 30 is a cross-sectional view of the aftertreatment system shown in FIG. 17, according to another example embodiment.

FIG. 30 is a cross-sectional view of the aftertreatment system 200, according to another example embodiment. In the embodiment shown in FIG. 30, the inlet engagement member 220 is downstream of the inlet body wall portion 214 and flares or extends outwardly (e.g., radially outwardly and axially outwardly, etc.) from the inlet body wall portion 214. The inlet engagement member 220 includes an inlet engagement member wall 650.

The inlet engagement member wall 650 includes an inlet engagement member wall first portion 652 that extends outward from the inlet body wall 214 and substantially parallel to the inlet body wall 214. In some embodiments, the inlet engagement member wall first portion 652 is contiguous with the inlet body wall 214. In other embodiments, and as shown in FIG. 30, the inlet engagement member wall 650 includes an inlet engagement member wall first curved portion 653. The inlet engagement member wall first curved portion 653 is contiguous with the inlet body wall 214 and contiguous with the inlet engagement member wall first portion 652. The inlet engagement member wall first curved portion 653 extends outward (e.g., radially outwardly and axially outwardly, etc.) from the inlet body wall 214. More specifically, the inlet engagement member wall first curved portion 653 extends along a curved path between the inlet body wall 214 and the inlet engagement member wall first portion 652.

The inlet engagement member wall 650 includes an inlet engagement member wall second portion, referred to herein as an inlet coupling flange 654. The inlet coupling flange 654 extends outward (e.g., radially outward) from the inlet engagement member wall first portion 652. The inlet coupling flange 654 extends along a slope that is angled with respect to the inlet engagement member wall first portion 652. The slope is angled with respect to an extending direction of the inlet engagement member wall first portion 652 and/or the inlet body wall 214. In some embodiments, the slope is between 15° and 90° with respect to the extending direction of the inlet engagement member wall first portion 652 and/or the inlet body wall 214. In some embodiments, the inlet coupling flange 654 is contiguous with the inlet engagement member wall first portion 652. In other embodiments, and as shown in FIG. 30, inlet engagement member wall 650 includes an inlet engagement member wall second curved portion 655. The inlet engagement member wall second curved portion 655 is contiguous with inlet engagement member wall first portion 652 and contiguous with the inlet coupling flange 654. The inlet engagement member wall second curved portion 655 extends outward (e.g., radially outwardly and axially outwardly, etc.) from the inlet engagement member wall first portion 652. More specifically, the inlet engagement member wall second curved portion 655 extends along a curved path between the inlet engagement member wall first portion 652 and the inlet coupling flange 654.

In the embodiment shown in FIG. 30 the inlet engagement member wall 650 includes an extended flange portion 658. The extended flange portion 658 extends outward (e.g., radially outward, axially outward) from the inlet coupling flange 654 in a downstream direction. The extended flange portion 658 is contiguous with the inlet coupling flange 654. A flat portion of the extended flange portion 658 extends along a slope that is angled with respect to the inlet coupling flange 654. The angle of the slope is between 15° and 90° with respect to an extending direction of the inlet coupling flange 654. In some embodiments, the extended flange portion 658 is substantially parallel to the inlet engagement member wall first portion 652.

The outlet engagement member 240 is upstream of the outlet body wall portion 236 and flares or extends outwardly (e.g., radially outwardly and axially outwardly, etc.) from the outlet body wall portion 236. The outlet engagement member 240 includes an outlet engagement member wall 660.

The outlet engagement member wall 660 includes outlet engagement member wall first portion 662 extends that extends outward from the outlet body wall 236 and substantially parallel to the outlet body wall 236. In some embodiments, the outlet engagement member wall first portion 662 is contiguous with the outlet body wall 236. In other embodiments, and as shown in FIGS. 23 and 24, outlet engagement member wall 660 includes an outlet engagement member wall first curved portion 663. The outlet engagement member wall first curved portion 663 is contiguous with the outlet body wall 236 and contiguous with the outlet engagement member wall first portion 662. The outlet engagement member wall first curved portion 663 extends outward (e.g., radially outwardly and axially outwardly, etc.) from the outlet body wall 236. More specifically, the outlet engagement member wall first curved portion 663 extends along a curved path between the outlet body wall 236 and the outlet engagement member wall first portion 662.

The outlet engagement member wall 660 includes an outlet engagement member wall second portion, referred to herein as an outlet coupling flange 664. The outlet coupling flange 664 extends outward (e.g., radially outward) from the outlet engagement member wall first portion 662 in an upstream direction. The outlet coupling flange 664 extends along a slope that is angled with respect to the outlet engagement member wall first portion 662. The slope is angled with respect to an extending direction of the outlet engagement member wall first portion 662 and/or the outlet body wall 236. In some embodiments, the slope is between 15° and 90° with respect to the extending direction of the outlet engagement member wall first portion 662 and/or the outlet body wall 236. In some embodiments, the outlet coupling flange 664 is contiguous with the outlet engagement member wall first portion 662. In other embodiments, and as shown in FIGS. 23 and 24, outlet coupling flange 664 includes an outlet engagement member wall second curved portion 665. The outlet engagement member wall second curved portion 665 is contiguous with outlet engagement member wall first portion 662 and contiguous with outlet coupling flange 664. The outlet engagement member wall second curved portion 665 extends outward (e.g., radially outwardly and axially outwardly, etc.) from the outlet engagement member wall first portion 662. More specifically, the outlet engagement member wall second curved portion 665 extends along a curved path between the outlet engagement member wall first portion 662 and the outlet coupling flange 664.

In the embodiment shown in FIG. 30 the outlet engagement member wall 660 includes an extended flange portion 668. The extended flange portion 668 extends outward (e.g., radially outward, axially outward) from the outlet coupling flange 664 in an upstream direction. The extended flange portion 668 is contiguous with the outlet coupling flange 664. A flat portion of the extended flange portion 668 extends along a slope that is angled with respect to the outlet coupling flange 664. The angle of the slope is between 15° and 90° with respect to an extending direction of the outlet coupling flange 664. In some embodiments, the extended flange portion 668 is substantially parallel to the outlet engagement member wall first portion 662.

As shown in FIG. 30, the adaptor 260 is disposed between the inlet engagement member 220 and the outlet engagement member 240. In some embodiments, the adaptor 260 is coupled to the cartridge wall 254. In other embodiments, the adaptor 260 is monolithically formed with the cartridge wall 254. As described herein, the adaptor 260 cooperates with the cartridge wall 254, the inlet engagement member 220, and the outlet engagement member 240 to facilitate suspension of the cartridge 250 within the inlet body 206 and/or the outlet body 232 when a compressive force is applied to the adaptor 260.

The adaptor 260 includes an adaptor wall 670 (e.g., ring, etc.). The adaptor wall 670 includes an adaptor wall first portion 672. In some embodiments, the adaptor wall first portion 672 is coupled to the cartridge wall 254. In other embodiments, the adaptor wall first portion 672 is monolithically formed with the cartridge wall 254. The adaptor wall first portion 672 extends outward (e.g., radially outward) from the cartridge wall 254. In some embodiments, the adaptor wall first portion 291 is substantially parallel to an extending direction of the cartridge 250 and/or substantially parallel to the cartridge wall 254.

The adaptor wall 670 also includes an adaptor wall second portion 674 extending outward (e.g., radially outward, axially outward) and in a downstream direction from the adaptor wall first portion 672. The adaptor wall second portion 674 is contiguous with the adaptor wall first portion 672. A flat portion of the adaptor wall second portion 674 extends along a slope that is angled with respect to the adaptor wall first portion 672. The angle of the slope is between 15° and 90° with respect to an extending direction of the adaptor wall first portion 672. In some embodiments, the adaptor wall second portion 674 is substantially parallel to the inlet coupling flange 654.

The adaptor wall 670 includes an adaptor wall third portion 676. In some embodiments, the adaptor wall third portion 676 is coupled to the cartridge wall 254. In other embodiments, the adaptor wall third portion 676 is monolithically formed with the cartridge wall 254. The adaptor wall third portion 676 extends outward (e.g., radially outward) from the cartridge wall 254. In some embodiments, the adaptor wall third portion 676 is substantially parallel to an extending direction of the cartridge 250 and/or substantially parallel to the cartridge wall 254. The adaptor wall third portion 676 is positioned downstream of the adaptor wall first portion 672.

The adaptor wall 670 also includes an adaptor wall fourth portion 678 extending outward (e.g., radially outward, axially outward) and in an upstream direction from the adaptor wall fourth portion 678. The adaptor wall fourth portion 678 is contiguous with the adaptor wall third portion 676. A flat portion of the adaptor wall fourth portion 678 extends along a slope that is angled with respect to the adaptor wall third portion 676. The angle of the slope is between 90° and 180° with respect to an extending direction of the adaptor wall third portion 676. In some embodiments, the adaptor wall fourth portion 678 is substantially parallel to the outlet coupling flange 664.

The adaptor wall 670 also includes an adaptor wall fifth portion 679 that extends between the adaptor wall second portion 674 and the adaptor wall fourth portion 678. More specifically, the adaptor wall fifth portion 679 extends outward (e.g., radially outward, axially outward) and in a downstream direction from the adaptor wall second portion 674 towards an apex and extends inward (e.g., radially inward) in the downstream direction from the apex towards the adaptor wall fourth portion 678. The adaptor wall fifth portion 679 is contiguous with the adaptor wall second portion 674 and the adaptor wall fourth portion 678.

In some embodiments, when a compressive force is applied to the inlet engagement member 220 and the outlet engagement member 240, the compressive force is also applied to the adaptor 260, enabling the adaptor 260 to suspend the cartridge 250 within the inlet body 206 and the outlet body 232.

In some embodiments, when a compressive force is applied to the inlet engagement member 220 and the outlet engagement member 240, the inlet coupling flange 454, engages the adaptor wall second portion 674 to form a first seal therebetween. The outlet coupling flange 464 engages the adaptor wall fourth portion 678 to form a second seal therebetween.

In some embodiments, the aftertreatment system 200 shown in FIG. 23 includes the first gasket 246, also referred to herein as a first sealing member. The first gasket 246 is disposed between the inlet engagement member wall 650 and the adaptor wall second portion 674 such that the first gasket 246 is separated from the cartridge wall 254 by the adaptor 260. The first gasket 246 establishes a first seal between the inlet engagement member wall 650 and the adaptor wall second portion 674. For example, the first gasket 246 engages the inlet engagement member wall 650 and the adaptor wall second portion 674 to form a first seal therebetween. In this way, when a compressive force is applied to the inlet engagement member wall 650, the first gasket 246 is compressed between the inlet engagement member wall 650 and the adaptor wall second portion 674.

Similarly, the aftertreatment system 200 may include a second gasket 248, also referred to herein as a second sealing member. The second gasket 248 is disposed between the outlet engagement member wall 660 and the adaptor wall fourth portion 678 such that the second gasket 248 is separated from the cartridge wall 254 by the adaptor 260.

The second gasket 248 establishes a second seal between the outlet engagement member wall 660 and the adaptor wall fourth portion 678. For example, the second gasket 248 engages the outlet engagement member wall 660 and the adaptor wall fourth portion 678 to form a second seal therebetween. In this way, when a compressive force is applied to the outlet engagement member wall 660, the second gasket 248 is compressed between the outlet engagement member wall 660 and the adaptor wall fourth portion 678.

In other embodiments, the first gasket 246 and/or the second gasket 248 is/are disposed in a different location than as shown in FIG. 30. In these embodiments, the first gasket 246 may be positioned between the inlet engagement member 220 and the adaptor 260 and/or the second gasket 248 may be positioned between the outlet engagement member 240 and the adaptor 260. In other embodiments, the aftertreatment system 200 does not include the first gasket 246 and/or the second gasket 248. In these embodiments, a first seal (e.g., a metal-to-metal seal) may be formed by inlet engagement member wall 650 engaging the adaptor wall second portion 674. A second seal (e.g., a metal-to-metal seal) may be formed by the outlet engagement member wall 660 engaging the adaptor wall fourth portion 678. Advantageously, when the aftertreatment system 200 does not include the first gasket 246 and/or the second gasket 248 the quantity of components in the joint created by the inlet engagement member 220, the outlet engagement member 240 and the adaptor 260, is reduced thereby simplifying the manufacturing process, assembly process, and replacement process. In some embodiments, the metal-to-metal contact between the inlet engagement member 220 and the adaptor 260 and/or the metal-to-metal contact between the outlet engagement member 240 and the adaptor 260 also mitigates against gasket creep.

In some embodiments, the metal-to-metal contact between the inlet engagement member 220 and the adaptor 260 and/or the metal-to-metal contact between the outlet engagement member 240 and the adaptor 260 does not form a seal therebetween. In some embodiments, the metal-to-metal contact between the inlet engagement member 220 and the adaptor 260 and/or the metal-to-metal contact between the outlet engagement member 240 and the adaptor 260 provides an alternate path for external forces to pass through the joint created by the inlet engagement member 220, the outlet engagement member 240 and the adaptor 260. Advantageously, the metal-to-metal contact between the inlet engagement member 220 and the adaptor 260 and/or the metal-to-metal contact between the outlet engagement member 240 and the adaptor 260 avoids over-compression of the gaskets (e.g., the first gasket 246 and/or the second gasket 248) due to external forces. In some embodiments, the metal-to-metal contact between the inlet engagement member 220 and the adaptor 260 and/or the metal-to-metal contact between the outlet engagement member 240 and the adaptor 260 also enables control of gasket compression thru the fit between the metal components and the gaskets. For example, the cross sectional space created by the fit of the metal components (e.g., the inlet engagement member 220, the outlet engagement member 240 and the adaptor 260) is slightly smaller than the cross section of the gaskets (e.g., the first gasket 246 and/or the second gasket 248) thereby controlling the amount of gasket compression.

Figure 31:
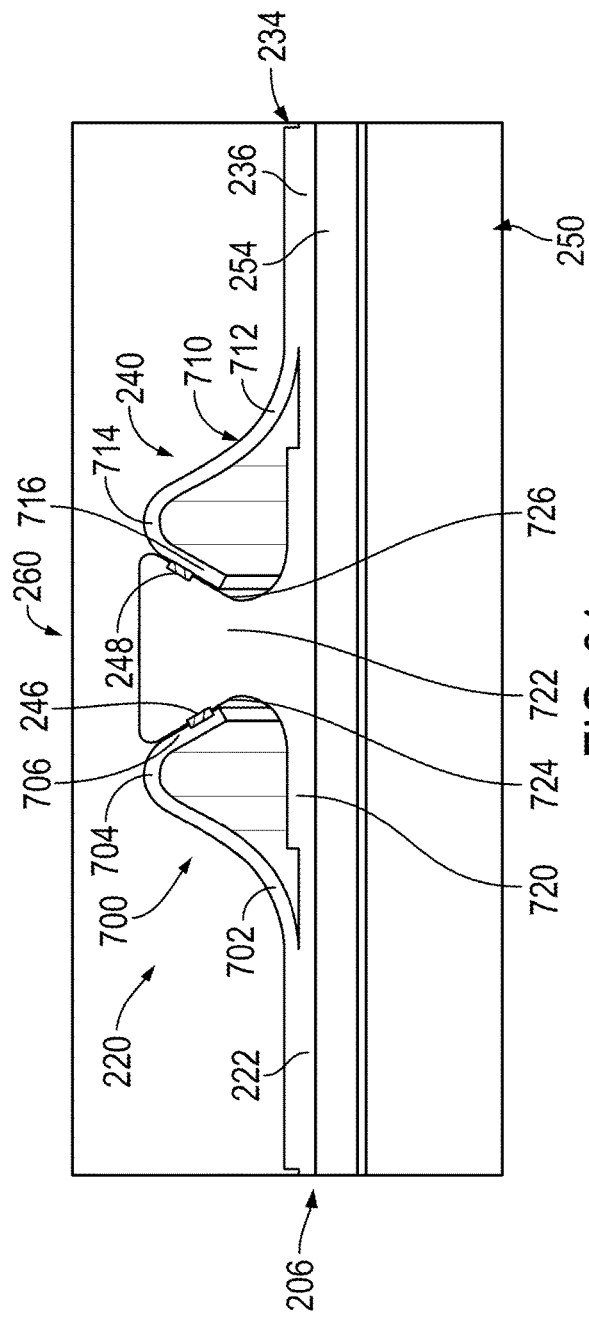
FIG. 31 is a cross-sectional view of the aftertreatment system shown in FIG. 17, according to another example embodiment.

FIG. 31 is a cross-sectional view of the aftertreatment system 200, according to another example embodiment. In the embodiment shown in FIG. 31, the inlet engagement member 220 is downstream of the inlet body wall portion 214 and flares or extends outwardly (e.g., radially outwardly and axially outwardly, etc.) from the inlet body wall portion 214. The inlet engagement member 220 includes an inlet engagement member wall 700.

The inlet engagement member wall 700 includes an inlet engagement member wall first portion 702 that extends outward (e.g., radially outward and/or axially outward), in a downstream direction, and along a slope from the inlet body wall 214. The slope is angled with respect to an extending direction of the inlet body 206. In some embodiments, the slope is between 15° and 90° with respect to the extending direction of the inlet body 206. In some embodiments, the inlet engagement member wall first portion 702 is curved such that the inlet engagement member wall first portion 702 defines a curved wall portion between the inlet body wall 214 and a downstream portion of the inlet engagement member wall first portion 702, where the downstream portion of the inlet engagement member wall first portion 702 extends along the slope. The inlet engagement member wall first portion 702 is contiguous with the inlet body wall 214.

The inlet engagement member wall 700 includes an inlet engagement member wall second portion 704 that extends in a downstream direction from the inlet engagement member wall first portion 702. In some embodiments, the inlet engagement member wall second portion 704 is a curved wall portion. In some embodiments, the inlet engagement member wall second portion 704 at least partially extends outward (e.g., radially outward) from the inlet engagement member wall first portion 702. More specifically, an upstream portion of the inlet engagement member wall second portion 704 extends in a radially outward and in the downstream direction from the inlet engagement member wall first portion 702. A downstream portion of the inlet engagement member wall second portion 704 extends radially inward and in the downstream direction from the upstream portion of the inlet engagement member wall second portion 704.

The inlet engagement member wall 700 includes an inlet engagement member wall third portion 706, referred to herein as an inlet coupling flange 706. The inlet coupling flange 306 extends outward from the inlet body wall 214 (e.g., axially outward) in the downstream direction. The inlet coupling flange 706 extends that extends inward (e.g., radially inward), in a downstream direction, and along a slope from the inlet engagement member wall second portion 704. The slope is angled with respect to an extending direction of the inlet body 206. In some embodiments, the slope is between 15° and 90° with respect to the extending direction of the inlet body 206. In some embodiments, the inlet engagement member wall third portion 706 is curved such that the inlet engagement member wall third portion 706 defines a curved wall portion between inlet engagement member wall second portion 704 and a downstream portion of the inlet engagement member wall third portion 706, where the downstream portion of the inlet engagement member wall third portion 706 extends along the slope. The inlet engagement member wall third portion 706 is contiguous with the inlet engagement member wall second portion 704.

The outlet engagement member 240 is upstream of the outlet body wall portion 236 and flares or extends outwardly (e.g., radially outwardly and axially outwardly, etc.) from the outlet body wall portion 236. The outlet engagement member 240 includes an outlet engagement member wall 710.

The outlet engagement member wall 710 includes an outlet engagement member wall first portion 712 that extends outward (e.g., radially outward and/or axially outward), in an upstream direction, and along a slope from the outlet body wall 236. The slope is angled with respect to an extending direction of the outlet body 232. In some embodiments, the slope is between 15° and 90° with respect to the extending direction of the outlet body 232. In some embodiments, the outlet engagement member wall first portion 712 is curved such that the outlet engagement member wall first portion 712 defines a curved wall portion between the outlet body wall 236 and an upstream portion of the outlet engagement member wall first portion 712, where the upstream portion of the outlet engagement member wall first portion 712 extends along the slope. The outlet engagement member wall first portion 712 is contiguous with the outlet body wall 236.

The outlet engagement member wall 710 includes an outlet engagement member wall second portion 714 that extends in an upstream direction from the outlet engagement member wall first portion 712. In some embodiments, the outlet engagement member wall second portion 714 is a curved wall portion. In some embodiments, the outlet engagement member wall second portion 714 at least partially extends outward (e.g., radially outward) from the outlet engagement member wall first portion 712. More specifically, a downstream portion of the outlet engagement member wall second portion 714 extends in a radially outward and in the upstream direction from the outlet engagement member wall first portion 712. An upstream portion of the outlet engagement member wall second portion 714 extends radially inward and in the upstream direction from the downstream portion of the outlet engagement member wall second portion 714.

The outlet engagement member wall 710 includes an outlet engagement member wall third portion 716, referred to herein as an outlet coupling flange 716. The outlet coupling flange 716 extends outward from the outlet body wall 236 (e.g., axially outward) in the upstream direction. The outlet coupling flange 716 extends that extends inward (e.g., radially inward), in an upstream direction, and along a slope from the outlet engagement member wall second portion 714. The slope is angled with respect to an extending direction of the outlet body 232. In some embodiments, the slope is between 15° and 90° with respect to the extending direction of the outlet body 232. In some embodiments, the outlet engagement member wall third portion 716 is curved such that the outlet engagement member wall third portion 716 defines a curved wall portion between outlet engagement member wall second portion 714 and an upstream portion of the outlet engagement member wall third portion 716, where the upstream portion of the outlet engagement member wall third portion 716 extends along the slope. The outlet engagement member wall third portion 716 is contiguous with the outlet engagement member wall second portion 714.

As shown in FIG. 31, the adaptor 260 is disposed between the inlet engagement member 220 and the outlet engagement member 240. In some embodiments, the adaptor 260 is coupled to the cartridge wall 254. In other embodiments, the adaptor 260 is monolithically formed with the cartridge wall 254. As described herein, the adaptor 260 cooperates with the cartridge wall 254, the inlet engagement member 220, and the outlet engagement member 240 to facilitate suspension of the cartridge 250 within the inlet body 206 and/or the outlet body 232 when a compressive force is applied to the adaptor 260.

The adaptor 260 includes a base 720 that extends outward from the cartridge wall 254. In some embodiments, the base 720 is attached to an outer surface of the cartridge wall 254. In some embodiments, the base 720 is monolithically formed with the cartridge wall 254. In some embodiments, the base 720 is substantially parallel to or coaxial with the cartridge wall 254.

The adaptor 260 also includes a projection 722 that extends radially outward from the base 720. In some embodiments, the projection 722 is substantially perpendicular to the base 720. In some embodiments, the projection 722 is disposed between the inlet coupling flange 706 and the outlet coupling flange 716. The projection 722 includes a first engagement surface 724 (e.g., an upstream surface). The first engagement surface 724 is curved such that a shape of the projection 722 along the first engagement surface 742 conforms to the shape of the inlet coupling flange 706. The projection 722 also includes a second engagement surface 726 (e.g., a downstream surface). The second engagement surface 726 is curved such that a shape of the projection 722 along the second engagement surface 726 conforms to the shape of the outlet coupling flange 716.

In some embodiments, the first engagement surface 724 engages the inlet coupling flange 706. In some embodiments, the engagement of the first engagement surface 724 and the inlet coupling flange 706 forms a first seal therebetween. In some embodiments, the second engagement surface 726 engages the outlet coupling flange 716. In some embodiments, the engagement of the second engagement surface 726 and the outlet coupling flange 716 forms a second seal therebetween.

In some embodiments, the aftertreatment system 200 shown in FIG. 28 includes the first gasket 246, also referred to herein as a first sealing member. The first gasket 246 is disposed between the inlet coupling flange 706 and the first engagement surface 724 such that the first gasket 246 is separated from the cartridge wall 254 by the adaptor 260. The first gasket 246 establishes a first seal between the inlet coupling flange 706 and the first engagement surface 724. For example, the first gasket 246 engages the inlet coupling flange 706 and the first engagement surface 724 to form a first seal therebetween. In this way, when a compressive force is applied to the inlet coupling flange 706, the first gasket 246 is compressed between the inlet coupling flange 706 and the first engagement surface 724.

Similarly, the aftertreatment system 200 may include a second gasket 248, also referred to herein as a second sealing member. The second gasket 248 is disposed between the outlet coupling flange 716 and the second engagement surface 726 such that the second gasket 248 is separated from the cartridge wall 254 by the adaptor 260. The second gasket 248 establishes a second seal between the outlet coupling flange 716 and the second engagement surface 726. For example, the second gasket 248 engages the outlet coupling flange 716 and the second engagement surface 726 to form a second seal therebetween. In this way, when a compressive force is applied to the outlet coupling flange 716, the second gasket 248 is compressed between the outlet coupling flange 716 and the second engagement surface 726.

In other embodiments, the first gasket 246 and/or the second gasket 248 is/are disposed in a different location than as shown in FIG. 31. In these embodiments, the first gasket 246 may be positioned between the inlet engagement member 220 and the adaptor 260 and/or the second gasket 248 may be positioned between the outlet engagement member 240 and the adaptor 260. In other embodiments, the aftertreatment system 200 does not include the first gasket 246 and/or the second gasket 248. In these embodiments, a first seal (e.g., a metal-to-metal seal) may be formed by the inlet coupling flange 706 engaging the first engagement surface 724. A second seal (e.g., a metal-to-metal seal) may be formed by the outlet coupling flange 716 engaging the second engagement surface 726. Advantageously, when the aftertreatment system 200 does not include the first gasket 246 and/or the second gasket 248 the quantity of components in the joint created by the inlet engagement member 220, the outlet engagement member 240 and the adaptor 260, is reduced thereby simplifying the manufacturing process, assembly process, and replacement process. In some embodiments, the metal-to-metal contact between the inlet engagement member 220 and the adaptor 260 and/or the metal-to-metal contact between the outlet engagement member 240 and the adaptor 260 also mitigates against gasket creep.

In some embodiments, the metal-to-metal contact between the inlet engagement member 220 and the adaptor 260 and/or the metal-to-metal contact between the outlet engagement member 240 and the adaptor 260 does not form a seal therebetween. In some embodiments, the metal-to-metal contact between the inlet engagement member 220 and the adaptor 260 and/or the metal-to-metal contact between the outlet engagement member 240 and the adaptor 260 provides an alternate path for external forces to pass through the joint created by the inlet engagement member 220, the outlet engagement member 240 and the adaptor 260. Advantageously, the metal-to-metal contact between the inlet engagement member 220 and the adaptor 260 and/or the metal-to-metal contact between the outlet engagement member 240 and the adaptor 260 avoids over-compression of the gaskets (e.g., the first gasket 246 and/or the second gasket 248) due to external forces. In some embodiments, the metal-to-metal contact between the inlet engagement member 220 and the adaptor 260 and/or the metal-to-metal contact between the outlet engagement member 240 and the adaptor 260 also enables control of gasket compression thru the fit between the metal components and the gaskets. For example, the cross sectional space created by the fit of the metal components (e.g., the inlet engagement member 220, the outlet engagement member 240 and the adaptor 260) is slightly smaller than the cross section of the gaskets (e.g., the first gasket 246 and/or the second gasket 248) thereby controlling the amount of gasket compression.

Figure 32:
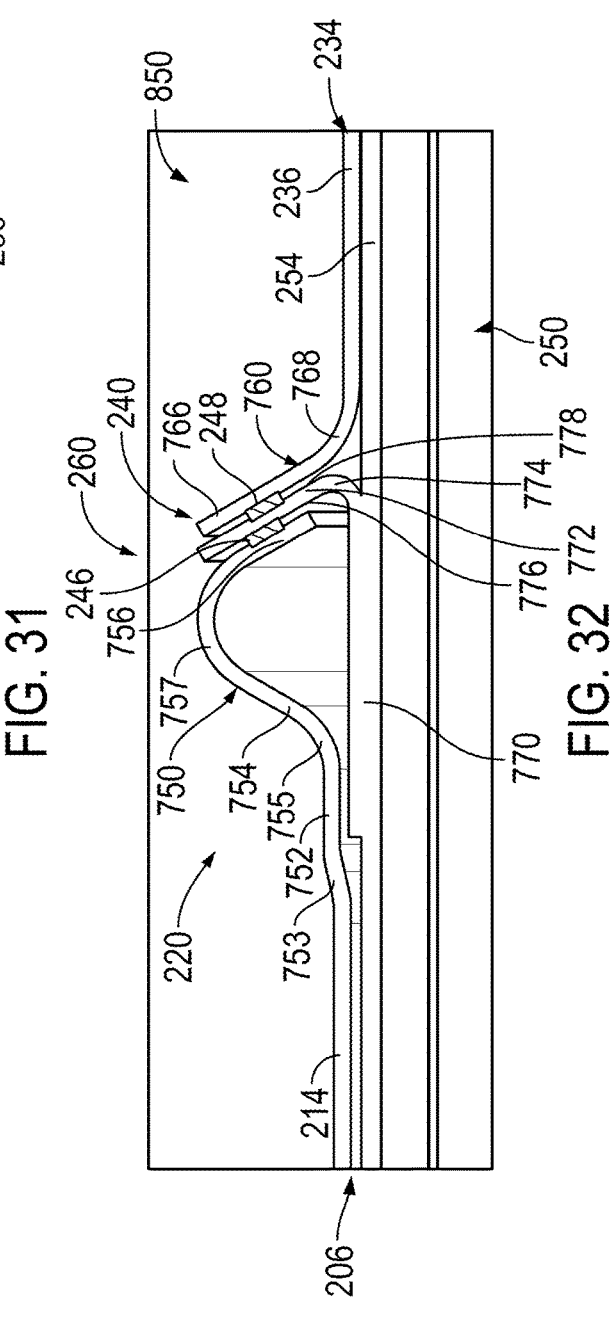
FIG. 32 is a cross-sectional view of the aftertreatment system shown in FIG. 17, according to another example embodiment.

FIG. 32 is a cross-sectional view of the aftertreatment system 200, according to another example embodiment. In the embodiment shown in FIG. 32, the inlet engagement member 220 is downstream of the inlet body wall portion 214 and flares or extends outwardly (e.g., radially outwardly and axially outwardly, etc.) from the inlet body wall portion 214. The inlet engagement member 220 includes an inlet engagement member wall 750.

The inlet engagement member wall 750 includes an inlet engagement member wall first portion 752 that extends outward from the inlet body wall 214 and substantially parallel to the inlet body wall 214. In some embodiments, the inlet engagement member wall first portion 752 is contiguous with the inlet body wall 214. In other embodiments, and as shown in FIG. 32, the inlet engagement member wall 750 includes an inlet engagement member wall first curved portion 753. The inlet engagement member wall first curved portion 753 is contiguous with the inlet body wall 214 and contiguous with the inlet engagement member wall first portion 752. The inlet engagement member wall first curved portion 753 extends outward (e.g., radially outwardly and axially outwardly, etc.) from the inlet body wall 214. More specifically, the inlet engagement member wall first curved portion 753 extends along a curved path between the inlet body wall 214 and the inlet engagement member wall first portion 752.

The inlet engagement member wall 750 includes an inlet engagement member wall second portion 754. The inlet engagement member wall second portion 754 extends outward (e.g., radially outward) from the inlet engagement member wall first portion 752. The inlet engagement member wall second portion 754 extends along a slope that is angled with respect to the inlet engagement member wall first portion 752. The slope is angled with respect to an extending direction of the inlet engagement member wall first portion 752 and/or the inlet body wall 214. In some embodiments, the slope is between 15° and 90° with respect to the extending direction of the inlet engagement member wall first portion 752 and/or the inlet body wall 214. In some embodiments, the inlet engagement member wall second portion 754 is contiguous with the inlet engagement member wall first portion 752. In other embodiments, and as shown in FIG. 32, inlet engagement member wall 750 includes an inlet engagement member wall second curved portion 755. The inlet engagement member wall second curved portion 755 is contiguous with inlet engagement member wall first portion 752 and contiguous with the inlet engagement member wall second portion 754. The inlet engagement member wall second curved portion 755 extends outward (e.g., radially outwardly and axially outwardly, etc.) from the inlet engagement member wall first portion 752. More specifically, the inlet engagement member wall second curved portion 755 extends along a curved path between the inlet engagement member wall first portion 752 and the inlet engagement member wall second portion 754.

The inlet engagement member wall 750 includes an inlet engagement member wall third portion, referred to herein as an inlet coupling flange 756. The inlet coupling flange 756 extends inward (e.g., radially inward) from the inlet engagement member wall second portion 754 and in a downstream direction. The inlet coupling flange 756 extends along a slope that is angled with respect to the inlet engagement member wall second portion 754. The slope is angled with respect to an extending direction of the inlet engagement member wall second portion 754. In some embodiments, the slope is between 15° and 180°, or more specifically, between 90° and 180°, with respect to the extending direction of the inlet engagement member wall second portion 754. In some embodiments, the inlet coupling flange 756 is contiguous with the inlet engagement member wall second portion 754. In other embodiments, and as shown in FIG. 32, inlet coupling flange 756 includes an inlet engagement member wall third curved portion 757. The inlet engagement member wall third curved portion 757 is contiguous with inlet engagement member wall second portion 754 and contiguous with the inlet coupling flange 756. The inlet engagement member wall third curved portion 757 extends outward (e.g., radially outwardly and axially outwardly, etc.) from the inlet engagement member wall second portion 754. More specifically, the inlet engagement member wall third curved portion 757 extends along a curved path between the inlet engagement member wall second portion 754 and the inlet coupling flange 756.

The outlet engagement member 240 is upstream of the outlet body wall portion 236 and flares or extends outwardly (e.g., radially outwardly and axially outwardly, etc.) from the outlet body wall portion 236. The outlet engagement member 240 includes an outlet engagement member wall 760.

The outlet engagement member wall 760 includes an outlet engagement member wall first portion, referred to herein as an outlet coupling flange 766. The outlet coupling flange 766 extends outward (e.g., radially outward) from the outlet body wall 236. The outlet coupling flange 766 extends along a slope that is angled with respect to an extending direction of the outlet engagement member wall first portion 462. In some embodiments, the slope is between 15° and 90° with respect to the extending direction of the outlet body wall 236. In some embodiments, the outlet coupling flange 766 is substantially parallel to the inlet coupling flange 756. In some embodiments, the outlet coupling flange 766 is contiguous with the outlet body wall 236. In other embodiments, and as shown in FIG. 32, the outlet coupling flange 766 includes an outlet engagement member wall curved portion 768. The outlet engagement member wall curved portion 768 is contiguous with outlet body wall 236 and contiguous with outlet coupling flange 766. The outlet engagement member wall curved portion 768 extends outward (e.g., radially outwardly and axially outwardly, etc.) from the outlet body wall 236. More specifically, the outlet engagement member wall curved portion 768 extends along a curved path between the outlet body wall 236 and the outlet coupling flange 766.

As shown in FIG. 32, the adaptor 260 is disposed between the inlet engagement member 220 and the outlet engagement member 240. In some embodiments, the adaptor 260 is coupled to the cartridge wall 254. In other embodiments, the adaptor 260 is monolithically formed with the cartridge wall 254. As described herein, the adaptor 260 cooperates with the cartridge wall 254, the inlet engagement member 220, and the outlet engagement member 240 to facilitate suspension of the cartridge 250 within the inlet body 206 and/or the outlet body 232 when a compressive force is applied to the adaptor 260.

The adaptor 260 includes a base 770 that extends outward from the cartridge wall 254. In some embodiments, the base 770 is attached to an outer surface of the cartridge wall 254. In some embodiments, the base 770 is monolithically formed with the cartridge wall 254. In some embodiments, the base 770 is substantially parallel to or coaxial with the cartridge wall 254.

The adaptor 260 also includes a projection 772 that extends radially outward from the base 770. In some embodiments, the projection 772 extends along a slope that is angled with respect to the base 770 and/or an extending direction of the cartridge wall 254. In some embodiments, the angle of the slope is between 15° and 90° with respect to the base 770 and/or the extending direction of the cartridge wall 254. In some embodiments, the projection 772 is substantially parallel to the inlet coupling flange 756 and/or parallel to the outlet coupling flange 766. In some embodiments, the projection 772 is disposed between the inlet coupling flange 756 and the outlet coupling flange 766. In some embodiments, the projection 772 is contiguous with the base 770. In other embodiments, and as shown in FIG. 32, the projection 772 includes an adaptor curved portion 774. The adaptor curved portion 774 is contiguous with base 770 and contiguous with projection 772. The adaptor curved portion 774 extends outward (e.g., radially outwardly and axially outwardly, etc.) from the base 770. More specifically, the adaptor curved portion 774 extends along a curved path between the base 770 and the projection 772. In some embodiments, the projection 772 includes a first engagement surface 776 (e.g., an upstream surface). The projection 772 also includes a second engagement surface 778 (e.g., a downstream surface).

In some embodiments, the first engagement surface 776 engages the inlet coupling flange 756. In some embodiments, the engagement of the first engagement surface 776 and the inlet coupling flange 756 forms a first seal therebetween.

In some embodiments, the second engagement side 778 engages the outlet coupling flange 766. In some embodiments, the engagement of the second engagement side 778 and the outlet coupling flange 766 forms a second seal therebetween.

In some embodiments, the aftertreatment system 200 shown in FIG. 32 includes the first gasket 246, also referred to herein as a first sealing member. The first gasket 246 is disposed between the inlet coupling flange 756 and the first engagement surface 776 such that the first gasket 246 is separated from the cartridge wall 254 by the adaptor 260. The first gasket 246 establishes a first seal between the inlet coupling flange 756 and the first engagement surface 776. For example, the first gasket 246 engages the inlet coupling flange 756 and the first engagement surface 776 to form a first seal therebetween. In this way, when a compressive force is applied to the inlet coupling flange 756, the first gasket 246 is compressed between the inlet coupling flange 756 and the first engagement surface 776.

Similarly, the aftertreatment system 200 may include a second gasket 248, also referred to herein as a second sealing member. The second gasket 248 is disposed between the outlet coupling flange 766 and the second engagement side 778 such that the second gasket 248 is separated from the cartridge wall 254 by the adaptor 260. The second gasket 248 establishes a second seal between the outlet coupling flange 766 and the second engagement side 778. For example, the second gasket 248 engages the outlet coupling flange 766 and the second engagement side 778 to form a second seal therebetween. In this way, when a compressive force is applied to the outlet coupling flange 766, the second gasket 248 is compressed between the outlet coupling flange 766 and the second engagement side 778.

In other embodiments, the first gasket 246 and/or the second gasket 248 is/are disposed in a different location than as shown in FIG. 32. In these embodiments, the first gasket 246 may be positioned between the inlet engagement member 220 and the adaptor 260 and/or the second gasket 248 may be positioned between the outlet engagement member 240 and the adaptor 260. In other embodiments, the aftertreatment system 200 does not include the first gasket 246 and/or the second gasket 248. In these embodiments, a first seal (e.g., a metal-to-metal seal) may be formed by the inlet coupling flange 756 engaging the first engagement surface 776. A second seal (e.g., a metal-to-metal seal) may be formed by the outlet coupling flange 766 engaging the second engagement side 778. Advantageously, when the aftertreatment system 200 does not include the first gasket 246 and/or the second gasket 248 the quantity of components in the joint created by the inlet engagement member 220, the outlet engagement member 240 and the adaptor 260, is reduced thereby simplifying the manufacturing process, assembly process, and replacement process. In some embodiments, the metal-to-metal contact between the inlet engagement member 220 and the adaptor 260 and/or the metal-to-metal contact between the outlet engagement member 240 and the adaptor 260 also mitigates against gasket creep.

In some embodiments, the metal-to-metal contact between the inlet engagement member 220 and the adaptor 260 and/or the metal-to-metal contact between the outlet engagement member 240 and the adaptor 260 does not form a seal therebetween. In some embodiments, the metal-to-metal contact between the inlet engagement member 220 and the adaptor 260 and/or the metal-to-metal contact between the outlet engagement member 240 and the adaptor 260 provides an alternate path for external forces to pass through the joint created by the inlet engagement member 220, the outlet engagement member 240 and the adaptor 260. Advantageously, the metal-to-metal contact between the inlet engagement member 220 and the adaptor 260 and/or the metal-to-metal contact between the outlet engagement member 240 and the adaptor 260 avoids over-compression of the gaskets (e.g., the first gasket 246 and/or the second gasket 248) due to external forces. In some embodiments, the metal-to-metal contact between the inlet engagement member 220 and the adaptor 260 and/or the metal-to-metal contact between the outlet engagement member 240 and the adaptor 260 also enables control of gasket compression thru the fit between the metal components and the gaskets. For example, the cross sectional space created by the fit of the metal components (e.g., the inlet engagement member 220, the outlet engagement member 240 and the adaptor 260) is slightly smaller than the cross section of the gaskets (e.g., the first gasket 246 and/or the second gasket 248) thereby controlling the amount of gasket compression.

Figure 33:
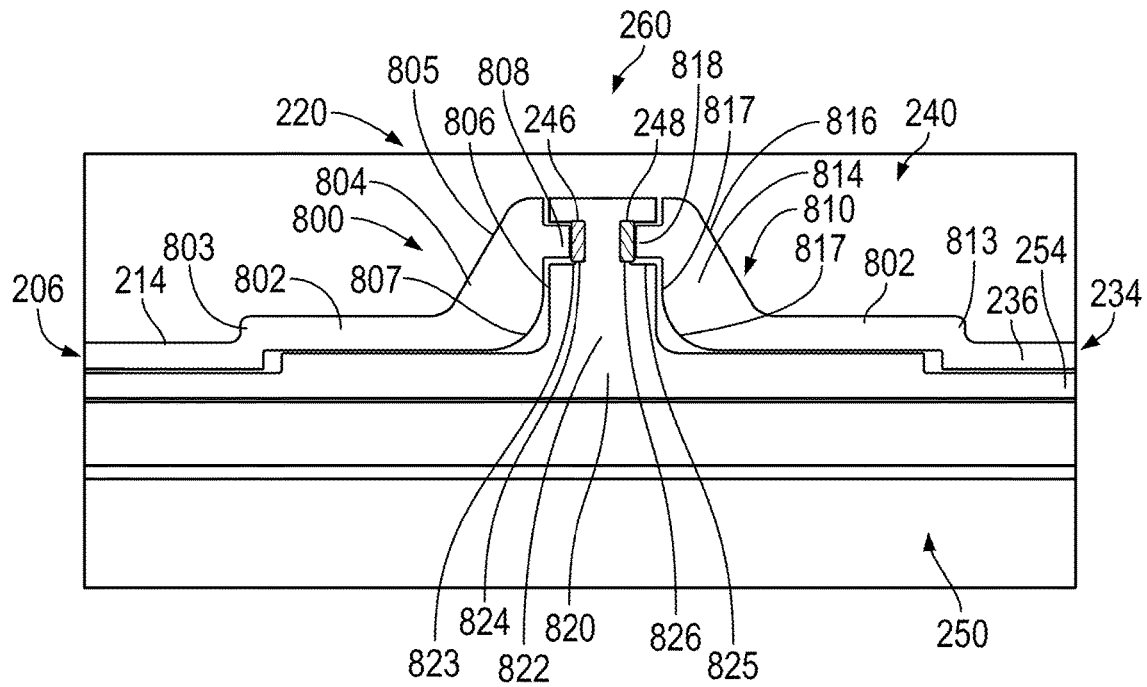
FIG. 33 is a cross-sectional view of the aftertreatment system shown in FIG. 17, according to another example embodiment.

FIG. 33 is a cross-sectional view of the aftertreatment system 200, according to another example embodiment. In the embodiment shown in FIG. 33, the inlet engagement member 220 is downstream of the inlet body wall portion 214 and flares or extends outwardly (e.g., radially outwardly and axially outwardly, etc.) and in a downstream direction from the inlet body wall portion 214. The inlet engagement member 220 includes an inlet engagement member wall 800.

The inlet engagement member wall 800 extends outward from the inlet body wall 214. The inlet engagement member wall 800 includes an inlet engagement member wall first portion 802 that extends outward from the inlet body wall 214 and substantially parallel to the inlet body wall 214. In some embodiments, the inlet engagement member wall first portion 802 is contiguous with the inlet body wall 214. In other embodiments, and as shown in FIG. 32, the inlet engagement member wall 800 includes an inlet engagement member wall first curved portion 803. The inlet engagement member wall first curved portion 803 is contiguous with the inlet body wall 214 and contiguous with the inlet engagement member wall first portion 802. The inlet engagement member wall first curved portion 803 extends outward (e.g., radially outwardly and axially outwardly, etc.) from the inlet body wall 214. More specifically, the inlet engagement member wall first curved portion 803 extends along a curved path between the inlet body wall 214 and the inlet engagement member wall first portion 802.

The inlet engagement member wall 800 includes an inlet engagement member wall second portion 804. At least a portion of the inlet engagement member wall second portion 804 extends along a slope from the inlet engagement member wall first portion 802. The slope is angled with respect to an extending direction of the inlet engagement member wall first portion 802. The angle is between 15° and 90° with respect to the extending direction of the inlet engagement member wall first portion 802. The inlet engagement member wall second portion 804 is contiguous with the inlet engagement member wall first portion 802.

The inlet engagement member wall second portion 804 includes an inlet engagement member wall first surface 805 (e.g., an outer surface) that extends along the slope. The inlet engagement member wall second portion 804 also includes an inlet engagement member wall second surface 806 (e.g., a radial surface, inner surface, etc.) that extends in a radial direction and substantially perpendicular to the extending direction of the inlet engagement member wall first portion 802. The inlet engagement member wall second surface 806 is disposed opposite the inlet engagement member wall first surface 805 and disposed towards the adaptor 260. The inlet engagement member wall second portion 804 also includes an inlet engagement member wall third surface 807 (e.g., an inner surface) that extends between the inlet engagement member wall first portion 802 and the inlet engagement member wall second surface 806. More specifically, the inlet engagement member wall third surface 807 is a curved surface that extends along a curved path between the inlet engagement member wall first portion 802 and the inlet engagement member wall second surface 806.

The inlet engagement member 220 also includes an inlet coupling flange 808 that extends outward (e.g., axially outward) in a downstream direction from the inlet engagement member wall 800. The inlet coupling flange 808 extends outward (e.g., axially outward) form the inlet body wall 214 in the downstream direction. More specifically, the inlet coupling flange 808 extends away from the inlet engagement member wall second surface 806 in the downstream direction. The inlet coupling flange 808 is contiguous with the inlet engagement member wall 800

The outlet body 232 includes an outlet engagement member 240 that is positioned upstream of the outlet body wall 236 and flares or extends outwardly (e.g., radially outwardly and axially outwardly, etc.) and in an upstream direction from the outlet body wall 236. The outlet engagement member 240 includes an outlet engagement member wall 810.

The outlet engagement member wall 810 extends outward from the outlet body wall 236. The outlet engagement member wall 810 includes an outlet engagement member wall first portion 812 that extends outward from the outlet body wall 236 and substantially parallel to the outlet body wall 236. In some embodiments, the outlet engagement member wall first portion 812 is contiguous with the outlet body wall 236. In other embodiments, and as shown in FIG. 32, the outlet engagement member wall 810 includes an outlet engagement member wall first curved portion 813. The outlet engagement member wall first curved portion 813 is contiguous with the outlet body wall 236 and contiguous with the outlet engagement member wall first portion 812. The outlet engagement member wall first curved portion 813 extends outward (e.g., radially outwardly and axially outwardly, etc.) from the outlet body wall 236. More specifically, the inlet engagement member wall first curved portion 803 extends along a curved path between the outlet body wall 236 and the outlet engagement member wall first portion 812.

The outlet engagement member wall 810 includes an outlet engagement member wall second portion 814. At least a portion of the outlet engagement member wall second portion 814 extends along a slope from the outlet engagement member wall first portion 812. The slope is angled with respect to an extending direction of the outlet engagement member wall first portion 812. The angle is between 15° and 90° with respect to the extending direction of the outlet engagement member wall first portion 812. The outlet engagement member wall second portion 814 is contiguous with the outlet engagement member wall first portion 812.

The outlet engagement member wall second portion 814 includes an outlet engagement member wall first surface 815 (e.g., an outer surface) that extends along the slope. The outlet engagement member wall second portion 814 also includes an outlet engagement member wall second surface 816 (e.g., a radial surface, an inner surface) that extends in a radial direction and substantially perpendicular to the extending direction of the outlet engagement member wall first portion 812. The outlet engagement member wall second surface 816 is disposed opposite the outlet engagement member wall first surface 815 and disposed towards the adaptor 260. The outlet engagement member wall second portion 814 also includes an outlet engagement member wall third surface 817 (e.g., an inner surface) that extends between the outlet engagement member wall first portion 812 and the outlet engagement member wall second surface 816. More specifically, the outlet engagement member wall third surface 817 is a curved surface that extends along a curved path between the outlet engagement member wall first portion 812 and the outlet engagement member wall second surface 816.

The outlet engagement member 240 also includes an outlet coupling flange 818 that extends outward (e.g., axially outward) in an upstream direction from the outlet engagement member wall 810. The outlet coupling flange 818 extends outward (e.g., axially outward) form the outlet body wall 236 in the upstream direction. More specifically, the outlet coupling flange 818 extends away from the outlet engagement member wall second surface 816 in the upstream direction. The outlet coupling flange 818 is contiguous with the outlet engagement member wall 810

As shown in FIG. 32, the adaptor 260 is disposed between the inlet engagement member 220 and the outlet engagement member 240. In some embodiments, the adaptor 260 is coupled to the cartridge wall 254. In other embodiments, the adaptor 260 is monolithically formed with the cartridge wall 254. As described herein, the adaptor 260 cooperates with the cartridge wall 254, the inlet engagement member 220, and the outlet engagement member 240 to facilitate suspension of the cartridge 250 within the inlet body 206 and/or the outlet body 232 when a compressive force is applied to the adaptor 260.

The adaptor 260 includes a base 820 that extends outward from the cartridge wall 254. In some embodiments, the base 820 is attached to an outer surface of the cartridge wall 254. In some embodiments, the base 820 is monolithically formed with the cartridge wall 254. In some embodiments, the base 820 is substantially parallel to or coaxial with the cartridge wall 254.

The adaptor 260 also includes a projection 822 that extends outward (e.g., radially outward) from the base 820. In some embodiments, the projection 822 is substantially perpendicular to the base 820. In some embodiments, the projection 822 is disposed between the inlet coupling flange 808 and the outlet coupling flange 818. The projection 822 defines a first recess 823 (e.g., an upstream recess) having a first engagement surface 824 (e.g., an upstream engagement surface). The projection 562 also includes a second recess 825 (e.g., a downstream recess) having a second engagement surface 826 (e.g., a downstream engagement surface).

The first recess 823 is sized to receive at least a portion of the inlet coupling flange 808 such that the portion of the inlet coupling flange 808 engages the projection 822 at the first engagement surface 824. In some embodiments, the engagement of the portion of the inlet coupling flange 808 and the projection 822 at the first engagement surface 824 forms a first seal therebetween.

In some embodiments, the inlet coupling flange 808 engages the first engagement surface 824 and forms a seal therebetween. In other embodiments, the aftertreatment system 200 shown in FIG. 33 includes the first gasket 246, also referred to herein as a first sealing member. The first gasket 246 is disposed between the inlet coupling flange 808 and the first engagement surface 824 (e.g., within the recess 823) such that the first gasket 246 is separated from the cartridge wall 254 by the adaptor 260. The first gasket 246 establishes a first seal between the inlet coupling flange 808 and the first engagement surface 824. For example, the first gasket 246 engages the inlet coupling flange 808 and the first engagement surface 824 to form a first seal therebetween. In this way, when a compressive force is applied to the inlet coupling flange 808, the first gasket 246 is compressed between the inlet coupling flange 808 and the first engagement surface 824.

The second recess 825 is sized to receive at least a portion of the outlet coupling flange 818 such that the portion of the outlet coupling flange 818 engages the projection 822 at the second engagement surface 826. In some embodiments, the engagement of the portion of the outlet coupling flange 818 and the projection 562 at the second engagement surface 826 forms a second seal therebetween.

In some embodiments, the outlet coupling flange 818 engages at least a portion of the second engagement surface 826 and forms a seal therebetween. In other embodiments, the aftertreatment system 200 may include a second gasket 248, also referred to herein as a second sealing member. The second gasket 248 is disposed between the outlet coupling flange 818 and the second engagement surface 826 (e.g., within the recess 825) such that the second gasket 248 is separated from the cartridge wall 254 by the adaptor 260. The second gasket 248 establishes a second seal between the outlet coupling flange 818 and the second engagement surface 826. For example, the second gasket 248 engages the outlet coupling flange 818 and the second engagement surface 826 to form a second seal therebetween. In this way, when a compressive force is applied to the outlet coupling flange 818, the second gasket 248 is compressed between the outlet coupling flange 818 and the second engagement surface 826.

In other embodiments, the first gasket 246 and/or the second gasket 248 is/are disposed in a different location than as shown in FIG. 33. In these embodiments, the first gasket 246 may be positioned between the inlet engagement member 220 and the adaptor 260 and/or the second gasket 248 may be positioned between the outlet engagement member 240 and the adaptor 260. In other embodiments, the aftertreatment system 200 does not include the first gasket 246 and/or the second gasket 248. In these embodiments, a first seal (e.g., a metal-to-metal seal) may be formed by the engagement of the portion of the inlet coupling flange 808 and the projection 822 at the first engagement surface 824. A second seal (e.g., a metal-to-metal seal) may be formed by the engagement of the portion of the outlet coupling flange 818 and the projection 562 at the second engagement surface 826. Advantageously, when the aftertreatment system 200 does not include the first gasket 246 and/or the second gasket 248 the quantity of components in the joint created by the inlet engagement member 220, the outlet engagement member 240 and the adaptor 260, is reduced thereby simplifying the manufacturing process, assembly process, and replacement process. In some embodiments, the metal-to-metal contact between the inlet engagement member 220 and the adaptor 260 and/or the metal-to-metal contact between the outlet engagement member 240 and the adaptor 260 also mitigates against gasket creep.

In some embodiments, the metal-to-metal contact between the inlet engagement member 220 and the adaptor 260 and/or the metal-to-metal contact between the outlet engagement member 240 and the adaptor 260 does not form a seal therebetween. In some embodiments, the metal-to-metal contact between the inlet engagement member 220 and the adaptor 260 and/or the metal-to-metal contact between the outlet engagement member 240 and the adaptor 260 provides an alternate path for external forces to pass through the joint created by the inlet engagement member 220, the outlet engagement member 240 and the adaptor 260. Advantageously, the metal-to-metal contact between the inlet engagement member 220 and the adaptor 260 and/or the metal-to-metal contact between the outlet engagement member 240 and the adaptor 260 avoids over-compression of the gaskets (e.g., the first gasket 246 and/or the second gasket 248) due to external forces. In some embodiments, the metal-to-metal contact between the inlet engagement member 220 and the adaptor 260 and/or the metal-to-metal contact between the outlet engagement member 240 and the adaptor 260 also enables control of gasket compression thru the fit between the metal components and the gaskets. For example, the cross sectional space created by the fit of the metal components (e.g., the inlet engagement member 220, the outlet engagement member 240 and the adaptor 260) is slightly smaller than the cross section of the gaskets (e.g., the first gasket 246 and/or the second gasket 248) thereby controlling the amount of gasket compression.

Figure 34:
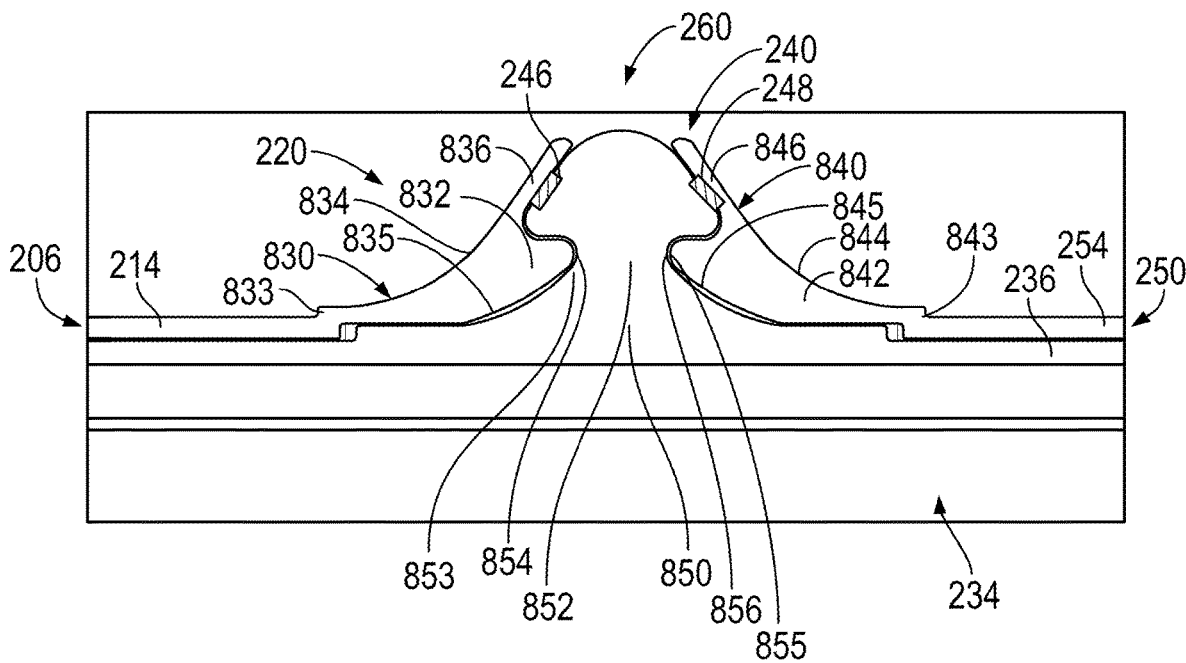
FIG. 34 is a cross-sectional view of the aftertreatment system shown in FIG. 17, according to another example embodiment.

FIG. 34 is a cross-sectional view of the aftertreatment system 200, according to another example embodiment. In the embodiment shown in FIG. 34, the inlet engagement member 220 is downstream of the inlet body wall portion 214 and flares or extends outwardly (e.g., radially outwardly and axially outwardly, etc.) from the inlet body wall portion 214. The inlet engagement member 220 includes an inlet engagement member wall 830.

The inlet engagement member wall 830 includes an inlet engagement member wall first portion 832 that extends outward (e.g., radially outward, axially outward) from the inlet body wall 214 in a downstream direction. More specifically, the inlet engagement member wall first portion 832 extends along a curved path outward from the inlet body wall 214. In some embodiments, the inlet engagement member wall first portion 832 is contiguous with the inlet body wall 214. In other embodiments, and as shown in FIG. 34, the inlet engagement member wall 830 includes an inlet engagement member wall first curved portion 833. The inlet engagement member wall first curved portion 833 is contiguous with the inlet body wall 214 and contiguous with the inlet engagement member wall first portion 832. The inlet engagement member wall first curved portion 833 extends outward (e.g., radially outwardly and axially outwardly, etc.) from the inlet body wall 214. More specifically, the inlet engagement member wall first curved portion 833 extends along a curved path between the inlet body wall 214 and the inlet engagement member wall first portion 832.

The inlet engagement member wall first portion 832 has an outer surface 834 (e.g., an upstream surface) that extends along the curved path. The inlet engagement member wall first portion 832 also includes an inner surface 835 that is disposed opposite the outer surface 834.

The inlet engagement member wall 830 includes an inlet engagement member wall second portion 836 (also referred to herein as an inlet coupling flange 836) extending outward (e.g., radially outward, axially outward) from the inlet body wall 214 in the downstream direction. More specifically, the inlet coupling flange 836 extends outward from the inlet engagement member wall first portion 832 in the downstream direction. The inlet coupling flange 836 extends along a curved path. In some embodiments, the inlet coupling flange 836 is contiguous with the inlet engagement member wall first portion 832.

The outlet engagement member 240 is upstream of the outlet body wall portion 236 and flares or extends outwardly (e.g., radially outwardly and axially outwardly, etc.) from the outlet body wall portion 236. The outlet engagement member 240 includes an outlet engagement member wall 840.

The outlet engagement member wall 840 includes an outlet engagement member wall first portion 842 that extends outward (e.g., radially outward, axially outward) from the outlet body wall 236 in an upstream direction. More specifically, the outlet engagement member wall first portion 842 extends along a curved path outward from the outlet body wall 236. In some embodiments, the outlet engagement member wall first portion 842 is contiguous with the outlet body wall 236. In other embodiments, and as shown in FIG. 34, the outlet engagement member wall 840 includes an outlet engagement member wall first curved portion 843. The outlet engagement member wall first curved portion 843 is contiguous with the outlet body wall 236 and contiguous with the outlet engagement member wall first portion 842. The outlet engagement member wall first curved portion 843 extends outward (e.g., radially outwardly and axially outwardly, etc.) from the outlet body wall 236. More specifically, the outlet engagement member wall first curved portion 843 extends along a curved path between the outlet body wall 236 and the outlet engagement member wall first portion 842.

The outlet engagement member wall first portion 842 has an outer surface 844 (e.g., an upstream surface) that extends along the curved path. The outlet engagement member wall first portion 842 also includes an inner surface 845 that is disposed opposite the outer surface 844.

The outlet engagement member wall 840 includes an outlet engagement member wall second portion 846 (also referred to herein as an outlet coupling flange 846) extending outward (e.g., radially outward, axially outward) from the outlet body wall 236 in the upstream direction. More specifically, the outlet coupling flange 846 extends outward from the outlet engagement member wall first portion 842 in the upstream direction. The outlet coupling flange 846 extends along a curved path. In some embodiments, the outlet coupling flange 846 is contiguous with the outlet engagement member wall first portion 842.

As shown in FIG. 32, the adaptor 260 is disposed between the inlet engagement member 220 and the outlet engagement member 240. In some embodiments, the adaptor 260 is coupled to the cartridge wall 254. In other embodiments, the adaptor 260 is monolithically formed with the cartridge wall 254. As described herein, the adaptor 260 cooperates with the cartridge wall 254, the inlet engagement member 220, and the outlet engagement member 240 to facilitate suspension of the cartridge 250 within the inlet body 206 and/or the outlet body 232 when a compressive force is applied to the adaptor 260.

The adaptor 260 includes a base 850 that extends outward from the cartridge wall 254. In some embodiments, the base 850 is attached to an outer surface of the cartridge wall 254. In some embodiments, the base 850 is monolithically formed with the cartridge wall 254. In some embodiments, the base 850 is substantially parallel to or coaxial with the cartridge wall 254.

The adaptor 260 also includes a projection 852 that extends radially outward from the base 850. In some embodiments, the projection 852 is substantially perpendicular to the base 850. In some embodiments, the projection 852 is disposed between the inlet coupling flange 836 and the outlet coupling flange 846. The projection 852 defines a first recess 853 (e.g., an upstream recess) having a first engagement surface 854. The projection 852 also includes a second recess 855 (e.g., a downstream recess) having a second engagement surface 856.

The inlet engagement member wall first portion 832 is received by the first recess 853 such that the inlet engagement member wall first portion 832 is at least partially disposed radially outward from at least a portion of the projection 852. The inlet coupling flange 836 is at least partially disposed above the adaptor 260.

The outlet engagement member wall first portion 842 is received by the second recess 855 such that the outlet engagement member wall first portion 842 is at least partially disposed radially outward from at least a portion of the projection 852. The outlet coupling flange 846 is at least partially disposed above the adaptor 260.

In some embodiments, a shape of the inlet engagement member wall 830 conforms to a shape of an upstream side of the projection 852. More specifically, the first recess 853 is sized to receive at least a portion of the inlet engagement member wall 830 such that the portion of the inlet engagement member wall 830, such as the inlet engagement member wall first portion 832, engages the projection 852 at the first engagement surface 854. In some embodiments, the engagement of the portion of the inlet engagement member wall 830 and the projection 852 at the first engagement surface 854 forms a first seal therebetween.

In some embodiments, the inlet coupling flange 836 engages at least a portion of an upstream side of the projection 852 and forms a seal therebetween. In other embodiments, the aftertreatment system 200 shown in FIG. 32 includes the first gasket 246, also referred to herein as a first sealing member. The first gasket 246 is disposed between the inlet coupling flange 836 and the upstream side of the projection 852 such that the first gasket 246 is separated from the cartridge wall 254 by the adaptor 260. The first gasket 246 establishes a first seal between the inlet coupling flange 836 and the upstream side of the projection 852. For example, the first gasket 246 engages the inlet coupling flange 836 and the upstream side of the projection 852 to form a first seal therebetween. In this way, when a compressive force is applied to the inlet coupling flange 836, the first gasket 246 is compressed between the inlet coupling flange 936 and the upstream side of the projection 852.

In some embodiments, a shape of the outlet engagement member wall 840 conforms to a shape of a downstream side of the projection 852. More specifically, the second recess 855 is sized to receive at least a portion of the outlet engagement member wall 840 such that the portion of the outlet engagement member wall 840, such as the outlet engagement member wall first portion 842, engages the projection 852 at the second engagement surface 856. In some embodiments, the engagement of the portion of the outlet engagement member wall 840 and the projection 852 at the second engagement surface 856 forms a second seal therebetween.

In some embodiments, the outlet coupling flange 846 engages at least a portion of the downstream side of the projection 852 and forms a seal therebetween. In other embodiments, the aftertreatment system 200 may include a second gasket 248, also referred to herein as a second sealing member. The second gasket 248 is disposed between the outlet coupling flange 846 and the downstream side of the projection 852 such that the second gasket 248 is separated from the cartridge wall 254 by the adaptor 260.

The second gasket 248 establishes a second seal between the outlet coupling flange 846 and the downstream side of the projection 852. For example, the second gasket 248 engages the outlet coupling flange 846 and the downstream side of the projection 852 to form a second seal therebetween. In this way, when a compressive force is applied to the outlet coupling flange 846, the second gasket 248 is compressed between the outlet coupling flange 846 and the downstream side of the projection 852.

In other embodiments, the first gasket 246 and/or the second gasket 248 is/are disposed in a different location than as shown in FIG. 34. In these embodiments, the first gasket 246 may be positioned between the inlet engagement member 220 and the adaptor 260 and/or the second gasket 248 may be positioned between the outlet engagement member 240 and the adaptor 260. In other embodiments, the aftertreatment system 200 does not include the first gasket 246 and/or the second gasket 248. In these embodiments, a first seal (e.g., a metal-to-metal seal) may be formed by inlet coupling flange 936 engaging the upstream side of the projection 852. A second seal (e.g., a metal-to-metal seal) may be formed by the outlet coupling flange 846 engaging the downstream side of the projection 852. Advantageously, when the aftertreatment system 200 does not include the first gasket 246 and/or the second gasket 248 the quantity of components in the joint created by the inlet engagement member 220, the outlet engagement member 240 and the adaptor 260, is reduced thereby simplifying the manufacturing process, assembly process, and replacement process. In some embodiments, the metal-to-metal contact between the inlet engagement member 220 and the adaptor 260 and/or the metal-to-metal contact between the outlet engagement member 240 and the adaptor 260 also mitigates against gasket creep.

In some embodiments, the metal-to-metal contact between the inlet engagement member 220 and the adaptor 260 and/or the metal-to-metal contact between the outlet engagement member 240 and the adaptor 260 does not form a seal therebetween. In some embodiments, the metal-to-metal contact between the inlet engagement member 220 and the adaptor 260 and/or the metal-to-metal contact between the outlet engagement member 240 and the adaptor 260 provides an alternate path for external forces to pass through the joint created by the inlet engagement member 220, the outlet engagement member 240 and the adaptor 260. Advantageously, the metal-to-metal contact between the inlet engagement member 220 and the adaptor 260 and/or the metal-to-metal contact between the outlet engagement member 240 and the adaptor 260 avoids over-compression of the gaskets (e.g., the first gasket 246 and/or the second gasket 248) due to external forces. In some embodiments, the metal-to-metal contact between the inlet engagement member 220 and the adaptor 260 and/or the metal-to-metal contact between the outlet engagement member 240 and the adaptor 260 also enables control of gasket compression thru the fit between the metal components and the gaskets. For example, the cross sectional space created by the fit of the metal components (e.g., the inlet engagement member 220, the outlet engagement member 240 and the adaptor 260) is slightly smaller than the cross section of the gaskets (e.g., the first gasket 246 and/or the second gasket 248) thereby controlling the amount of gasket compression.

In any of the embodiments described herein, arrangements that utilize a metal-to-metal load path and/or a metal tolerance-controlled compression of a gasket or sealing member (e.g., the first gasket 246, the second gasket 248, etc.) benefit from improved uniformity in gasket compression around the circumference of the sealing surface (e.g., the surface that engages or contacts the gasket or sealing member). The load path running through the metal ensures that one half of the gasket is not over compressed while the other half is under compressed. When a gasket is properly compressed, leaks are more effectively mitigated. Furthermore, in the arrangements that utilize a metal-to-metal load path and/or a metal tolerance-controlled compression of a gasket, the assembled offset variation is reduced thereby reducing the assembly tolerances over the length of the aftertreatment system 200.

Furthermore, the metal-to-metal contact allows for tighter compression loads from a fastener, such as the clamp 170, without damaging the gasket and a higher rigidity at the joint. Additionally, a physical limit controlling gasket compression, as seen in the metal to metal layout, prevents excessive loading on the gasket which can lead to gasket creep and gasket failure over the lifetime of the gasket.

VI. Configuration of Example Embodiments

While this specification contains many specific implementation details, these should not be construed as limitations on the scope of what may be claimed but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described as acting in certain combinations and even initially claimed as such, one or more features from a claimed combination can, in some cases, be excised from the combination, and the claimed combination may be directed to a subcombination or variation of a subcombination.

As utilized herein, the terms "substantially," "generally," "approximately," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the appended claims.

The term "coupled" and the like, as used herein, mean the joining of two components directly or indirectly to one another. Such joining may be stationary (e.g., permanent) or moveable (e.g., removable or releasable). Such joining may be achieved with the two components or the two components and any additional intermediate components being integrally formed as a single monolithically body with one another, with the two components, or with the two components and any additional intermediate components being attached to one another.

It is important to note that the construction and arrangement of the various systems shown in the various example implementations is illustrative only and not restrictive in character. All changes and modifications that come within the spirit and/or scope of the described implementations are desired to be protected. It should be understood that some features may not be necessary, and implementations lacking the various features may be contemplated as within the scope of the disclosure, the scope being defined by the claims that follow. When the language "a portion" is used, the item can include a portion and/or the entire item unless specifically stated to the contrary.

Also, the term "or" is used, in the context of a list of elements, in its inclusive sense (and not in its exclusive sense) so that when used to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

Additionally, the use of ranges of values (e.g., W1 to W2, etc.) herein are inclusive of their maximum values and minimum values (e.g., W1 to W2 includes W1 and includes W2, etc.), unless otherwise indicated. Furthermore, a range of values (e.g., W1 to W2, etc.) does not necessarily require the inclusion of intermediate values within the range of values (e.g., W1 to W2 can include only W1 and W2, etc.), unless otherwise indicated.

What is claimed is:

1. An aftertreatment system comprising:
   an inlet body comprising an inlet body wall and an inlet engagement member, the inlet engagement member comprising:
      an inlet engagement member wall extending outward from the inlet body wall, the inlet engagement member wall comprising:
         an inlet engagement member wall first portion extending outward from the inlet body wall at a first non-zero angle with respect to an extending direction of the inlet body wall;
         an inlet engagement member wall second portion extending outward and in a downstream direction from the inlet engagement member wall first portion at a second non-zero angle with respect to the inlet engagement member wall first portion, and
         an inlet engagement member wall third portion extending outward from the inlet engagement member wall second portion at a third non-zero angle with respect to the inlet engagement member wall second portion, wherein the inlet engagement member wall third portion is perpendicular to the inlet engagement member wall second portion, and
      an inlet coupling flange extending in a downstream direction from the inlet engagement member wall third portion;
   a cartridge, part of which is positioned downstream of the inlet body, the cartridge comprising:
      a cartridge wall, and
      an adaptor that extends outward from the cartridge wall; and
   an outlet body, part of which is positioned downstream of the cartridge, the outlet body comprising an outlet body wall and an outlet engagement member, the outlet engagement member comprising:
      an outlet engagement member wall extending outward from the outlet body wall, and an outlet coupling flange extending in an upstream direction from the outlet engagement member wall and towards the adaptor such that the adaptor is disposed between the inlet coupling flange and the outlet coupling flange.

2. The aftertreatment system of claim 1, wherein the adaptor is spaced away from both the inlet engagement member wall and the outlet engagement member wall.

3. The aftertreatment system of claim 1, wherein the aftertreatment system further comprises:
a first sealing member that engages the inlet engagement member wall and a first engagement side of the adaptor to form a first seal therebetween; and
a second sealing member that engages the outlet engagement member wall and a second engagement side of the adaptor, opposite the first engagement side, to form a second seal therebetween.

4. The aftertreatment system of claim 1, wherein:
a first engagement side of the adaptor engages the inlet coupling flange to form a first seal therebetween; and
a second engagement side of the adaptor, opposite the first engagement side, engages the outlet coupling flange to form a second seal therebetween.

5. The aftertreatment system of claim 1, wherein the adaptor further comprises a base coupled to the cartridge wall and a coupler portion extending outward from a center of the base.

6. The aftertreatment system of claim 1, wherein the inlet engagement member wall second portion is parallel to the extending direction of the inlet body wall.

7. The aftertreatment system of claim 1, wherein the inlet engagement member wall comprises an inlet engagement member wall curved portion extending along a curved path between the inlet engagement member wall second portion and the inlet engagement member wall third portion, wherein the inlet engagement member wall curved portion is contiguous with the inlet engagement member wall second portion and the inlet engagement member wall third portion.

8. The aftertreatment system of claim 1, wherein the inlet engagement member wall third portion defines an engagement surface that engages the adaptor.

9. The aftertreatment system of claim 1, wherein the inlet coupling flange extends along a slope that is angled with respect to the inlet engagement member wall third portion.

10. The aftertreatment system of claim 9, wherein the angle of the slope is between 90° and 180° with respect to an extending direction of the inlet engagement member wall third portion.

11. The aftertreatment system of claim 9, wherein the inlet engagement member wall comprises an inlet engagement member wall curved portion extending along a curved path between the inlet engagement member wall third portion and the inlet coupling flange, wherein the inlet engagement member wall curved portion is contiguous with the inlet engagement member wall third portion and the inlet coupling flange.

12. An aftertreatment system comprising:
an inlet body comprising:
an inlet body wall, and
an inlet engagement member comprising an inlet coupling flange extending outward from the inlet body wall;
a cartridge, part of which is positioned downstream of the inlet body, the cartridge comprising:
a cartridge wall, and
an adaptor comprising:
an adaptor wall first portion extending outward from the cartridge wall at a first non-zero angle with respect to an extending direction of the cartridge wall and contiguous with the cartridge wall,
an adaptor wall second portion extending outward from the adaptor wall first portion at a second non-zero angle with respect to the extending direction of the cartridge wall, and contiguous with the adaptor wall first portion,
an adaptor wall third portion extending outward from the adaptor wall second portion at a third non-zero angle with respect to the extending direction of the cartridge wall such that the adaptor wall third portion is parallel to the adaptor wall first portion, and contiguous with the adaptor wall second portion, and
an adaptor wall fourth portion extending outward from the adaptor wall third portion at a fourth non-zero angle with respect to the extending direction of the cartridge wall such that the adaptor wall fourth portion is parallel to the inlet coupling flange; and
an outlet body, part of which is positioned downstream of the cartridge, the outlet body comprising:
an outlet body wall,
an outlet engagement member wall extending outward from the outlet body wall, and
an outlet coupling flange extending in an upstream direction from the outlet engagement member wall and towards the adaptor such that the adaptor is disposed between the inlet coupling flange and the outlet coupling flange.

13. The aftertreatment system of claim 12, wherein an upstream side of the adaptor wall third portion defines a first adaptor engagement surface.

14. The aftertreatment system of claim 12, wherein the adaptor wall first portion is perpendicular to the extending direction of the cartridge wall.

15. The aftertreatment system of claim 12, wherein the adaptor comprises:
an adaptor wall fifth portion extending outward from the cartridge wall at a fifth non-zero angle with respect to an extending direction of the cartridge wall and contiguous with the cartridge wall,
an adaptor wall sixth portion extending outward from the adaptor wall fifth portion at a sixth non-zero angle with respect to the extending direction of the cartridge wall, and contiguous with the adaptor wall fifth portion,
an adaptor wall seventh portion extending outward from the adaptor wall sixth portion at a seventh non-zero angle with respect to the extending direction of the cartridge wall, and contiguous with the adaptor wall sixth portion, wherein the adaptor wall seventh portion is parallel to the adaptor wall fifth portion, and
an adaptor wall eighth portion extending outward from the adaptor wall seventh portion at an eighth non-zero angle with respect to the extending direction of the cartridge wall, and contiguous with the adaptor wall seventh portion, wherein the adaptor wall eighth portion is parallel to the outlet coupling flange.

16. The aftertreatment system of claim 15, wherein the adaptor comprises an adaptor wall ninth portion that extends between the adaptor wall fourth portion and the adaptor wall eighth portion, and contiguous with the adaptor wall fourth portion and the adaptor wall eighth portion.

* * * * *